US012552782B2

(12) United States Patent
Johnson et al.

(10) Patent No.: US 12,552,782 B2
(45) Date of Patent: Feb. 17, 2026

(54) ANALOGS OF NITROFURAN ANTIBIOTICS TO COMBAT RESISTANCE

(71) Applicants: THE TRUSTEES OF INDIANA UNIVERSITY, Indianapolis, IN (US); ARIZONA BOARD OF REGENTS ON BEHALF OF THE UNIVERSITY OF ARIZONA, Tucson, AZ (US)

(72) Inventors: Steven Johnson, Indianapolis, IN (US); Eli Chapman, Tucson, AZ (US)

(73) Assignees: THE TRUSTEES OF INDIANA UNIVERSITY, Indianapolis, IN (US); ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 18/155,399

(22) Filed: Jan. 17, 2023

(65) Prior Publication Data

US 2023/0295136 A1  Sep. 21, 2023

Related U.S. Application Data

(62) Division of application No. 17/365,390, filed on Jul. 1, 2021, now abandoned.

(60) Provisional application No. 63/048,017, filed on Jul. 3, 2020.

(51) Int. Cl.
| | |
|---|---|
| C07D 409/12 | (2006.01) |
| A61P 31/04 | (2006.01) |
| C07C 251/86 | (2006.01) |
| C07D 215/12 | (2006.01) |
| C07D 215/26 | (2006.01) |
| C07D 215/28 | (2006.01) |
| C07D 307/52 | (2006.01) |
| C07D 307/73 | (2006.01) |
| C07D 401/12 | (2006.01) |
| C07D 405/12 | (2006.01) |

(52) U.S. Cl.
CPC ............ *C07D 409/12* (2013.01); *A61P 31/04* (2018.01); *C07C 251/86* (2013.01); *C07D 215/12* (2013.01); *C07D 215/26* (2013.01); *C07D 215/28* (2013.01); *C07D 307/52* (2013.01); *C07D 307/73* (2013.01); *C07D 401/12* (2013.01); *C07D 405/12* (2013.01); *C07C 2602/10* (2017.05)

(58) Field of Classification Search
None
See application file for complete search history.

(56) References Cited

U.S. PATENT DOCUMENTS

2018/0360799 A1  12/2018  Wang
2023/0406831 A1  12/2023  Johnson

FOREIGN PATENT DOCUMENTS

WO  WO2006132583  *  12/2006
WO  2020092947 A1     5/2020

OTHER PUBLICATIONS

CAPLUS printout of "Shi et al., Green synthesis and antitumor activities of 8-hydroxyquinoline-7-carbaldehyde aroylhydrazone Schiff bases. Huaxue Tongbao, 2013, 76, p. 72-76."*
Chemical Abstract Registry No. 414897-53-3, indexed in the Registry File on STN CAS Online May 13, 2002.*
Chemical Abstract Registry No. 870981-92-3, indexed in the Registry File on STN CAS Online Jan. 3, 2006.*
Alsaeedi et al., Synthesis and Investigation of Antimicrobial Activity of Some Nifuroxazide Analogues. Asian Journal of Chemistry, 2015, 27, p. 3639-3646.*
Chemical Abstrat Registry No. 300732-09-6, indexed in the Registry File on STN CAS Online Nov. 1, 2000.*
Chemical Abstrat Registry No. 351983-85-2, indexed in the Registry File on STN CAS Online Aug. 20, 2001.*
Wang et al., Design, synthesis and antibacterial activities of vanillic acylhydrazone derivatives as potential β-ketoacyl-acyl carrier protein synthase III (FabH) inhibitors. European Journal of Medicinal Chemistry, 2012, 57, 373-382.*
Abdeen et al., GroEL/ES inhibitors as potential antibiotics. Bioorganic & Medicinal Chemistry Letters, 2016, 26, 3127-3134.*
Chemical Abstract Registry No. 904050-35-7, indexed in the Registry File on STN CAS Online Aug. 24, 2006.*
Chemical Abstract Registry No. 340203-83-0, indexed in the Registry File on STN CAS Online Jun. 10, 2001.*
Palace-Berl, F. et al., "Designing and exploring active N'-[(5-nitrofuran-2-yl) methylene] substituted hydrazides against three Trypanosoma cruzi strains more prevalent in Chagas disease patients," European Journal of Medicinal Chemistry, 2015, pp. 330-339, 96.
Palace-Berl, F. et al., "Investigating the structure-activity relationships of N'-[(5-nitrofuran-2-yl) methylene] substituted hydrazides against Trypanosoma cruzi to design novel active compounds," European Journal of Medicinal Chemistry, 2018, pp. 29-40, 144.
Fujikawa, Fukujiro et al., "Studies on chemotherapeutics for *Mycobacterium tuberculosis*. XVIII. Synthesis and antibacterial activity on *Mycobacterium tuberculosis* of Formyl-8-hydroxyquinoline derivatives," Yakugaku Zasshi : Journal of the Pharmaceutical Society of Japan, Jul. 1, 1967, pp. 844-849, 87(7), DOI: 10.1248/yakushi1947.87.7_844, (Eng. abstract only).
Johnson, S. et al., "A biochemical screen for GroEL/GroES inhibitors," Bioorganic & Medicinal Chemistry Letters, 2014, pp. 786-789, 24(3).
Abdeen, S. et al., "GroEL/GroES inhibitors as potential antibiotics," Bioorganic & Medicinal Chemistry Letters, 2016, pp. 3127-3134, 26(13).
Extended EP Search Report completed by the ISA/EP on 30SEP24 and issued in connection with EP Application No. 21892560.0.

(Continued)

*Primary Examiner* — Po-Chih Chen
(74) *Attorney, Agent, or Firm* — Barnes & Thornburg

(57) ABSTRACT

Novel compounds and methods of killing or inhibiting the growth of bacteria.

8 Claims, 10 Drawing Sheets

(56) References Cited

OTHER PUBLICATIONS

Kunkle et al, "Hydroxybiphenylamide GroEL/ES Inhibitors Are Potent Antibacterials against Planktonic and Biofilm Forms of *Staphylococcus aureus*", Journal of Medicinal Chemistry, US, (Nov. 4, 2018), vol. 61, No. 23, doi:10.1021/acs.jmedchem.8b01293, ISSN 0022-2623, pp. 10651-10664, XP055706488.

Kunkle, "Antibiotic Discovery Targeting Bacterial Groel/Groes Chaperonin Systems", Master's Thesis, US, (Aug. 1, 2018), URL: https://scholarworks.iupui.edu/bitstream/handle/1805/17427/Thesis%20for%20MS%20Trent%20A%20Kunkle.pdf?sequence=3&isAllowed=y, (Jun. 18, 2020), XP055706480.

PCT International Search Report and Written Opinion completed by the ISA/US on Feb. 2, 2022 and issued in connection with PCT/US2021/056565.

Pubchem, Substance Record for SID 385643875, Available Date: Sep. 23, 2019 [retrieved on Nov. 30, 2021). Retrieved from the Internet: <URL: https://pubchem.ncbi.nlm.nih.gov/substance/385643875>.entire document.

\* cited by examiner

ANALOGS OF NITROFURAN ANTIBIOTICS TO COMBAT RESISTANCE

CROSS-REFERENCE TO RELATED APPLICATIONS

This application is a divisional application of U.S. patent application Ser. No. 17/365,390, filed on Jul. 1, 2021, which claims the benefit of U.S. Provisional Application Ser. No. 63/048,017, filed Jul. 3, 2020, the contents of which are hereby incorporated by reference in their entirety.

GOVERNMENT SUPPORT CLAUSE

This invention was made with government support under GM120350 awarded by National Institutes of Health. The government has certain rights in the invention.

TECHNICAL FIELD

The present disclosure relates to certain compounds and methods of killing or inhibiting the growth of bacteria. Specifically, the compounds target GroEL/ES protein complex.

BACKGROUND

The rise of antibiotic-resistant bacteria has become a significant threat to human health worldwide. This has been recently re-emphasized by the Centers for Disease Control and Prevention (CDC) in their 2019 report titled "Antibiotic Resistance Threats in the United States". In the US alone, more than 2.8 million infections by antibiotic resistant bacteria occur annually, with 35,000 deaths. Of particular prominence is a subset of bacteria referred to as the ESKAPE pathogens—an acronym that represents Gram-positive *Enterococcus faecium* and *Staphylococcus aureus* bacteria, and Gram-negative *Klebsiella pneumonia*, *Acinetobacter baumannii*, *Pseudomonas aeruginosa*, and *Enterobacter* species. While several classes of antibiotics that target diverse biological pathways have been successfully used to treat these bacteria for decades, we are in an era where derivatizing analogs to circumvent bacterial resistance has led to diminishing returns for developing effective new clinical candidates. In some instances, bacterial strains have emerged that are resistant to all contemporary antibacterials, as well as older, more toxic drugs that clinicians are reverting to in more desperate situations (e.g. polymyxins). To counter the diminishing antibacterial pipeline, it is crucial that new antibacterial candidates are developed that function through unexploited biological pathways. Furthermore, of particular urgency is to identify new antibiotic candidates that are effective against Gram-negative bacteria, since their lipopolysaccharide (LPS) outer membranes and efficient efflux pumps make them highly impermeable and intrinsically resistant to many antibacterial agents.

To circumvent pre-disposed resistance mechanisms, there is a need for new antibacterials that function through new mechanisms of action and against previously unexploited pathways.

SUMMARY

In one aspect, the disclosure relates to a compound of the formula I

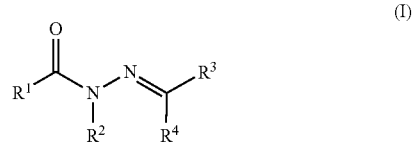

wherein $R^1$ is $C_6$-$C_{10}$ aryl, biaryl, or mono- or bicyclic heteroaryl, wherein each hydrogen atom in $C_6$-$C_{10}$ aryl, biaryl, or mono- or bicyclic heteroaryl is optionally substituted with halogen, $-OR^5$, $-NR^5R^6$, $-S(O)_2NR^5R^6$, or $-N(R^5)SO_2R^6$;

$R^2$ is hydrogen;

or $R^1$ and $R^2$ combine with the atoms to which they are attached to form a 3- to 7-membered heterocycloalkyl optionally substituted by oxo;

$R^3$ is $C_6$-$C_{10}$ aryl, biaryl, or mono- or bicyclic heteroaryl, wherein each hydrogen atom in $C_6$-$C_{10}$ aryl, biaryl, and heteroaryl is optionally substituted by $-OR^5$ or nitro;

$R^4$ is hydrogen;

$R^5$ and $R^6$ are each individually hydrogen, $C_1$-$C_6$ alkyl, $C_6$-$C_{10}$ aryl, or mono- or bicyclic heteroaryl, wherein each hydrogen atom in $C_1$-$C_6$ alkyl, aryl, and heteroaryl is optionally substituted with halogen or $-OC_1$-$C_6$ alkyl;

or a pharmaceutically acceptable salt thereof.

In some aspects, the compound is not

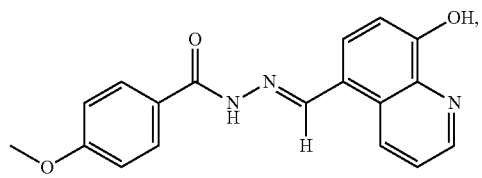

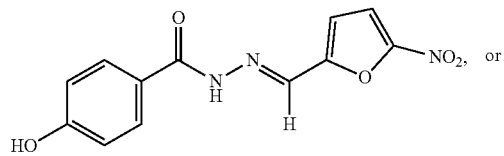

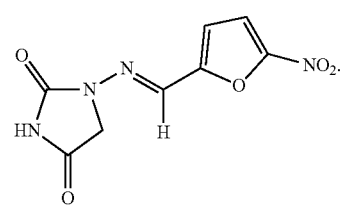

In another aspect, the disclosure relates to a compound or a pharmaceutically acceptable salt thereof, having the formula II

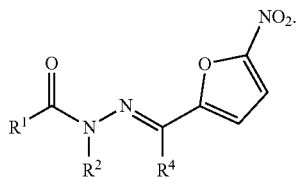

(II)

In another aspect, the disclosure relates to a compound or a pharmaceutically acceptable salt thereof, having the formula III

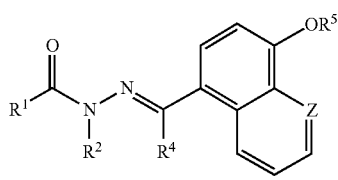

(III)

wherein Z is CH or N.

Additional embodiments, features, and advantages of the disclosure will be apparent from the following detailed description and through practice of the disclosure. The compounds of the present disclosure can be described as embodiments in any of the following enumerated clauses. It will be understood that any of the embodiments described herein can be used in connection with any other embodiments described herein to the extent that the embodiments do not contradict one another.

1. A compound of formula (I):

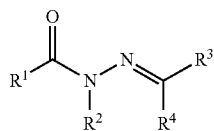

(I)

wherein
$R^1$ is $C_6$-$C_{10}$ aryl, biaryl, or mono- or bicyclic heteroaryl, wherein each hydrogen atom in $C_6$-$C_{10}$ aryl, biaryl, or mono- or bicyclic heteroaryl is optionally substituted with halogen, —$OR^5$, —$NR^5R^6$, —$S(O)_2NR^5R^6$, or —$N(R^5)SO_2R^6$;
$R^2$ is hydrogen;
or $R^1$ and $R^2$ combine with the atoms to which they are attached to form a 3- to 7-membered heterocycloalkyl optionally substituted by oxo;
$R^3$ is $C_6$-$C_{10}$ aryl, biaryl, or mono- or bicyclic heteroaryl, wherein each hydrogen atom in $C_6$-$C_{10}$ aryl, biaryl, and mono- or bicyclic heteroaryl is optionally substituted by —$OR^5$ or nitro;
$R^4$ is hydrogen;
$R^5$ and $R^6$ are each individually hydrogen, $C_1$-$C_6$ alkyl, $C_6$-$C_{10}$ aryl, or mono- or bicyclic heteroaryl, wherein each hydrogen atom in $C_1$-$C_6$ alkyl, $C_6$-$C_{10}$ aryl, and mono- or bicyclic heteroaryl is optionally substituted with halogen or —$OC_1$-$C_6$ alkyl;

or a pharmaceutically acceptable salt thereof, provided the compound is not

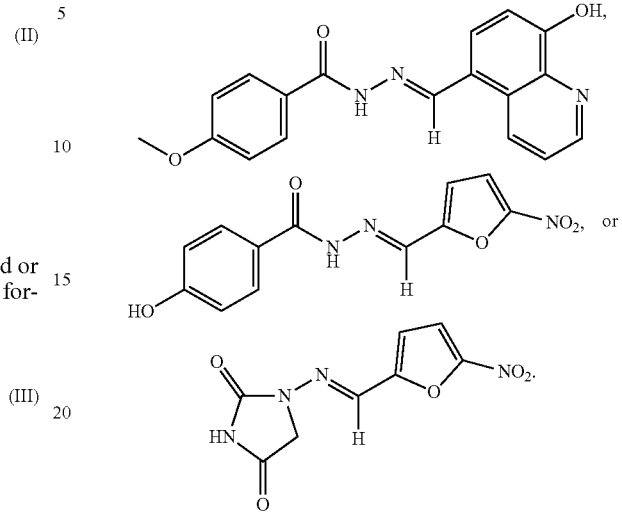

2. The compound of clause 1, or a pharmaceutically acceptable salt thereof, wherein $R^3$ is mono- or bicyclic heteroaryl optionally substituted by nitro.

3. The compound of clause 1, or a pharmaceutically acceptable salt thereof, wherein $R^3$ is quinolyl optionally substituted by —$OR^5$.

4. The compound of clause 1, or a pharmaceutically acceptable salt thereof, wherein $R^3$ is napthyl optionally substituted by —$OR^5$.

5. The compound of clause 1, or a pharmaceutically acceptable salt thereof, wherein $R^3$ is furanyl optionally substituted by nitro.

6. The compound of clause 1, having the formula (II)

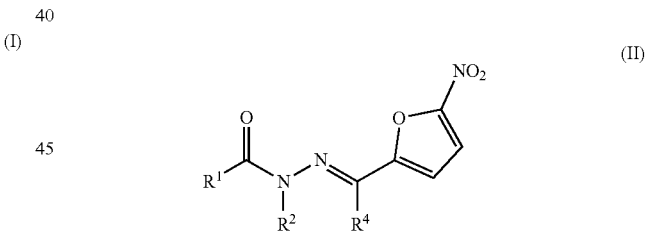

(II)

or a pharmaceutically acceptable salt thereof.

7. The compound of clause 1, having the formula (III)

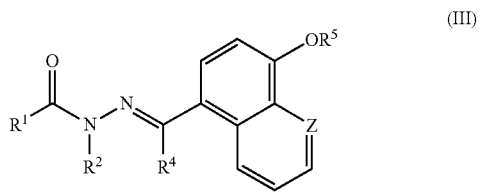

(III)

wherein Z is CH or N;
or a pharmaceutically acceptable salt thereof.

8. The compound of any of the preceding clauses, or a pharmaceutically acceptable salt thereof, wherein $R^1$ is monocylic heteroaryl optionally substituted with halogen.

9. The compound of any one of clauses 1-7, or a pharmaceutically acceptable salt thereof, wherein $R^1$ is $C_6$-$C_{10}$ aryl optionally substituted with halo, —$OR^5$, —$NR^5R^6$, —$S(O)_2NR^5R^6$, or —$N(R^5)SO_2R^6$.

10. The compound of clause 7, wherein $R^1$ is $C_6$-$C_{10}$ aryl optionally substituted by —OH, —$OC_1$-$C_6$ alkyl, O-aryl, —$N(C_1$-$C_6$ alkyl$)_2$, —$S(O)_2N(C_1$-$C_6$ alkyl$)_2$, —$N(H)S(O)_2$—$C_6$-$C_{10}$ aryl, —$N(H)S(O)_2$-monocylic heteroaryl, or —$N(H)S(O)_2$-bicylic heteroaryl, wherein each hydrogen atom in $C_6$-$C_{10}$ aryl, or mono- or bicyclic heteroaryl is optionally substituted with halogen or —$OC_1$-$C_6$ alkyl.

11. The compound of any one of clauses 1-5, or a pharmaceutically acceptable salt thereof, wherein $R^1$ is biaryl.

12. The compound of clause 1, or a pharmaceutically acceptable salt thereof, selected from the group consisting of

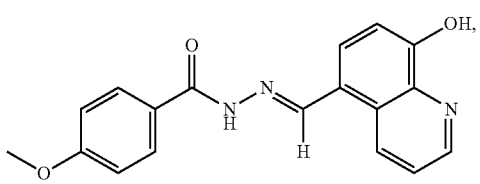

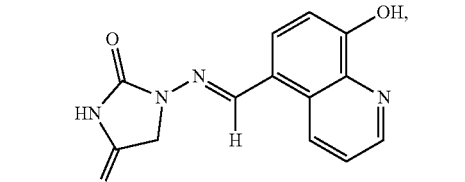

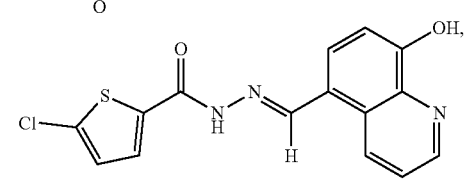

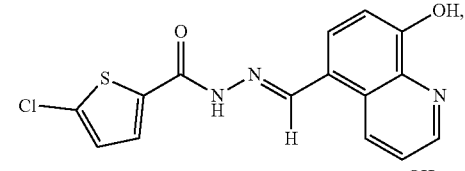

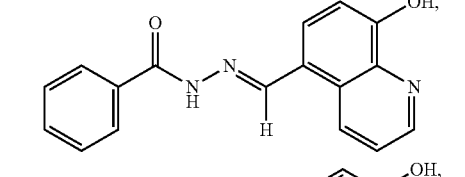

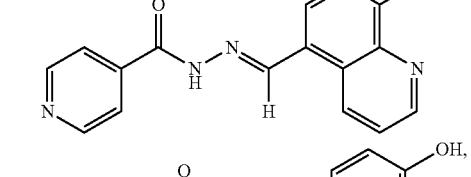

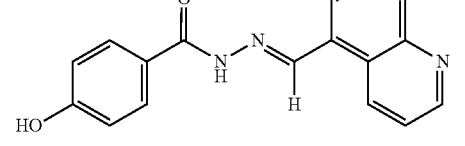

-continued

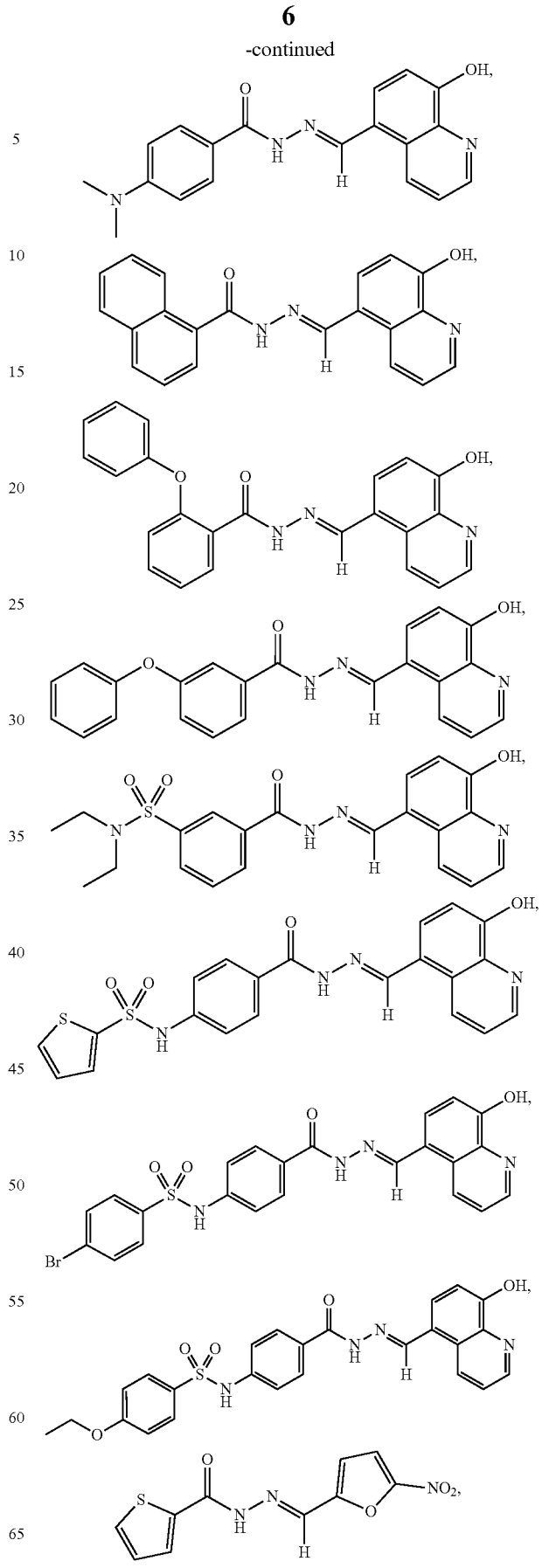

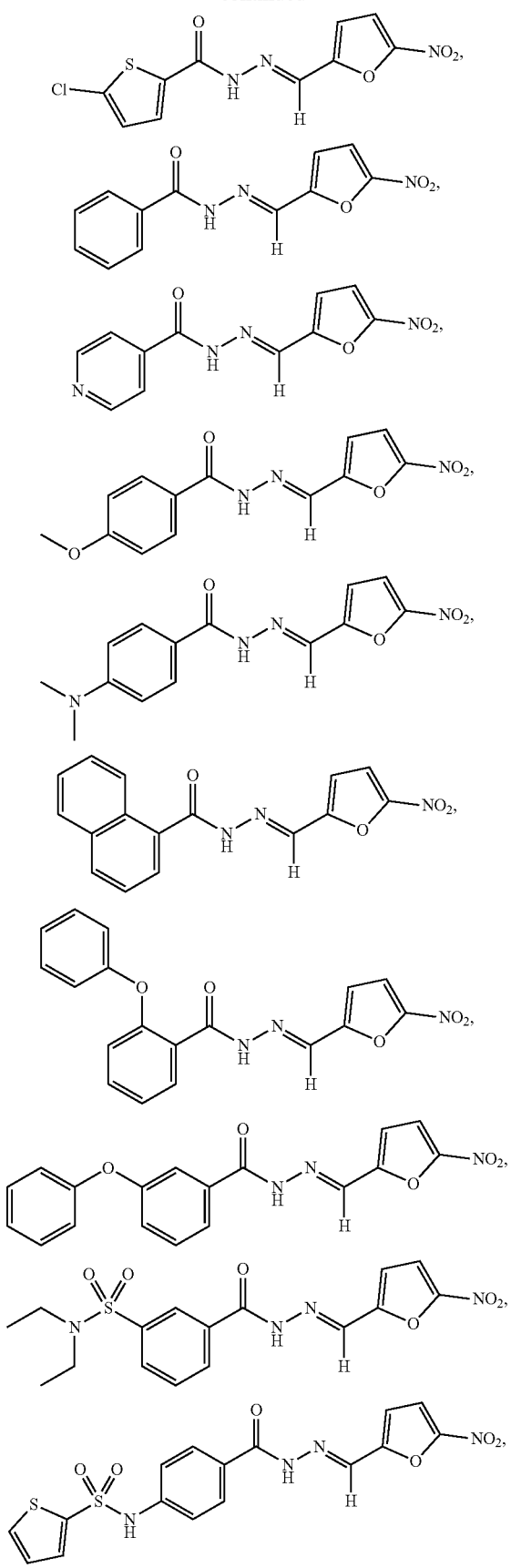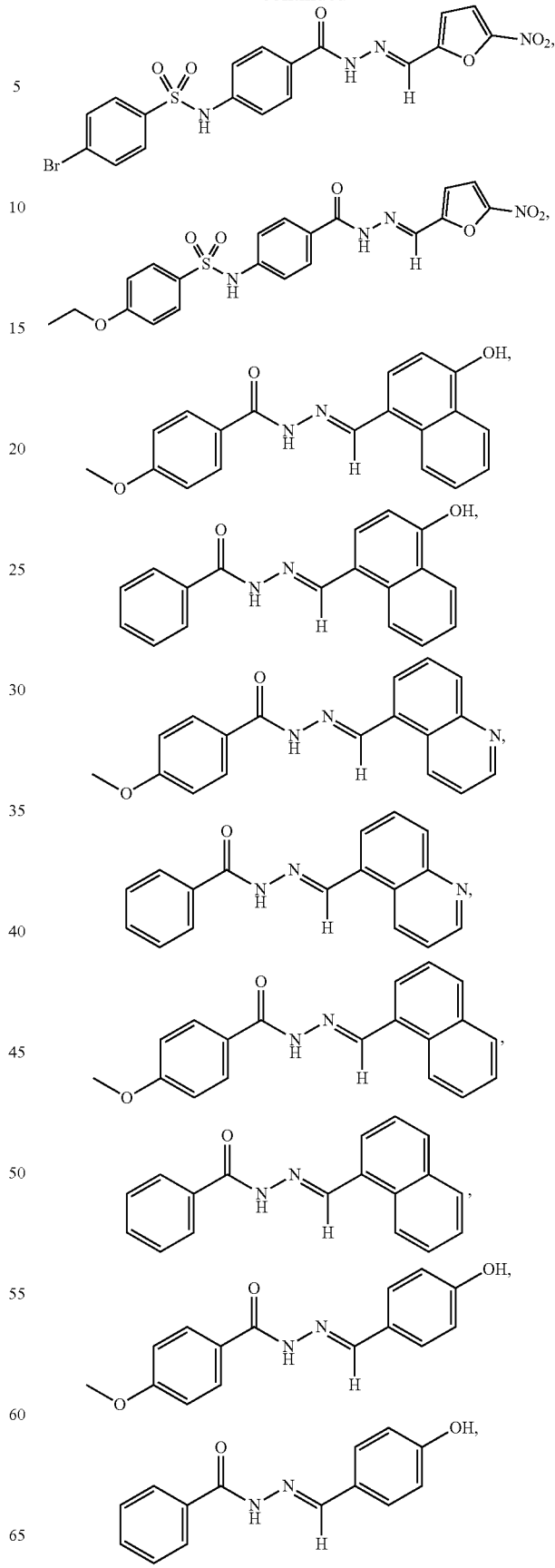

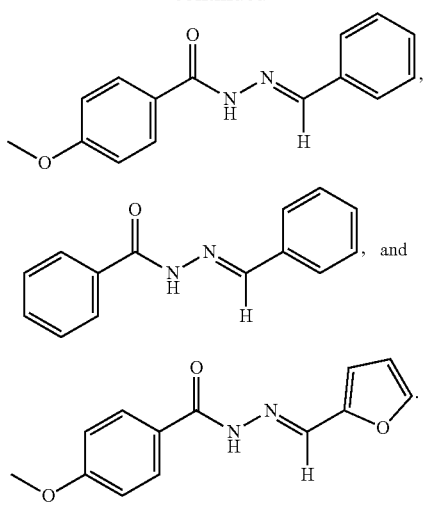
13. The compound of clause 12, or a pharmaceutically acceptable salt thereof, selected from the group consisting of
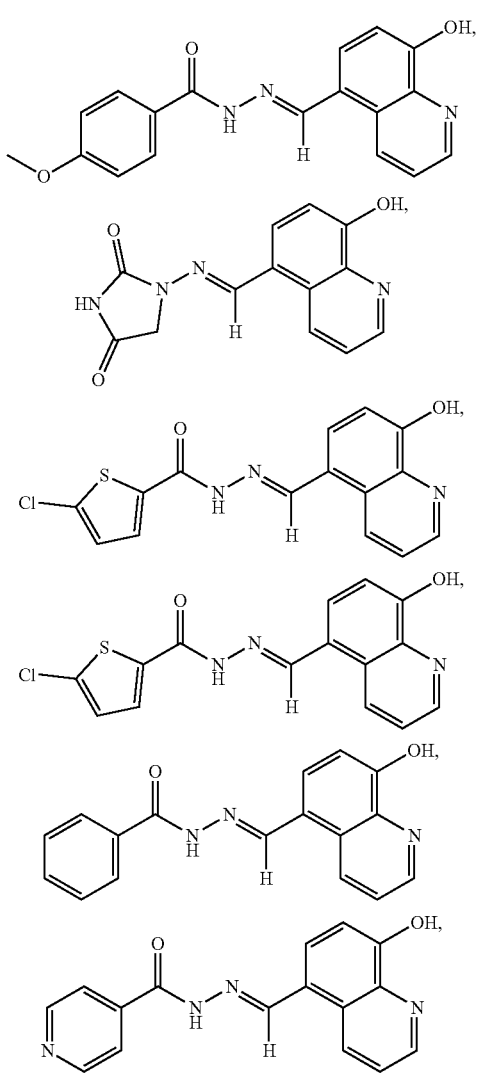
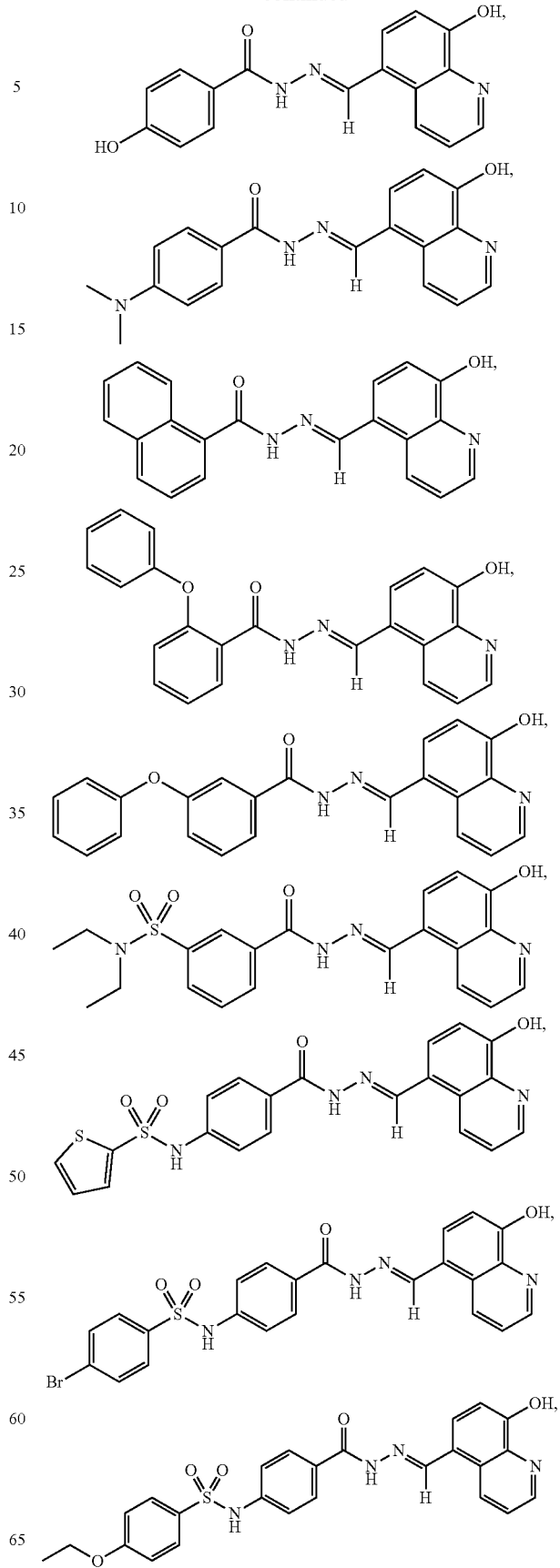

-continued
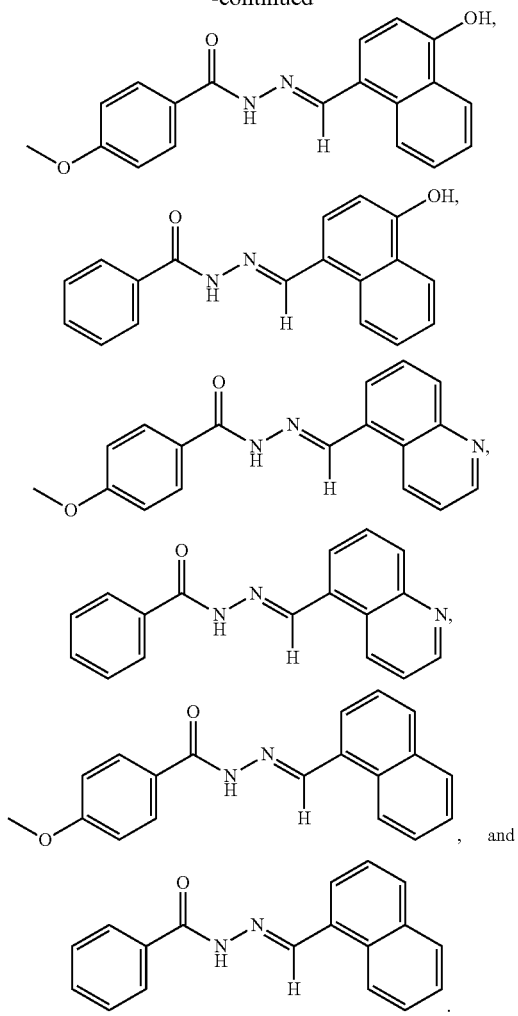
14. The compound of clause 11, or a pharmaceutically acceptable salt thereof, selected from the group consisting of
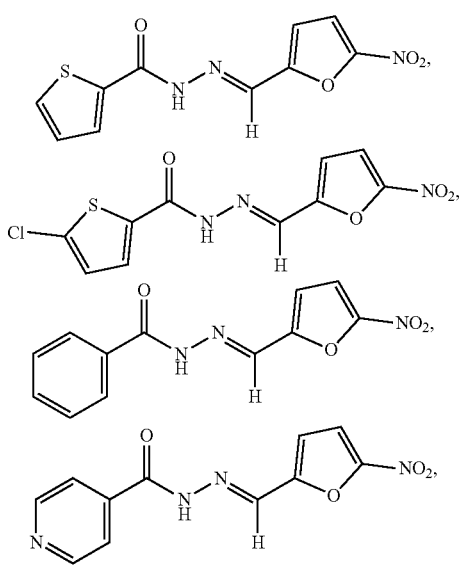
-continued
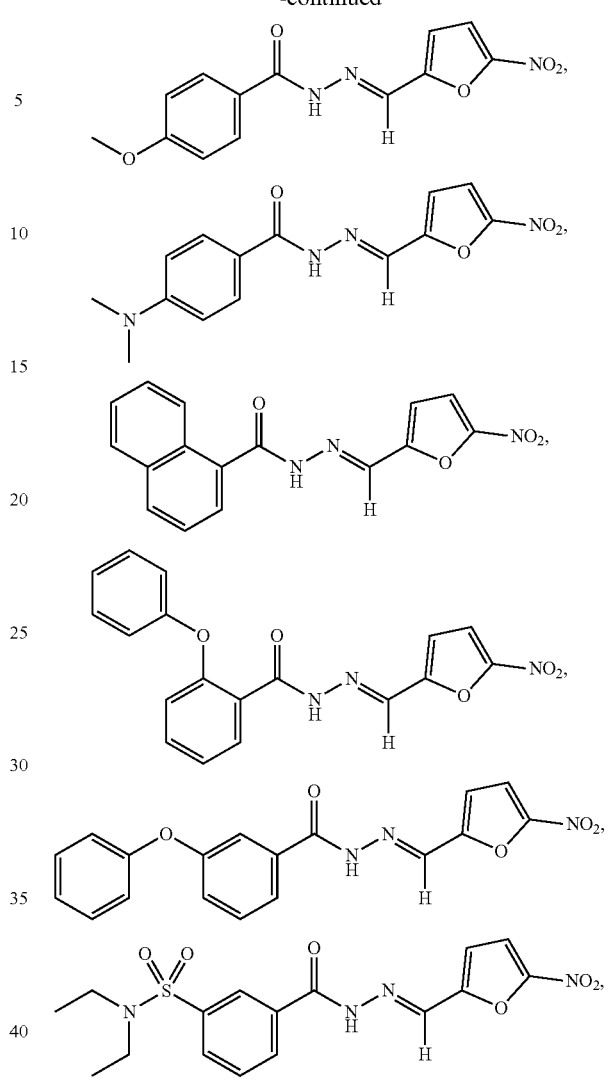
and
15. The compound of clause 10, or a pharmaceutically acceptable salt thereof, selected from the group consisting of
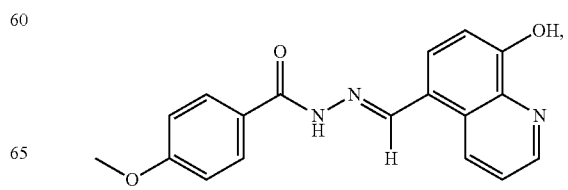

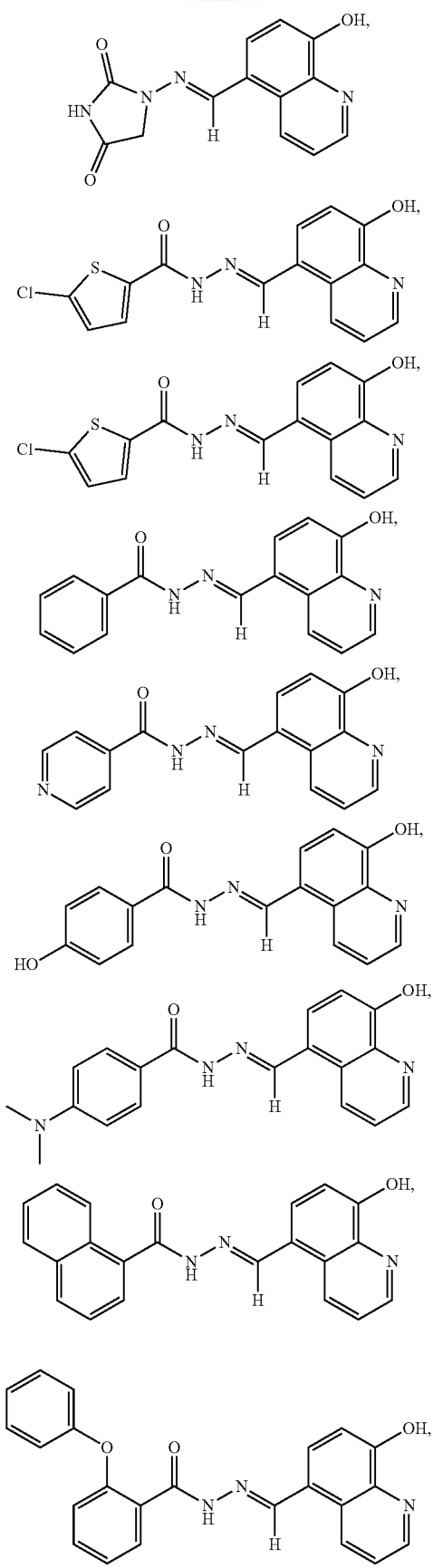
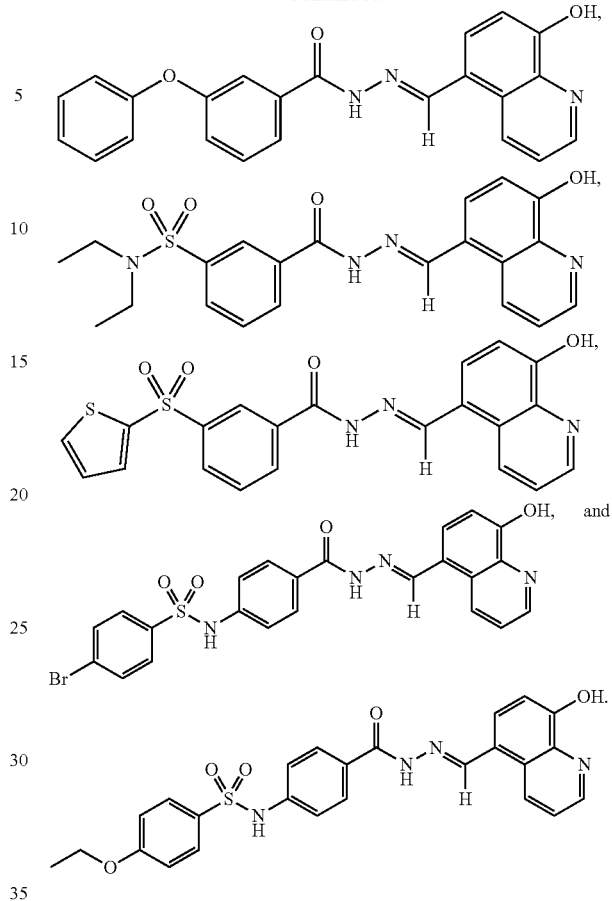
16. The compound of clause 13, or a pharmaceutically acceptable salt thereof, selected from the group consisting of
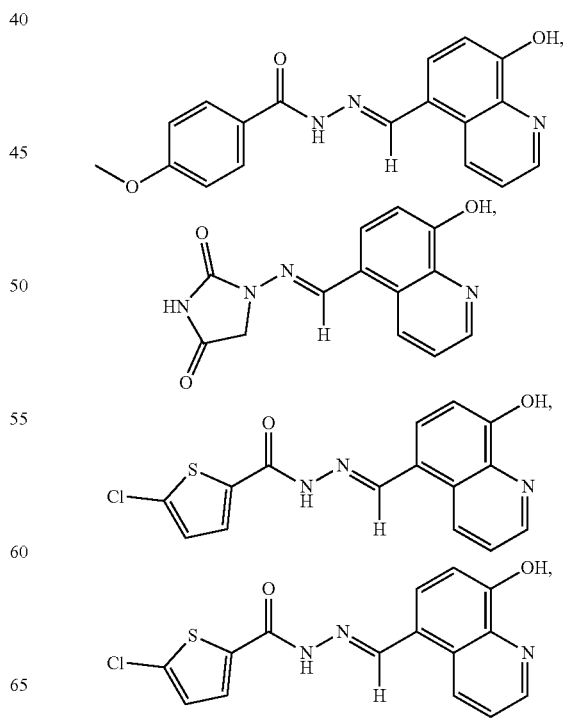

-continued

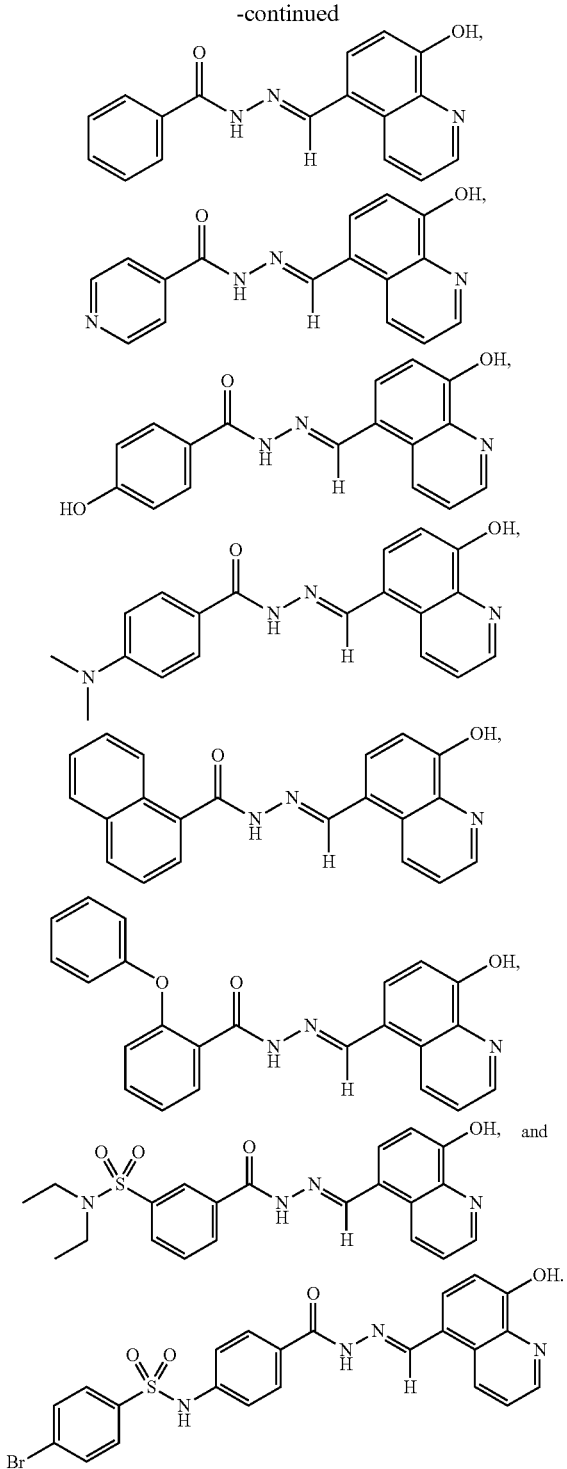

17. A pharmaceutical composition comprising a compound of any one of the preceding clauses, or a pharmaceutically acceptable salt thereof, and optionally at least one diluent, carrier or excipient.

18. A method of treating a bacterial infection comprising administering to a subject in need of such treatment an effective amount of at least one compound of any one of clauses 1 to 16, or a pharmaceutically acceptable salt thereof.

BRIEF DESCRIPTION OF THE DRAWINGS

FIGS. 1A, 1B, and 1C are graphs showing correlation plots of $IC_{50}$ values for nitrofuran analogs and hydroxyquinoline analogs evaluated in the respective biochemical assays, wherein FIG. 1A shows the inhibitor potencies in the GroEL/ES-dMDH and the GroEL/ES-dRho refolding assays, FIG. 1B shows the inhibitor potencies in the native Rho and the native MDH assays, and FIG. 1C shows the inhibitor potencies in the GroEL/ES-dMDH refolding assay with and without the E. coli NfsB nitroreductase.

FIGS. 2A, 2B, and 2C are graphs showing the correlation plots of inhibitor potency of hydroxyquinoline analogs and nitrofuran analogs in the in situ NfsB-GroEL/ES-dMDH refolding assay and in the presence of various bacterium, wherein FIG. 2A shows the inhibition of E. faecium, FIG. 2B shows the inhibition of S. aureus, and FIG. 2C shows the inhibition of E. coli.

FIGS. 3A, 3B, and 3C are graphs showing correlation plots examining the selectivity of hydroxyquinoline analogs and nitrofuran analogs inhibiting the proliferation of various bacterium over the cytotoxicity to human FHs 74 Int small intestine cells, wherein FIG. 3A shows the inhibition of E. faecium, FIG. 3B shows the inhibition of S. aureus, and FIG. 3C shows the inhibition of E. coli.

FIGS. 4A, 4B, and 4C are graphs showing the ability of E. coli to generate resistance to various inhibitors over time, wherein FIG. 4A shows the resistance to nifuroxazide, FIG. 4B shows resistance to nitrofurantoin, and FIG. 4C shows the resistance to compound 17.

FIGS. 5A, 5B, and 5C are graphs showing dose-response curves for various inhibitors tested against the susceptible parent E. coli (white triangle), the maximally-resistant strain of E. coli developed to the respective inhibitor (black triangle), and follow-up proliferation assays for the resistant strain of E. coli tested after serial passaging in the absence of the inhibitor (grey triangle), wherein FIG. 5A shows the curve for nifuroxazide, FIG. 5B shows the curve for nitrofurantoin, and FIG. 5C shows the curve for compound 17.

FIGS. 6A, 6B, and 6C are graphs showing dose-responsive curves for various inhibitors tested against resistant E. coli strains, wherein FIG. 6A shows the curve for nifuroxazide resistant E. coli, FIG. 6B shows the curve for nitrofurantoin resistant E. coli, and FIG. 6C shows the curve for compound 17 resistant E coli.

FIGS. 7A, 7B, and 7C are graphs showing correlation plots examining the selectivity of hydroxyquinoline analogs and nitrofuran analogs inhibiting the proliferation of various bacterium over the cytotoxicity to human FHC colon cells, wherein FIG. 7A shows the inhibition of E. faecium, FIG. 7B shows the inhibition of S. aureus, and FIG. 7C shows the inhibition of E. coli.

FIGS. 8A, 8B, and 8C are graphs showing dose-response curves for various inhibitors tested against the susceptible parent E. coli (white triangle), the maximally-resistant strain of E. coli developed to the respective inhibitor (black triangle), and follow-up proliferation assays for the resistant strain of E. coli tested after serial passaging in the absence of the inhibitor (grey triangle), wherein FIG. 8A shows the curve for nifuroxazide, FIG. 8B shows the curve for nitrofurantoin, and FIG. 8C shows the curve for compound 17.

FIGS. 9A, 9B, and 9C are graphs showing dose-responsive curves for various inhibitors tested against resistant E. coli strains, wherein FIG. 9A shows the curve for nifuroxazide resistant E. coli, FIG. 9B shows the curve for nitrofurantoin resistant *E. coli*, and FIG. 9C shows the curve for compound 17 resistant *E coli*.

DETAILED DESCRIPTION

Figure 1A:
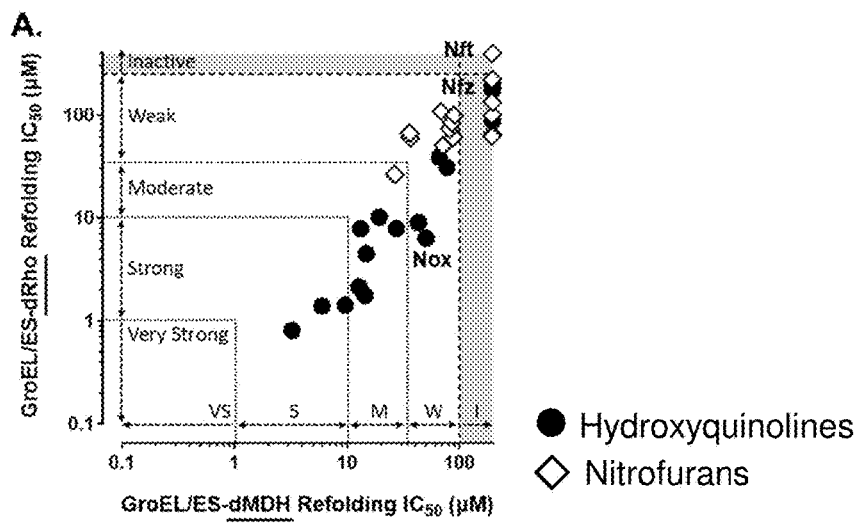

Before the present disclosure is further described, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as is commonly understood by one of ordinary skill in the art to which this disclosure belongs. All patents, applications, published applications, and other publications referred to herein are incorporated by reference in their entireties. If a definition set forth in this section is contrary to or otherwise inconsistent with a definition set forth in a patent, application, or other publication that is herein incorporated by reference, the definition set forth in this section prevails over the definition incorporated herein by reference.

Except as otherwise noted, the methods and techniques of the present embodiments are generally performed according to conventional methods well known in the art and as described in various general and more specific references that are cited and discussed throughout the present specification. See, e.g., Loudon, Organic Chemistry, Fourth Edition, New York: Oxford University Press, 2002, pp. 360-361, 1084-1085; Smith and March, March's Advanced Organic Chemistry: Reactions, Mechanisms, and Structure, Fifth Edition, Wiley-Interscience, 2001.

Chemical nomenclature for compounds described herein has generally been derived using the commercially-available ACD/Name 2014 (ACD/Labs) or ChemBioDraw Ultra 19.1 (Perkin Elmer).

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination. All combinations of the embodiments pertaining to the chemical groups represented by the variables are specifically embraced by the present disclosure and are disclosed herein just as if each and every combination was individually and explicitly disclosed, to the extent that such combinations embrace compounds that are stable compounds (i.e., compounds that can be isolated, characterized, and tested for biological activity). In addition, all subcombinations of the chemical groups listed in the embodiments describing such variables are also specifically embraced by the present disclosure and are disclosed herein just as if each and every such sub-combination of chemical groups was individually and explicitly disclosed herein.

Definitions

As used herein, the term "alkyl" includes a chain of carbon atoms, which is optionally branched and contains from 1 to 20 carbon atoms. It is to be further understood that in certain embodiments, alkyl may be advantageously of limited length, including $C_1$-$C_{12}$, $C_1$-$C_{10}$, $C_1$-$C_9$, $C_1$-$C_8$, $C_1$-$C_7$, $C_1$-$C_6$, and $C_1$-$C_4$. Illustratively, such particularly limited length alkyl groups, including $C_1$-$C_8$, $C_1$-$C_7$, $C_1$-$C_6$; and $C_1$-$C_4$, and the like may be referred to as "lower alkyl." Illustrative alkyl groups include, but are not limited to, methyl, ethyl, n-propyl, isopropyl, n-butyl, isobutyl, sec-butyl, tert-butyl, pentyl, 2-pentyl, 3-pentyl, neopentyl, hexyl, heptyl, octyl, and the like. Alkyl may be substituted or unsubstituted. Typical substituent groups include cycloalkyl, aryl, heteroaryl, heteroalicyclic, hydroxy, alkoxy, aryloxy, mercapto, alkylthio, arylthio, cyano, halo, carbonyl, oxo, (═O), thiocarbonyl, O-carbamyl, N-carbamyl, O-thiocarbamyl, N-thiocarbamyl, C-amido, N-amido, N-sulfamido, C-carboxy, O-carboxy, nitro, and amino, or as described in the various embodiments provided herein. It will be understood that "alkyl" may be combined with other groups, such as those provided above, to form a functionalized alkyl. By way of example, the combination of an "alkyl" group, as described herein, with a "carboxy" group may be referred to as a "carboxyalkyl" group. Other non-limiting examples include hydroxyalkyl, aminoalkyl, and the like.

As used herein, the term "aryl" refers to an all-carbon monocyclic or fused-ring polycyclic groups of 6 to 12 carbon atoms having a completely conjugated pi-electron system. It will be understood that in certain embodiments, aryl may be advantageously of limited size such as $C_6$-$C_{10}$ aryl. Illustrative aryl groups include, but are not limited to, phenyl, naphthylenyl and anthracenyl. The aryl group may be a biaryl group containing two fused rings, for example napthyl. The aryl group may be unsubstituted, or substituted as described for alkyl or as described in the various embodiments provided herein.

As used herein, the term "heterocycloalkyl" refers to a monocyclic or fused ring group having in the ring(s) from 3 to 12 ring atoms, in which at least one ring atom is a heteroatom, such as nitrogen, oxygen or sulfur, the remaining ring atoms being carbon atoms. Heterocycloalkyl may optionally contain 1, 2, 3 or 4 heteroatoms. A heterocycloalkyl group may be fused to another group such as another heterocycloalkyl or a heteroaryl group. Heterocycloalkyl may also have one of more double bonds, including double bonds to nitrogen (e.g., C═N or N═N) but does not contain a completely conjugated pi-electron system. It will be understood that in certain embodiments, heterocycloalkyl may be advantageously of limited size such as 3- to 7-membered heterocycloalkyl, 5- to 7-membered heterocycloalkyl, 3-, 4-, 5- or 6-membered heterocycloalkyl, and the like. Heterocycloalkyl may be unsubstituted, or substituted as described for alkyl or as described in the various embodiments provided herein. Illustrative heterocycloalkyl groups include, but are not limited to, oxiranyl, thianaryl, azetidinyl, oxetanyl, tetrahydrofuranyl, pyrrolidinyl, tetrahydropyranyl, piperidinyl, 1,4-dioxanyl, morpholinyl, 1,4-dithianyl, piperazinyl, oxepanyl, 3,4-dihydro-2H-pyranyl, 5,6-dihydro-2H-pyranyl, 2H-pyranyl, 1, 2, 3, 4-tetrahydropyridinyl, and the like. Illustrative examples of heterocycloalkyl groups shown in graphical representations include the following entities, in the form of properly bonded moieties:

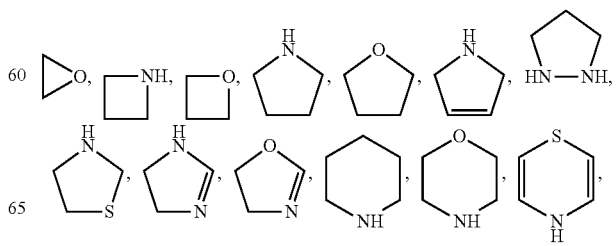

-continued

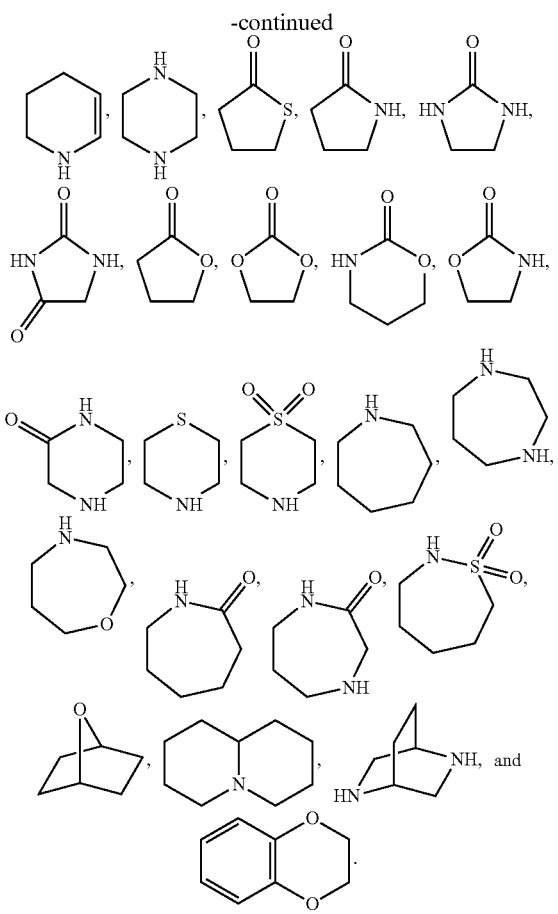

As used herein, the term "heteroaryl" refers to a monocyclic or fused ring group of 5 to 12 ring atoms containing one, two, three or four ring heteroatoms selected from nitrogen, oxygen and sulfur, the remaining ring atoms being carbon atoms, and also having a completely conjugated pi-electron system. It will be understood that in certain embodiments, heteroaryl may be advantageously of limited size such as 3- to 7-membered heteroaryl, 5- to 7-membered heteroaryl, and the like. Heteroaryl may be unsubstituted, or substituted as described for alkyl or as described in the various embodiments provided herein. Illustrative heteroaryl groups include, but are not limited to, pyrrolyl, furanyl, thiophenyl, imidazolyl, oxazolyl, thiazolyl, pyrazolyl, pyridinyl, pyrimidinyl, quinolinyl, isoquinolinyl, purinyl, tetrazolyl, triazinyl, pyrazinyl, tetrazinyl, quinazolinyl, quinoxalinyl, thienyl, isoxazolyl, isothiazolyl, oxadiazolyl, thiadiazolyl, triazolyl, benzimidazolyl, benzoxazolyl, benzthiazolyl, benzisoxazolyl, benzisothiazolyl and carbazolyl, and the like. Illustrative examples of heteroaryl groups shown in graphical representations, include the following entities, in the form of properly bonded moieties:

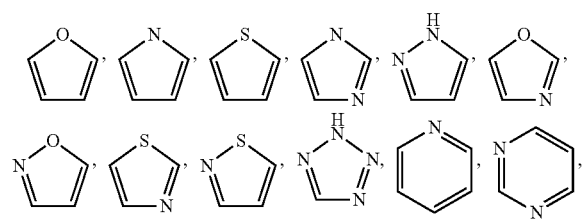

-continued

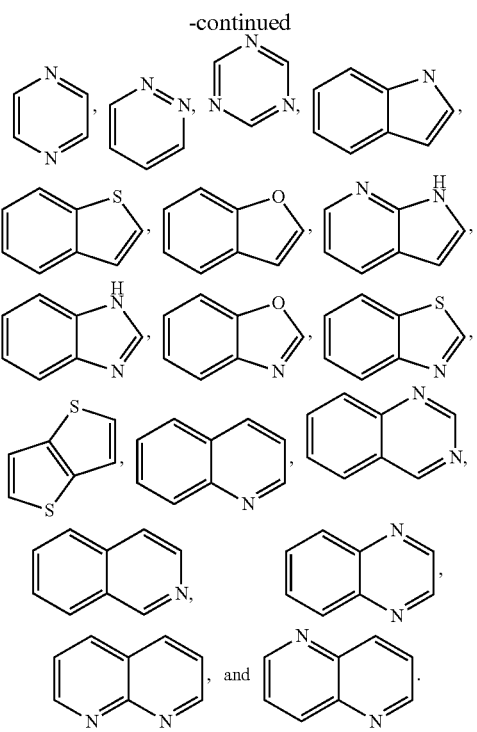

As used herein, "hydroxy" or "hydroxyl" refers to an —OH group.

As used herein, "alkoxy" refers to both an —O-(alkyl) or an —O-(unsubstituted cycloalkyl) group. Representative examples include, but are not limited to, methoxy, ethoxy, propoxy, butoxy, cyclopropyloxy, cyclobutyloxy, cyclopentyloxy, cyclohexyloxy, and the like.

The term "oxo" represents a carbonyl oxygen. For example, a cyclopentyl substituted with oxo is cyclopentanone.

As used herein, "halogen" refers to fluorine, chlorine, bromine, or iodine.

As used herein, "optional" or "optionally" means that the subsequently described event or circumstance may but need not occur, and that the description includes instances where the event or circumstance occurs and instances in which it does not. For example, "wherein each hydrogen atom in $C_6$-$C_{10}$ aryl, biaryl, or mono- or bicyclic heteroaryl is optionally substituted with halogen" means that a halogen may be but need not be present on any of the $C_6$-$C_{10}$ aryl, biaryl, or mono- or bicyclic heteroaryl by replacement of a hydrogen atom for each halogen group, and the description includes situations where the $C_6$-$C_{10}$ aryl, biaryl, or mono- or bicyclic heteroaryl is substituted with a halogen group and situations where $C_6$-$C_{10}$ aryl, biaryl, or mono- or bicyclic heteroaryl is not substituted with the halogen group.

As used herein, "independently" means that the subsequently described event or circumstance is to be read on its own relative to other similar events or circumstances. For example, in a circumstance where several equivalent hydrogen groups are optionally substituted by another group described in the circumstance, the use of "independently optionally" means that each instance of a hydrogen atom on the group may be substituted by another group, where the groups replacing each of the hydrogen atoms may be the same or different. Or for example, where multiple groups exist all of which can be selected from a set of possibilities, the use of "independently" means that each of the groups can be selected from the set of possibilities separate from any other group, and the groups selected in the circumstance may be the same or different.

As used herein, the phrase "$R^1$ and $R^2$ combine with the atoms to which they are attached to form a 3- to 7-membered heterocycloalkyl optionally substituted by oxo" also means that $R^1$ and $R^2$ are taken together with the carbon or nitrogen atoms to which they are attached to form a a 3- to 7-membered heterocycloalkyl that is optionally substituted. In particular, "$R^1$ and $R^2$ combine with the atoms to which they are attached to form a 3- to 7-membered heterocycloalkyl optionally substituted by oxo:

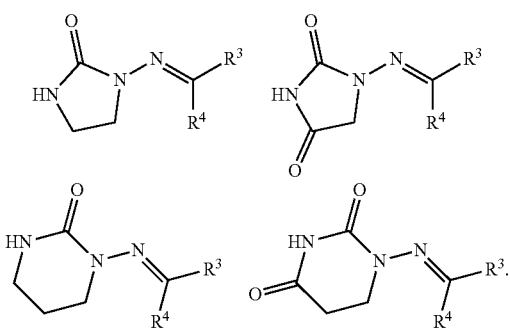

As used herein, the term "pharmaceutically acceptable salt" refers to those salts with counter ions which may be used in pharmaceuticals. See, generally, S. M. Berge, et al., "Pharmaceutical Salts," J. Pharm. Sci., 1977, 66, 1-19. Preferred pharmaceutically acceptable salts are those that are pharmacologically effective and suitable for contact with the tissues of subjects without undue toxicity, irritation, or allergic response. A compound described herein may possess a sufficiently acidic group, a sufficiently basic group, both types of functional groups, or more than one of each type, and accordingly react with a number of inorganic or organic bases, and inorganic and organic acids, to form a pharmaceutically acceptable salt. Such salts include:

(1) acid addition salts, which can be obtained by reaction of the free base of the parent compound with inorganic acids such as hydrochloric acid, hydrobromic acid, nitric acid, phosphoric acid, sulfuric acid, and perchloric acid and the like, or with organic acids such as acetic acid, oxalic acid, (D) or (L) malic acid, maleic acid, methane sulfonic acid, ethanesulfonic acid, p-toluene-sulfonic acid, salicylic acid, tartaric acid, citric acid, succinic acid or malonic acid and the like; or (2) salts formed when an acidic proton present in the parent compound either is replaced by a metal ion, e.g., an alkali metal ion, an alkaline earth ion, or an aluminum ion; or coordinates with an organic base such as ethanolamine, diethanolamine, triethanolamine, trimethamine, N-methylglucamine, and the like.

Pharmaceutically acceptable salts are well known to those skilled in the art, and any such pharmaceutically acceptable salt may be contemplated in connection with the embodiments described herein. Examples of pharmaceutically acceptable salts include sulfates, pyrosulfates, bisulfates, sulfites, bisulfites, phosphates, monohydrogen-phosphates, dihydrogenphosphates, metaphosphates, pyrophosphates, chlorides, bromides, iodides, acetates, propionates, decanoates, caprylates, acrylates, formates, isobutyrates, caproates, heptanoates, propiolates, oxalates, malonates, succinates, suberates, sebacates, fumarates, maleates, butyne-1,4-dioates, hexyne-1,6-dioates, benzoates, chlorobenzoates, methylbenzoates, dinitrobenzoates, hydroxybenzoates, methoxybenzoates, phthalates, sulfonates, methylsulfonates, propylsulfonates, besylates, xylenesulfonates, naphthalene-1-sulfonates, naphthalene-2-sulfonates, phenylacetates, phenylpropionates, phenylbutyrates, citrates, lactates, γ-hydroxybutyrates, glycolates, tartrates, and mandelates. Lists of other suitable pharmaceutically acceptable salts are found in Remington's Pharmaceutical Sciences, 17th Edition, Mack Publishing Company, Easton, Pa., 1985.

The present disclosure also relates to pharmaceutically active metabolites of compounds of Formula I, II, or III and uses of such metabolites in the methods of the disclosure. A "pharmaceutically active metabolite" means a pharmacologically active product of metabolism in the body of a compound of Formula I, II, or III, or salt thereof. Prodrugs and active metabolites of a compound may be determined using routine techniques known or available in the art. See, e.g., Bertolini et al., J. Med. Chem. 1997, 40, 2011-2016; Shan et al., J. Pharm. Sci. 1997, 86(7), 765-767; Bagshawe, Drug Dev. Res. 1995, 34, 220-230; Bodor, Adv. Drug Res. 1984, 13, 255-331; Bundgaard, Design of Prodrugs (Elsevier Press, 1985); and Larsen, Design and Application of Prodrugs, Drug Design and Development (Krogsgaard-Larsen et al., eds., Harwood Academic Publishers, 1991).

Any formula depicted herein is intended to represent a compound of that structural formula as well as certain variations or forms. For example, a formula given herein is intended to include a racemic form, or one or more enantiomeric, diastereomeric, or geometric isomers, or a mixture thereof. Additionally, any formula given herein is intended to refer also to a hydrate, solvate, or polymorph of such a compound, or a mixture thereof. For example, it will be appreciated that compounds depicted by a structural formula containing the symbol "∼∼∼" include both stereoisomers for the carbon atom to which the symbol "∼∼∼" is attached, specifically both the bonds "━━▬" and "⊪⊪⊪⊪" are encompassed by the meaning of "∼∼∼".

Any formula given herein is also intended to represent unlabeled forms as well as isotopically labeled forms of the compounds. Isotopically labeled compounds have structures depicted by the formulas given herein except that one or more atoms are replaced by an atom having a selected atomic mass or mass number. Examples of isotopes that can be incorporated into compounds of the disclosure include isotopes of hydrogen, carbon, nitrogen, oxygen, phosphorous, fluorine, chlorine, and iodine, such as $^2H$, $^3H$, $^{11}C$, $^{13}C$, $^{14}C$, $^{15}N$, $^{18}O$, $^{17}O$, $^{31}P$, $^{32}P$, $^{35}S$, $^{18}F$, $^{36}Cl$, and $^{125}I$, respectively. Such isotopically labelled compounds are useful in metabolic studies (preferably with $^{14}C$), reaction kinetic studies (with, for example $^2H$ or $^3H$), detection or imaging techniques [such as positron emission tomography (PET) or single-photon emission computed tomography (SPECT)] including drug or substrate tissue distribution assays, or in radioactive treatment of patients. Further, substitution with heavier isotopes such as deuterium (i.e., $^2H$) may afford certain therapeutic advantages resulting from greater metabolic stability, for example increased in vivo half-life or reduced dosage requirements. Isotopically labeled compounds of this disclosure and prodrugs thereof can generally be prepared by carrying out the procedures disclosed in the schemes or in the examples and preparations described below by substituting a readily available isotopically labeled reagent for a non-isotopically labeled reagent.

Any disubstituent referred to herein is meant to encompass the various attachment possibilities when more than one of such possibilities are allowed. For example, reference to disubstituent -A-B-, where A≠B, refers herein to such disubstituent with A attached to a first substituted member and B attached to a second substituted member, and it also refers to such disubstituent with A attached to the second substituted member and B attached to the first substituted member.

Representative Embodiments

Compounds described herein may be of the formula I

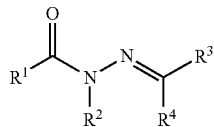

or a pharmaceutically acceptable salt thereof. In some embodiments, the compound may be of formula II

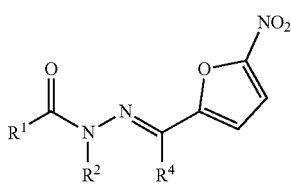

or a pharmaceutically acceptable salt thereof. In still other embodiments, the compound is of formula III

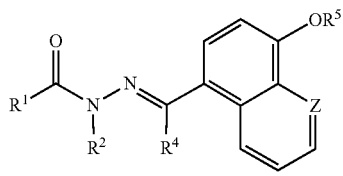

wherein Z is CH or N;
or a pharmaceutically acceptable salt thereof.

In illustrative embodiments, compounds of formula I do not include

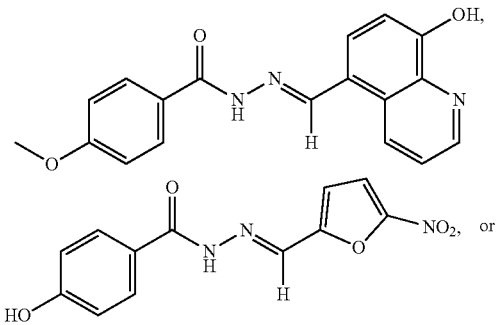

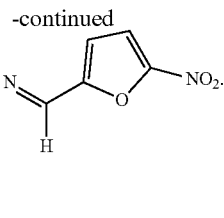

In some embodiments, $R^1$ is $C_6$-$C_{10}$ aryl, biaryl, or mono- or bicyclic heteroaryl. In some embodiments, $R^1$ is $C_6$-$C_{10}$ aryl or biaryl. In some embodiments, $R^1$ is $C_6$-$C_{10}$ aryl, biaryl, or monocyclic heteroaryl. In some embodiments, $R^1$ is $C_6$-$C_{10}$ aryl. In some embodiments, $R^1$ is $C_6$-$C_{10}$ biaryl. In some embodiments, $R^1$ is monocyclic heteroaryl. In some embodiments, $R^1$ is bicyclic heteroaryl. Illustratively, each hydrogen atom in $C_6$-$C_{10}$ aryl, biaryl, or mono- or bicyclic heteroaryl of $R^1$ is optionally substituted with halogen, —$OR^5$, —$NR^5R^6$, —$S(O)_2NR^5R^6$, or —$N(R^5)SO_2R^6$. In some embodiments, $R^1$ is monocylic heteroaryl optionally substituted with halogen. In some embodiments, $R^1$ is $C_6$-$C_{10}$ aryl optionally substituted with halo, —$OR^5$, —$NR^5R^6$, —$S(O)_2NR^5R^6$, or —$N(R^5)SO_2R^6$. In some embodiments, $R^1$ is $C_6$-$C_{10}$ aryl optionally substituted by —OH, —$OC_1$-$C_6$ alkyl, O-aryl, —$N(C_1$-$C_6$ alkyl$)_2$, —$S(O)_2N(C_1$-$C_6$ alkyl$)_2$, —$N(H)S(O)_2$—$C_6$-$C_{10}$ aryl, —$N(H)S(O)_2$-monocylic heteroaryl, or —$N(H)S(O)_2$-bicylic heteroaryl, wherein each hydrogen atom in $C_6$-$C_{10}$ aryl, or mono- or bicyclic heteroaryl is optionally substituted with halogen or —$OC_1$-$C_6$ alkyl. In some embodiments, a compound of formula I or a pharmaceutically acceptable salt thereof, wherein $R^1$ is biaryl.

In some embodiments, $R^2$ is hydrogen.

In still some embodiments, $R^1$ and $R^2$ combine with the atoms to which they are attached to form a 3- to 7-membered heterocycloalkyl. In some embodiments, the 3- to 7-membered heterocycloalkyl is substituted by oxo.

In some embodiments, $R^3$ is $C_6$-$C_{10}$ aryl, biaryl, or mono- or bicyclic heteroaryl. In some embodiments, $R^3$ is $C_6$-$C_{10}$ aryl, biaryl, or monocyclic heteroaryl. In some embodiments, $R^3$ is $C_6$-$C_{10}$ aryl or biaryl. In some embodiments, $R^3$ is $C_6$-$C_{10}$ aryl. In some embodiments, $R^3$ is $C_6$-$C_{10}$ biaryl. In some embodiments, $R^3$ is monocyclic heteroaryl. In some embodiments, $R^3$ is bicyclic heteroaryl.

In some embodiments, wherein $R^3$ is $C_6$-$C_{10}$ aryl, biaryl, or mono- or bicyclic heteroaryl, each hydrogen atom in aryl, biaryl, and heteroaryl is optionally substituted by —$OR^5$ or nitro. In some embodiments, each hydrogen atom in aryl, biaryl, and heteroaryl of $R^3$ is optionally substituted by —$OR^5$. In some embodiments, each hydrogen atom in aryl, biaryl, and heteroaryl of $R^3$ is optionally substituted by nitro. In some embodiments, $R^3$ is heteroaryl optionally substituted by nitro. In some embodiments, $R^3$ is quinolyl optionally substituted by —$OR^5$. In some embodiments, $R^3$ is furanyl optionally substituted by nitro.

In some embodiments, $R^4$ is hydrogen.

In some embodiments, $R^5$ and $R^6$ are each individually hydrogen, $C_1$-$C_6$ alkyl, $C_6$-$C_{10}$ aryl, or mono- or bicyclic heteroaryl, wherein each hydrogen atom in $C_1$-$C_6$ alkyl, aryl, and heteroaryl is optionally substituted with halogen or —$OC_1$-$C_6$ alkyl.

In some embodiments, $R^5$ is a hydrogen, $C_1$-$C_6$ alkyl, $C_6$-$C_{10}$ aryl, or mono- or bicyclic heteroaryl, wherein each hydrogen atom in $C_1$-$C_6$ alkyl, aryl, and heteroaryl is optionally substituted with halogen or —$OC_1$-$C_6$ alkyl. In some embodiments, $R^5$ is a hydrogen. In some embodiments, $R^5$ is a $C_1$-$C_6$ alkyl. In some embodiments, each hydrogen atom in $C_1$-$C_6$ alkyl is optionally substituted with halogen or —$OC_1$-$C_6$ alkyl.

In some embodiments, $R^5$ is $C_6$-$C_{10}$ aryl. In some embodiments, each hydrogen atom in the aryl is optionally substituted with halogen or —$OC_1$-$C_6$ alkyl. In some embodiments, $R^5$ is monocyclic heteroaryl. In some embodiments, each hydrogen of monocyclic heteroaryl is optionally substituted with halogen or —$OC_1$-$C_6$ alkyl. In some embodiments, $R^5$ is a bicyclic heteroaryl. In some embodiments, each hydrogen atom of bicyclic heteroaryl is optionally substituted with halogen or —$OC_1$-$C_6$ alkyl.

In some embodiments, $R^6$ is a hydrogen, $C_1$-$C_6$ alkyl, $C_6$-$C_{10}$ aryl, or mono- or bicyclic heteroaryl, wherein each hydrogen atom in $C_1$-$C_6$ alkyl, aryl, and heteroaryl is optionally substituted with halogen or —$OC_1$-$C_6$ alkyl. In some embodiments, $R^6$ is a hydrogen. In some embodiments, $R^6$ is a $C_1$-$C_6$ alkyl. In some embodiments, each hydrogen atom in $C_1$-$C_6$ alkyl is optionally substituted with halogen or —$OC_1$-$C_6$ alkyl.

In some embodiments, $R^6$ is $C_6$-$C_{10}$ aryl. In some embodiments, each hydrogen atom in the aryl is optionally substituted with halogen or —$OC_1$-$C_6$ alkyl. In some embodiments, $R^6$ is monocyclic heteroaryl. In some embodiments, each hydrogen of monocyclic heteroaryl is optionally substituted with halogen or —$OC_1$-$C_6$ alkyl. In some embodiments, $R^6$ is a bicyclic heteroaryl. In some embodiments, each hydrogen atom of bicyclic heteroaryl is optionally substituted with halogen or —$OC_1$-$C_6$ alkyl.

In some embodiments, the compound of formula I having the formula (II)

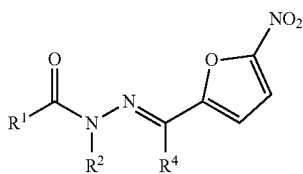

or a pharmaceutically acceptable salt thereof. In some embodiments, $R^1$ is $C_6$-$C_{10}$ aryl, biaryl, or mono- or bicyclic heteroaryl. In some embodiments, $R^1$ is $C_6$-$C_{10}$ aryl, biaryl, or monocyclic heteroaryl. In some embodiments, $R^1$ is $C_6$-$C_{10}$ aryl or biaryl. In some embodiments, $R^1$ is $C_6$-$C_{10}$ aryl. In some embodiments, $R^1$ is $C_6$-$C_{10}$ biaryl. In some embodiments, $R^1$ is monocyclic heteroaryl. In some embodiments, $R^1$ is bicyclic heteroaryl. In some embodiments, each hydrogen atom in $C_6$-$C_{10}$ aryl, biaryl, or mono- or bicyclic heteroaryl of $R^1$ is optionally substituted with halogen, —$OR^5$, —$NR^5R^6$, —$S(O)_2NR^5R^6$, or —$NR^5SO_2R^6$.

In some embodiments, $R^2$ is hydrogen. In some embodiments, $R^1$ and $R^2$ combine with the atoms to which they are attached to form a 3- to 7-membered heterocycloalkyl. In some embodiments, the 3- to 7-membered heterocycloalkyl is optionally substituted by oxo.

In some embodiments, $R^4$ is hydrogen.

In some embodiments, the compound of formula I, having the formula (III)

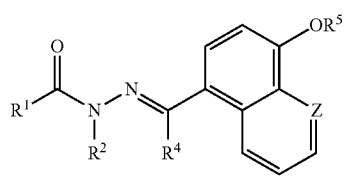

or a pharmaceutically acceptable salt thereof.

In some embodiments, wherein Z is CH or N;

In some embodiments, the compound is of formula I, formula II, or formula III or a pharmaceutically acceptable salt thereof, wherein $R^1$ is monocyclic heteroaryl optionally substituted with halogen. In some embodiments, the compound is of formula I, formula II, or formula III or a pharmaceutically acceptable salt thereof, wherein $R^1$ is $C_6$-$C_{10}$ aryl optionally substituted with halo, —$OR^5$, —$NR^5R^6$, —$S(O)_2NR^5R^6$, or —$NR^5SO_2R^6$.

In some embodiments, wherein the compound is formula III, wherein $R^1$ is $C_6$-$C_{10}$ aryl optionally substituted by —OH, —$OC_1$-$C_6$ alkyl, O-aryl, —$N(C_1$-$C_6$ alkyl$)_2$, —$S(O)_2N(C_1$-$C_6$ alkyl$)_2$, —$NHSO_2$-aryl, —$NHSO_2$-heteroaryl. In some embodiments, the aryl is optionally substituted with halogen or —$OC_1$-$C_6$ alkyl.

In some embodiments, the compound of formula I, or a pharmaceutically acceptable salt thereof, selected from the group consisting of

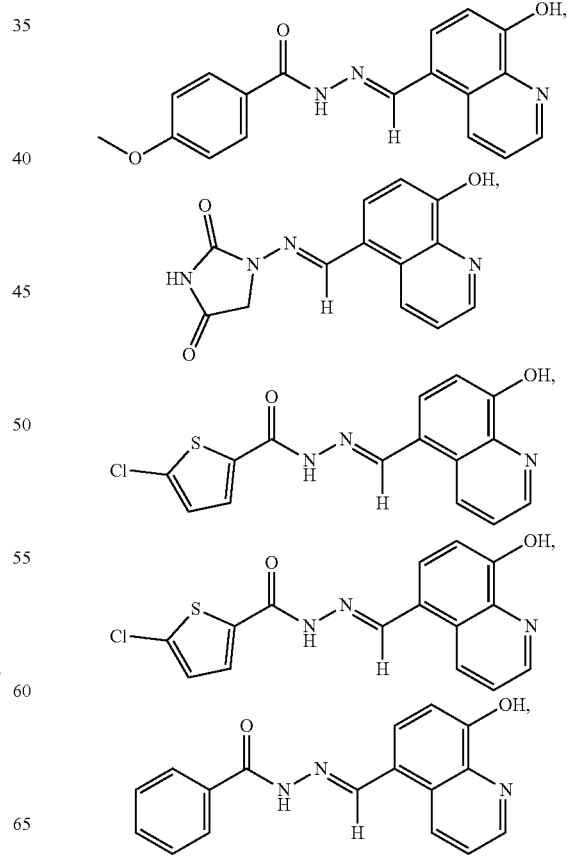

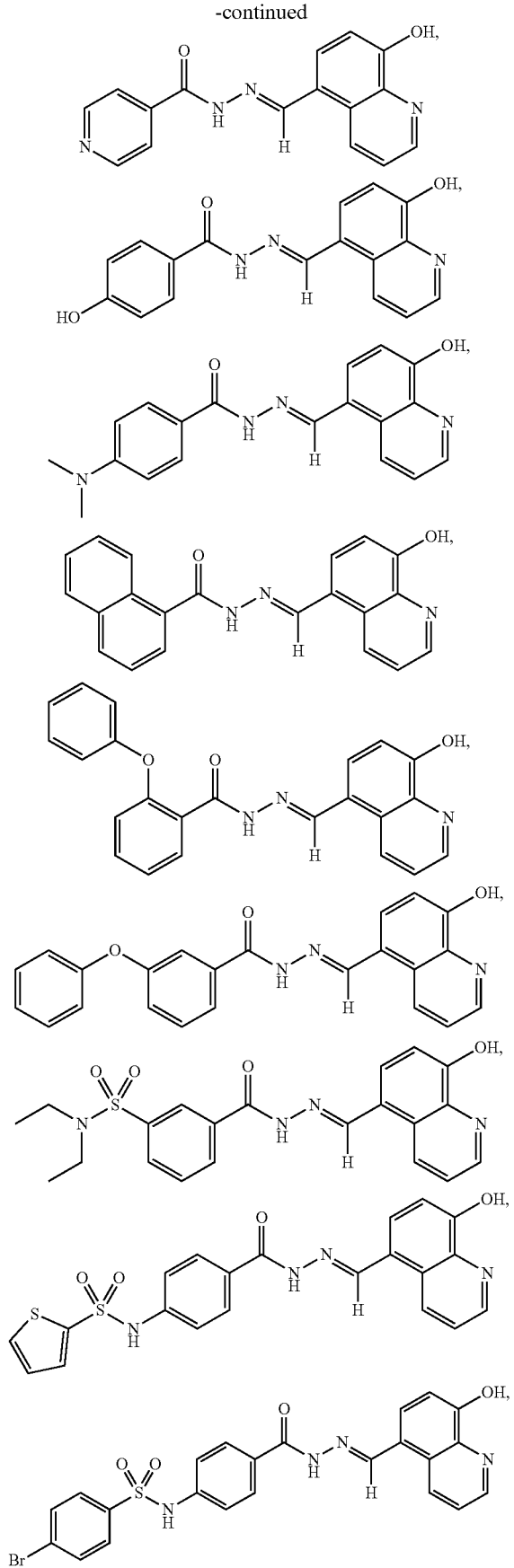
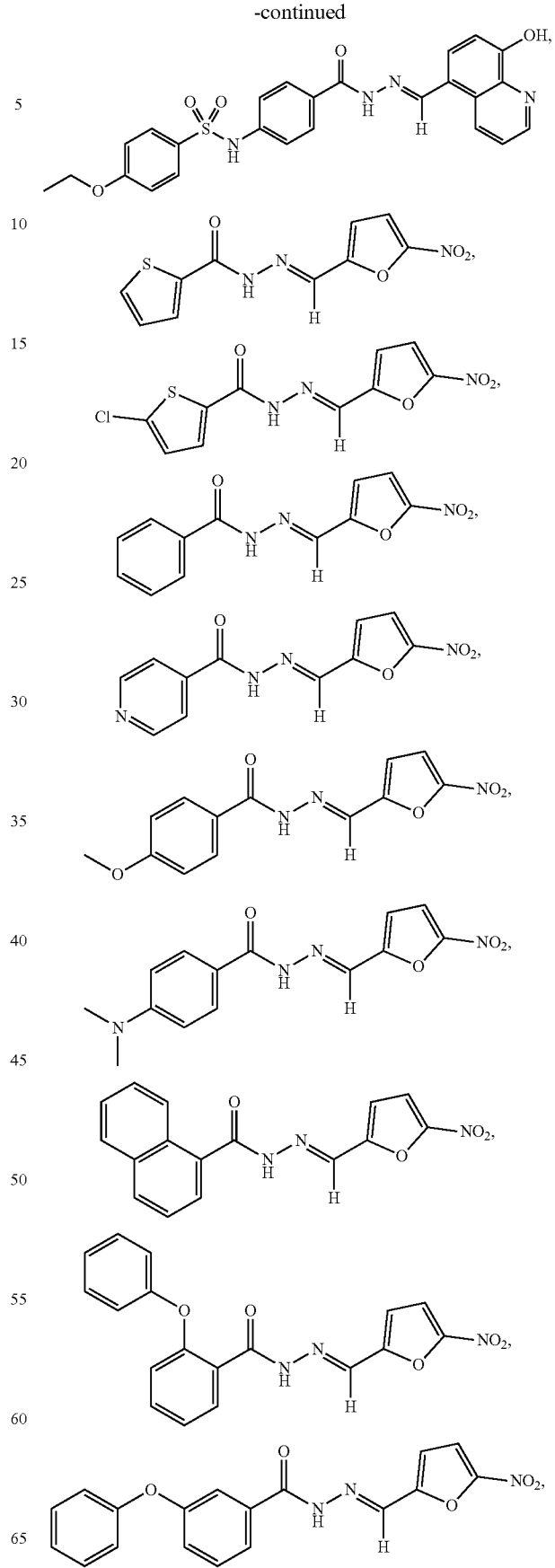

-continued
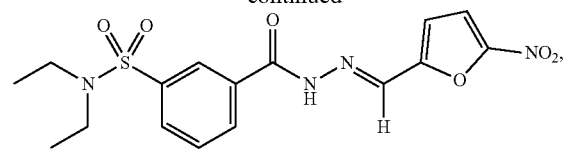
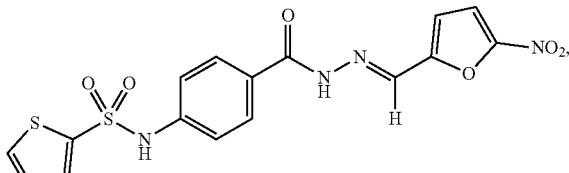
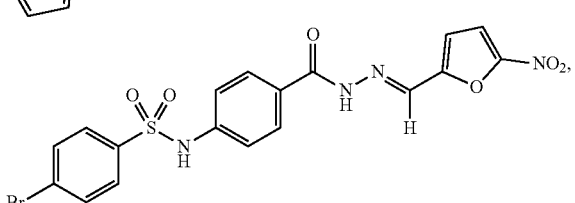
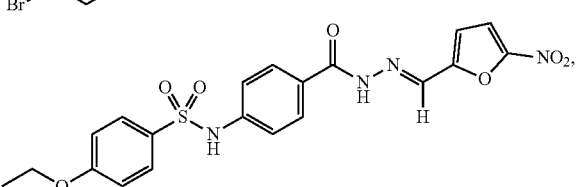
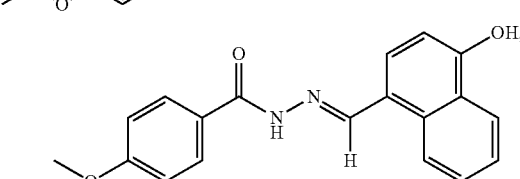
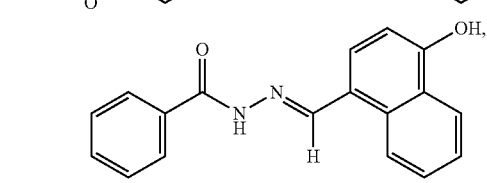
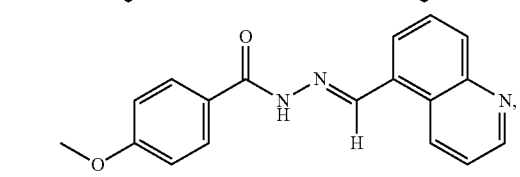
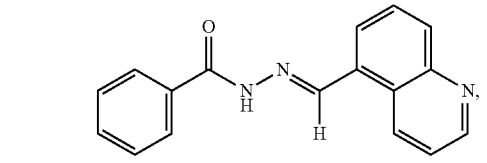
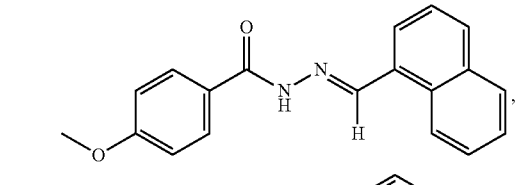
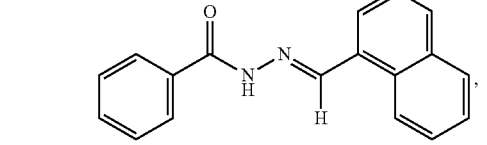
-continued
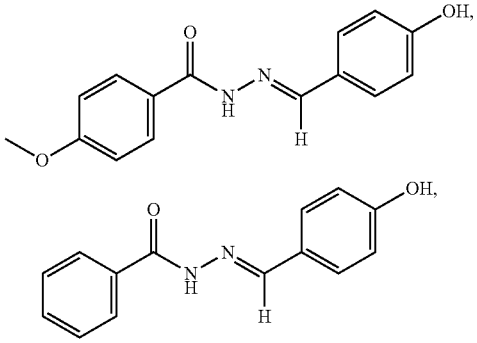
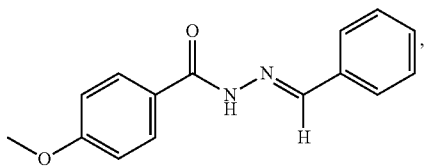
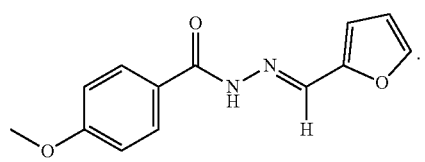 [SMILES: COc1ccc(C(=O)N/N=C/c2ccco2)cc1]
, and
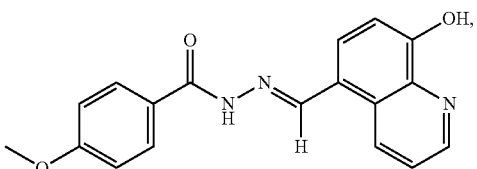
In some embodiments, the compound of formula III, or a pharmaceutically acceptable salt thereof, selected from the group consisting of
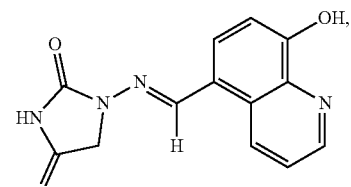
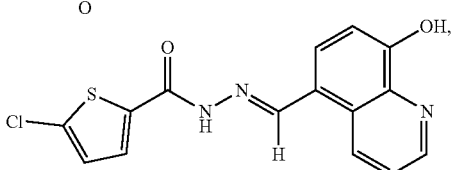
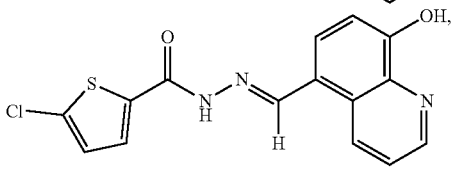

-continued
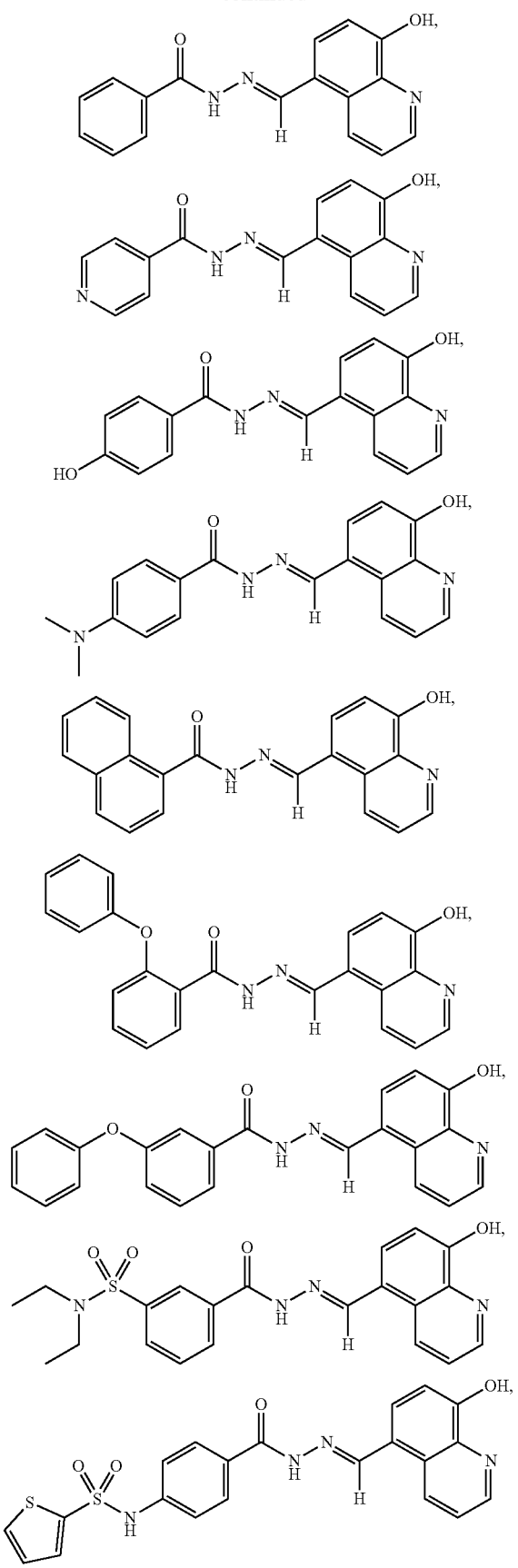
-continued
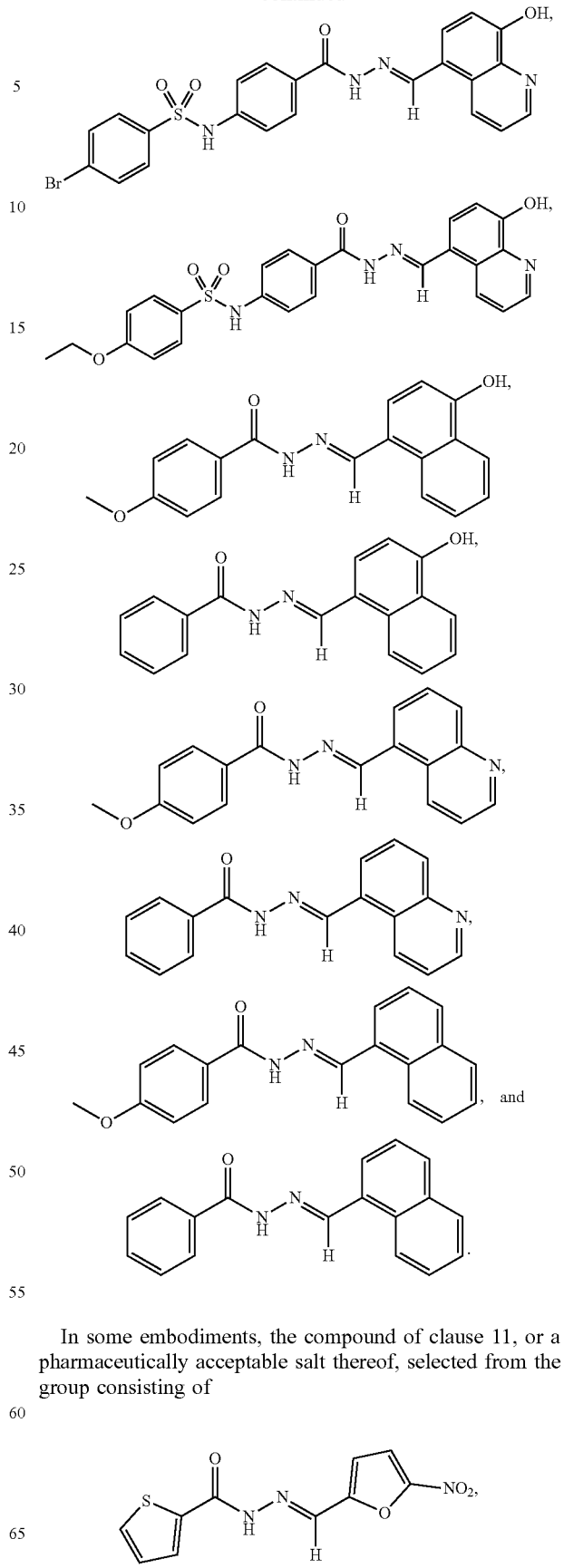
In some embodiments, the compound of clause 11, or a pharmaceutically acceptable salt thereof, selected from the group consisting of -continued
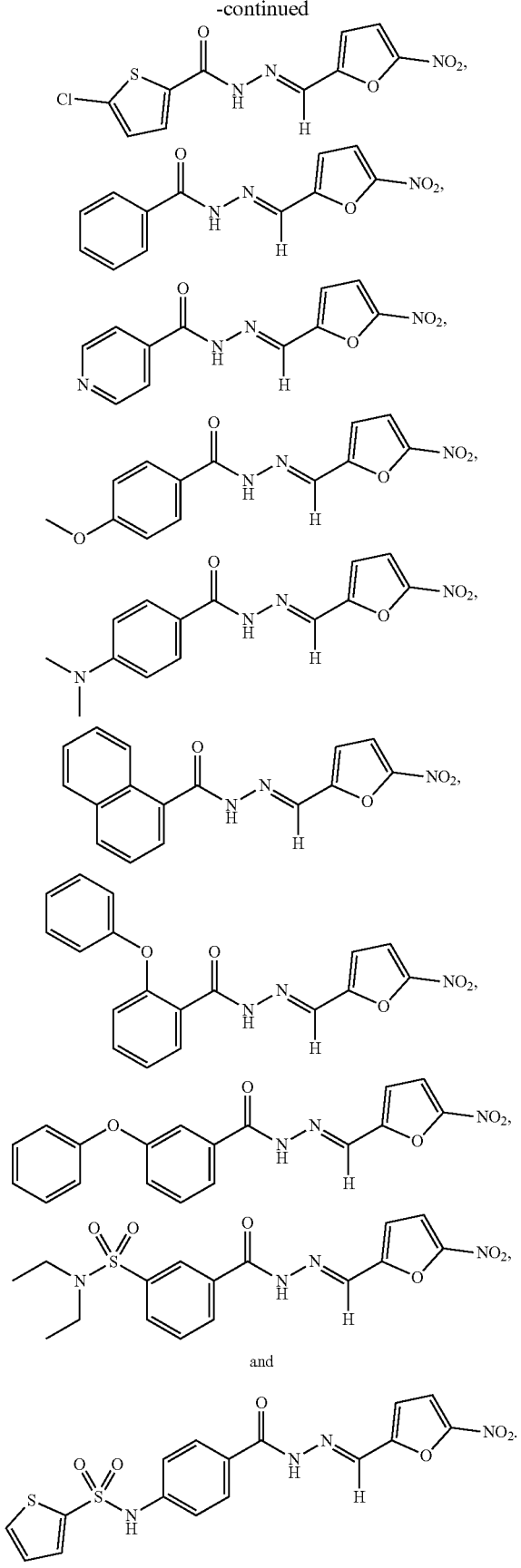
and
In some embodiments, the compound of clause 10, or a pharmaceutically acceptable salt thereof, selected from the group consisting of
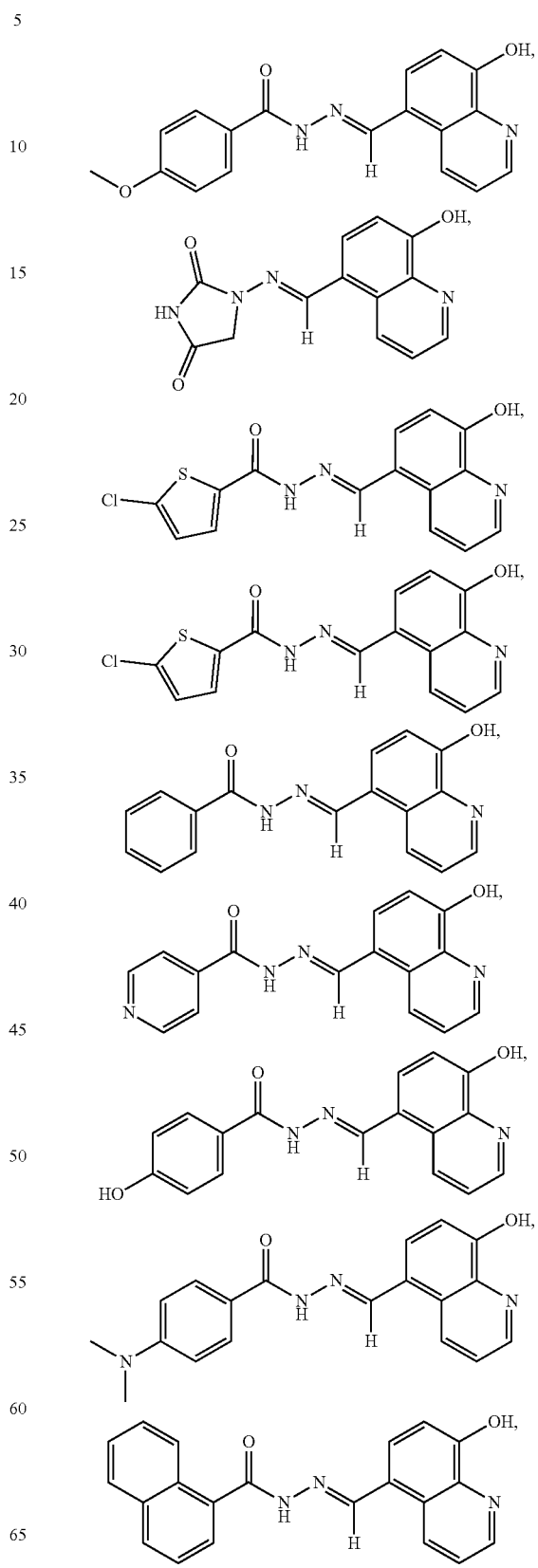

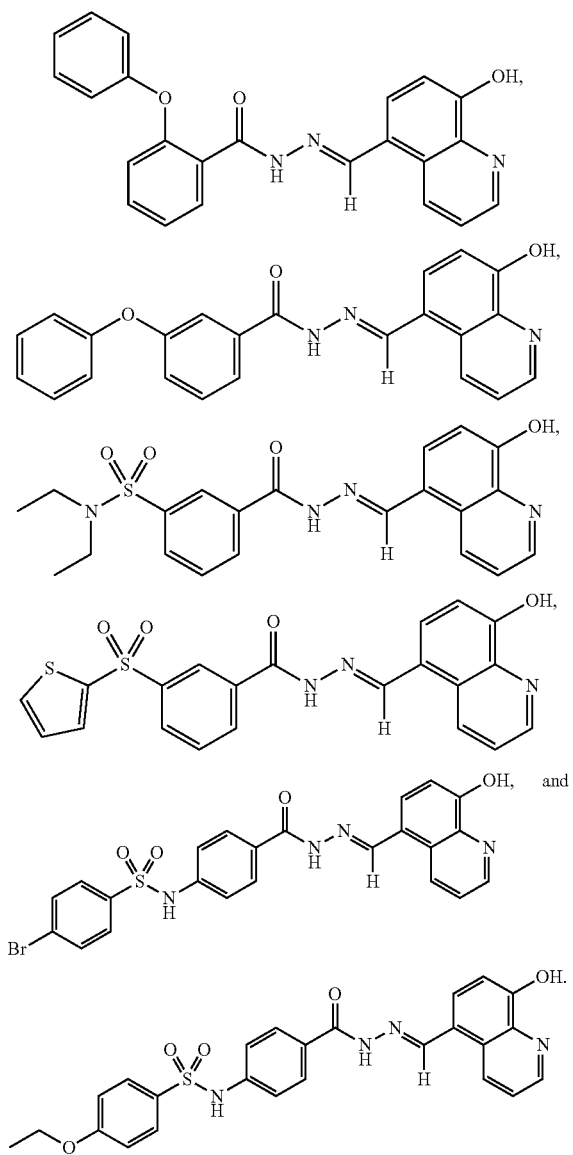
In some embodiments, the compound of clause 13, or a pharmaceutically acceptable salt thereof, selected from the group consisting of
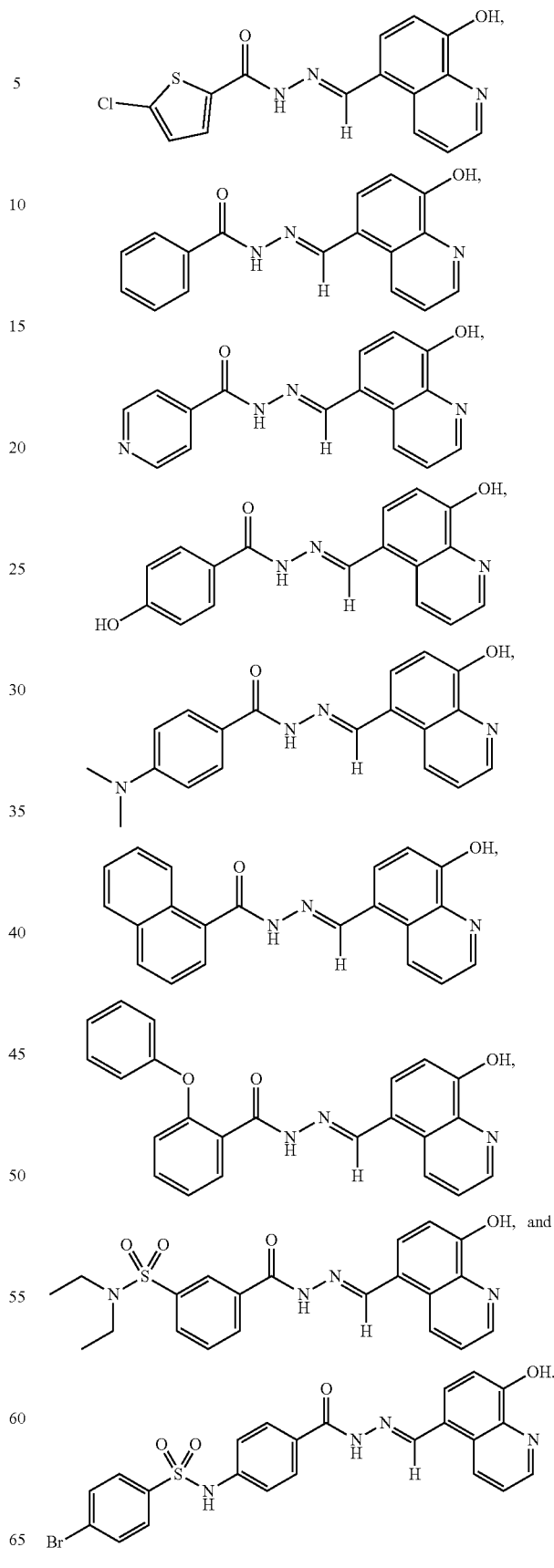

A pharmaceutical composition comprising a compound of formula I, formula II, formula III, or a pharmaceutically acceptable salt thereof, and optionally at least one diluent, carrier or excipient.

A method of treating a bacterial infection comprising administering to a subject in need of such treatment an effective amount of at least one compound of formula I, formula II, formula III, or a pharmaceutically acceptable salt thereof.

In some embodiments, a method of killing or inhibiting the growth of bacteria is provided. The method comprises contacting the bacteria with a compound of formula I or a pharmaceutically acceptable salt thereof.

In some embodiments, a method of inhibiting the GroEL/ES protein complex in a bacterium comprising contacting the bacterium with a compound of formula I, formula II, formula III, or a pharmaceutical acceptable salt thereof.

In some embodiments, a metabolite of formula I, formula II, formula III, or a pharmaceutically acceptable salt. In some embodiments, a method of inhibiting the growth of a bacterium with the metabolite of formula I, formula II, or formula III is provide comprising contacting the bacterium with a compound to the bacterium, wherein the bacteria metabolizes the compound to the metabolite.

In some embodiments, for any of the methods described, the bacterium is gram negative or gram positive. In some embodiments, the bacterium is gram negative. In some embodiments, the bacterium is gram positive.

The following represent illustrative embodiments of compounds of the formula I:

| Compound | Structure | Name |
|---|---|---|
| 1 | | N'-((8-hydroxyquinolin-5-yl)methylene)-4-methoxybenzohydrazide. |
| 2 | | 1-(((8-hydroxyquinolin-5-yl)methylene)amino)imidazolidine-2,4-dione |
| 3 | | N'-((8-hydroxyquinolin-5-yl)methylene)thiophene-2-carbohydrazide |
| 4 | | 5-chloro-N'-((8-hydroxyquinolin-5-yl)methylene)thiophene-2-carbohydrazide |
| 5 | | N'-((8-hydroxyquinolin-5-yl)methylene)benzohydrazide |
| 6 | | N'-((8-hydroxyquinolin-5-yl)methylene)isonicotinohydrazide |

-continued

| Compound | Structure | Name |
| --- | --- | --- |
| 7 | | 4-hydroxy-N'-((8-hydroxyquinolin-5-yl)methylene)benzohydrazide |
| 8 | | 4-(dimethylamino)-N'-((8-hydroxyquinolin-5-yl)methylene)benzohydrazide |
| 9 | | N'-((8-hydroxyquinolin-5-yl)methylene)-1-naphthohydrazide |
| 10 | | N'-((8-hydroxyquinolin-5-yl)methylene)-2-phenoxybenzohydrazide |
| 11 | | N'-((8-hydroxyquinolin-5-yl)methylene)-3-phenoxybenzohydrazide |
| 12 | | N,N-diethyl-3-(2-((8-hydroxyquinolin-5-yl)methylene)hydrazine-1-carbonyl)benzenesulfonamide |
| 13 | | N-(4-(2-((8-hydroxyquinolin-5-yl)methylene)hydrazine-1-carbonyl)phenyl)thiophene-2-sulfonamide |

-continued

| Compound | Structure | Name |
|---|---|---|
| 14 | | 4-bromo-N-(4-(2-((8-hydroxyquinolin-5-yl)methylene)hydrazine-1-carbonyl)phenyl)benzenesulfonamide |
| 15 | | 4-ethoxy-N-(4-(2-((8-hydroxyquinolin-5-yl)methylene)hydrazine-1-carbonyl)phenyl)benzenesulfonamide |
| 16 | | N'-((5-nitrofuran-2-yl)methylene)thiophene-2-carbohydrazide |
| 17 | | 5-chloro-N'-((5-nitrofuran-2-yl)methylene)thiophene-2-carbohydrazide |
| 18 | | N'-((5-nitrofuran-2-yl)methylene)benzohydrazide |
| 19 | | N'-((5-nitrofuran-2-yl)methylene)isonicotinohydrazide |
| 20 | | 4-methoxy-N'-((5-nitrofuran-2-yl)methylene)benzohydrazide |
| 21 | | 4-(dimethylamino)-N'-((5-nitrofuran-2-yl)methylene)benzohydrazide |

-continued

| Compound | Structure | Name |
|---|---|---|
| 22 | | N'-((5-nitrofuran-2-yl)methylene)-1-naphthohydrazide |
| 23 | | N'-((5-nitrofuran-2-yl)methylene)-2-phenoxybenzohydrazide |
| 24 | | N'-((5-nitrofuran-2-yl)methylene)-3-phenoxybenzohydrazide |
| 25 | | N,N-diethyl-3-(2-((5-nitrofuran-2-yl)methylene)hydrazine-1-carbonyl)benzenesulfonamide |
| 26 | | N-(4-(2-((5-nitrofuran-2-yl)methylene)hydrazine-1-carbonyl)phenyl)thiophene-2-sulfonamide |
| 27 | | 4-bromo-N-(4-(2-((5-nitrofuran-2-yl)methylene)hydrazine-1-carbonyl)phenyl)benzenesulfonamide |
| 28 | | 4-ethoxy-N-(4-(2-((5-nitrofuran-2-yl)methylene)hydrazine-1-carbonyl)phenyl)benzenesulfonamide |
| 29 | | N'-((4-hydroxynaphthalen-1-yl)methylene)-4-methoxybenzohydrazide |

-continued

| Compound | Structure | Name |
|---|---|---|
| 30 | 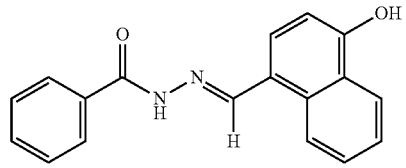 | N'-((4-hydroxynaphthalen-1-yl)methylene)benzohydrazide |
| 31 | 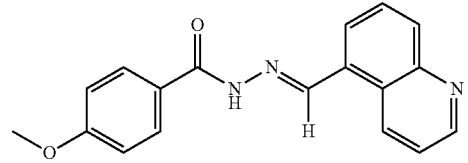 [SMILES: COc1ccc(C(=O)N/N=C/c2cccc3ncccc23)cc1] | 4-methoxy-N'-(quinolin-5-ylmethylene)benzohydrazide |
| 32 | 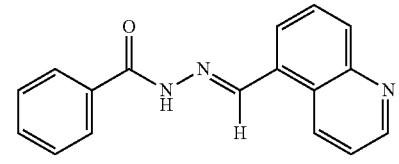 [SMILES: O=C(N/N=C/c1cccc2ncccc12)c1ccccc1] | N'-(quinolin-5-ylmethylene)benzohydrazide |
| 33 | 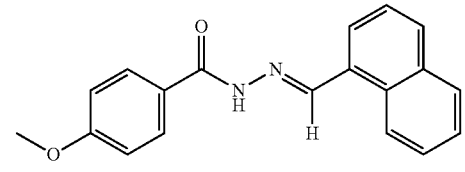 [SMILES: COc1ccc(C(=O)N/N=C/c2cccc3ccccc23)cc1] | 4-methoxy-N'-(naphthalen-1-ylmethylene)benzohydrazide |
| 34 | 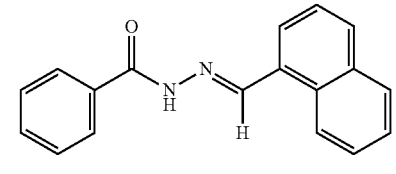 [SMILES: O=C(N/N=C/c1cccc2ccccc12)c1ccccc1] | N'-(naphthalen-1-ylmelhylene)benzohydrazide |
| 35 | 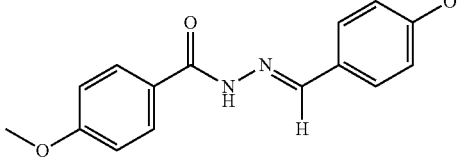 | N'-(4-hydroxybenzylidene)-4-methoxybenzohydrazide |
| 36 | 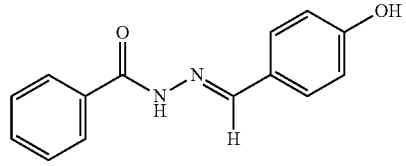 [SMILES: O=C(N/N=C/c1ccc(O)cc1)c1ccccc1] | N'-(4-hydroxybenzylidene)benzohydrazide |
| 37 | 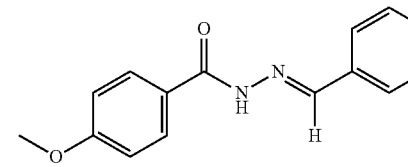 | N'-benzylidene-4-methoxybenzohydrazide |
| 38 | 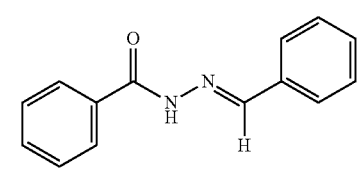 [SMILES: O=C(N/N=C/c1ccccc1)c1ccccc1] | N'-benzylidenebenzohydrazide |

| Compound | Structure | Name |
|---|---|---|
| 39 | | N'-(furan-2-ylmethylene)-4-methoxybenzohydrazide |
| 40 | | Nitroxoline |
| 41 | | Nifuroxazide |
| 42 | | Nitrofurantoin |

Chemical Synthesis

Exemplary chemical entities useful in methods of the description will now be described by reference to illustrative synthetic schemes for their general preparation below and the specific examples that follow. Artisans will recognize that, to obtain the various compounds herein, starting materials may be suitably selected so that the ultimately desired substituents will be carried through the reaction scheme with or without protection as appropriate to yield the desired product. Alternatively, it may be necessary or desirable to employ, in the place of the ultimately desired substituent, a suitable group that may be carried through the reaction scheme and replaced as appropriate with the desired substituent. Furthermore, one of skill in the art will recognize that the transformations shown in the schemes below may be performed in any order that is compatible with the functionality of the particular pendant groups.

Abbreviations: The examples described herein use materials, including but not limited to, those described by the following abbreviations known to those skilled in the art:

| | |
|---|---|
| g | grams |
| mmol | millimoles |
| mL | milliliters |
| EtOAc | ethyl acetate |
| MHz | megahertz |
| ppm | parts per million |
| Å | angstrom |
| δ | chemical shift |
| s | singlet |
| d | doublet |
| br | broad |
| m | multiplet |
| Hz | hertz |
| °C. | degrees Celsius |
| J | coupling constant |
| $d_6$-DMSO | deuterated dimethyl sulfoxide |
| min | minutes |
| hr (or h) | hours |
| M | molar |
| MS | mass spectrometry |
| m/z | mass-to-charge ratio |
| TFA | trifluoroacetic acid |
| μM | micromolar |
| ATP | adenosine triphosphate |

| | |
|---|---|
| DCM | dichloromethane |
| MDH | Malate dehydrogenase |
| Rho | Rhodanese |
| R.T. | Room temperature |
| $IC_{50}$ | Inhibitory concentration for half-maximal signal in biochemical assay |
| $EC_{50}$ | Effective concentration for half-maximal signal in bacterial proliferation assays |
| $CC_{50}$ | Cytotoxicity concentration for half-maximal signal in human cell viability assays |

Example 1

General Synthetic Method. Unless otherwise stated, all chemicals were purchased from commercial suppliers and used without further purification. Reaction progress was monitored by thin-layer chromatography on silica gel 60 F254 coated glass plates (EM Sciences). Flash chromatography was performed using a Biotage Isolera One flash chromatography system and eluting through Biotage KP-Sil Zip or Snap silica gel columns for normal-phase separations (hexanes:EtOAc gradients), or Snap KP-C18-HS columns for reverse-phase separations ($H_2O$:MeOH gradients). Reverse-phase high-performance liquid chromatography (RP-HPLC) was performed using a Waters 1525 binary pump, 2489 tunable UV/Vis detector (254 and 280 nm detection), and 2707 autosampler. For preparatory HPLC purification, samples were chromatographically separated using a Waters XSelect CSH C18 OBD prep column (part number 186005422, 130 Å pore size, 5 μm particle size, 19×150 mm), eluting with a $H_2O$:$CH_3CN$ gradient solvent system. Linear gradients were run from either 100:0, 80:20, or 60:40 A:B to 0:100 A:B (A=95:5 $H_2O$:$CH_3CN$, 0.05% TFA; B=5:95 $H_2O$:$CH_3CN$, 0.05% TFA). Products from normal-phase separations were concentrated directly, and reverse-phase separations were concentrated, diluted with $H_2O$, frozen, and lyophilized. For primary compound purity analyses (HPLC-1), samples were chromatographically separated using a Waters XSelect CSH C18 column (part number 186005282, 130 Å pore size, 5 μm particle size, 3.0×150 mm), eluting with the above $H_2O$:$CH_3CN$ gradient solvent systems. For secondary purity analyses (HPLC-2) of final test compounds, samples were chromatographically separated using a Waters XBridge C18 column (part number 186003132, 130 Å pore size, 5.0 μm particle size, 3.0×100 mm), eluting with a $H_2O$:MeOH gradient solvent system. Linear gradients were run from either 100:0, 80:20, 60:40, or 20:80 A:B to 0:100 A:B (A=95:5 $H_2O$:MeOH, 0.05% TFA; B=5:95 $H_2O$:MeOH, 0.05% TFA). Test compounds were found to be >95% in purity from both RP-HPLC analyses. Mass spectrometry data were collected using either Agilent LC 1200-MS 6130 or Agilent LC 1290-MS 6545 Q-TOF analytical LC-MS instruments at the IU Chemical Genomics Core Facility (CGCF). $^1$H-NMR spectra were recorded on a Bruker 300 MHz spectrometer at the IU CGCF. Chemical shifts are reported in parts per million and calibrated to the $d_6$-DMSO solvent peaks at 2.50 ppm. A representative synthesis of all analogs is presented below in the context of compound 1.

Example 2

Analog 1: N'-((8-hydroxyquinolin-5-yl)methylene)-4-methoxybenzohydrazide. To a stirring mixture of 4-methoxybenzoic acid hydrazide (668 mg, 4.02 mmol) and 8-hydroxyquinoline-5-carbaldehyde (583 mg, 3.37 mmol) was added a catalytic amount of HCl (0.09 mL of a 4N solution in 1,4-dioxane, 0.36 mmol) in 10 mL of DMSO, then the reaction was left to stir at R.T. overnight. The following day, the reaction was diluted with distilled water and the precipitate was filtered, rinsed with distilled water, collected, and dried to afford 1 as a yellow solid (1.07 g, 99% yield). $^1$H-NMR (300 MHz, $d_6$-DMSO) δ 11.70 (s, 1H), 10.44 (br s, 1H), 9.61 (d, J=8.6 Hz, 1H), 8.94 (d, J=2.8 Hz, 1H), 8.81 (s, 1H), 7.90-8.01 (m, 2H), 7.68-7.82 (m, 2H), 7.17 (d, J=8.1 Hz, 1H), 7.04-7.13 (m, 2H), 3.85 (s, 3H); MS (ESI) $C_{18}H_{16}N_3O_3$ [MH]$^+$ m/z expected=322.1, observed=322.1; HPLC-1=99%; HPLC-2=99%.

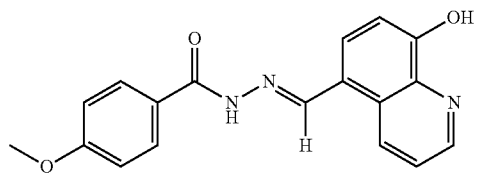

Example 3

Analog 2: 1-(((8-hydroxyquinolin-5-yl)methylene)amino)imidazolidine-2,4-dione. $^1$H-NMR (300 MHz, $d_6$-DMSO) δ 11.30 (s, 1H), 9.66 (dd, J=8.7, 1.3 Hz, 1H), 8.99 (dd, J=4.4, 1.4 Hz, 1H), 8.21 (s, 1H), 7.92 (d, J=8.2 Hz, 1H), 7.86 (dd, J=8.8, 4.5 Hz, 1H), 7.27 (d, J=8.1 Hz, 1H), 4.46 (s, 2H); MS (ESI) $C_{13}H_{11}N_4O_3$ [MH]$^+$ m/z expected=271.1, observed=271.0. HPLC-1=98%, HPLC-2=98%.

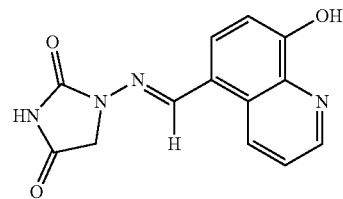 [SMILES: O=C1CN(/N=C/c2ccc(O)c3ncccc23)C(=O)N1]

Example 4

Analog 3: N'-((8-hydroxyquinolin-5-yl)methylene)thiophene-2-carbohydrazide. $^1$H-NMR (300 MHz, $d_6$-DMSO) δ 11.86 (s, 0.6H), 11.74 (s, 0.3H), 10.46 (br s, 0.8H), 9.57 (d, J=8.4 Hz, 0.6H), 8.94 (dd, J=4.1, 1.4 Hz, 1.3H), 8.79 (s, 0.7H), 8.71 (s, 0.3H), 7.65-8.11 (m, 4H), 7.12-7.31 (m, 2H) —Putatively mixture of ~2:1 rotamers; MS (ESI) $C_{15}H_{12}N_3O_2S$ [MH]$^+$ m/z expected=298.1, observed=298.0; HPLC-1=99%.

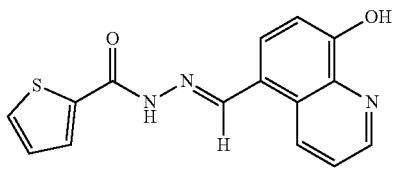 [SMILES: O=C(N/N=C/c1ccc(O)c2ncccc12)c1cccs1]

Example 5

Analog 4: 5-chloro-N'-((8-hydroxyquinolin-5-yl)methylene)thiophene-2-carbohydrazide. ¹H-NMR (300 MHz, $d_6$-DMSO) δ 9.55 (d, J=8.1 Hz, 0.5H), 8.93 (dd, J=4.0, 1.2 Hz, 1H), 8.84 (d, J=8.6 Hz, 0.5H), 8.74 (d, J=9.4 Hz, 1H), 8.02 (d, J=8.1 Hz, 0.5H), 7.89 (d, J=4.1 Hz, 0.5H), 7.76-7.85 (m, 0.9H), 7.66-7.75 (m, 1.1H), 7.12-7.32 (m, 2H) —Putatively mixture of ~1:1 rotamers; MS (ESI) $C_{15}H_{11}ClN_3O_2S$ [MH]⁺ m/z expected=332.1, observed=332.0; HPLC-1=97%; HPLC-2=98%.

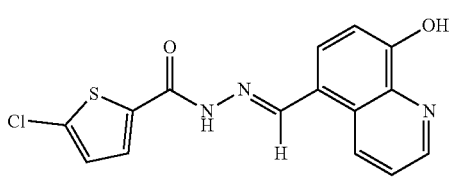 [SMILES: O=C(N/N=C/c1ccc(O)c2ncccc12)c1ccc(Cl)s1]

Example 6

Analog 5: N'-((8-hydroxyquinolin-5-yl)methylene)benzohydrazide. ¹H-NMR (300 MHz, $d_6$-DMSO) δ 12.14 (s, 0.8H), 12.08 (s, 0.1H), 9.74 (dd, J=8.7, 1.4 Hz, 0.8H), 9.00 (dd, J=4.3, 1.5 Hz, 1H), 8.82-8.90 (m, 2.8H), 8.48 (s, 0.1H), 7.90-7.98 (m, 1.8H), 7.77-7.90 (m, 1.9H), 7.69-7.74 (m, 0.1H), 7.49-7.57 (m, 0.2H), 7.25 (d, J=8.1 Hz, 0.9H), 7.13-7.20 (m, 0.1H) —Putatively mixture of ~9:1 rotamers; MS (ESI) $C_{16}H_{13}N_4O_2$ [MH]⁺ m/z expected=293.1, observed=293.1; HPLC-1=98%, HPLC-2=>99%.

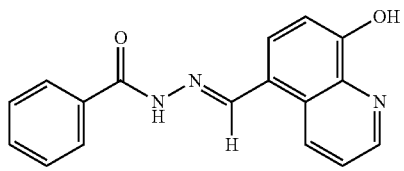 [SMILES: O=C(N/N=C/c1ccc(O)c2ncccc12)c1ccccc1]

Example 7

Analog 6: N'-((8-hydroxyquinolin-5-yl)methylene)isonicotinohydrazide. ¹H-NMR (300 MHz, $d_6$-DMSO) δ 12.14 (s, 0.8H), 12.08 (s, 0.1H), 9.74 (dd, J=8.7, 1.4 Hz, 0.8H), 9.00 (dd, J=4.3, 1.5 Hz, 1H), 8.82-8.90 (m, 2.8H), 8.48 (s, 0.1H), 7.90-7.98 (m, 1.8H), 7.77-7.90 (m, 1.9H), 7.69-7.74 (m, 0.1H), 7.49-7.57 (m, 0.2H), 7.25 (d, J=8.1 Hz, 0.9H), 7.13-7.20 (m, 0.1H) —Putatively mixture of ~9:1 rotamers; MS (ESI) $C_{16}H_{13}N_4O_2$ [MH]⁺ m/z expected=293.1, observed=293.1; HPLC-1=98%, HPLC-2=>99%.

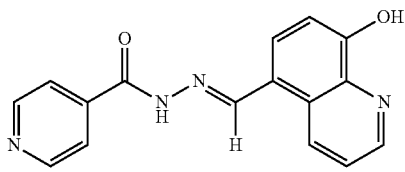 [SMILES: O=C(N/N=C/c1ccc(O)c2ncccc12)c1ccncc1]

Example 8

Analog 7: 4-hydroxy-N'-((8-hydroxyquinolin-5-yl)methylene)benzohydrazide. ¹H-NMR (300 MHz, $d_6$-DMSO) δ 11.61 (s, 1H), 10.22 (br s, 1H), 9.60 (d, J=8.5 Hz, 1H), 8.92 (d, J=2.9 Hz, 1H), 8.80 (s, 1H), 7.79-7.91 (m, 2H), 7.65-7.78 (m, 2H), 7.14 (d, J=8.0 Hz, 1H), 6.82-6.93 (m, 2H); MS (ESI) $C_{17}H_{14}N_3O_3$ [MH]⁺ m/z expected=308.1, observed=308.0; HPLC-1=98%; HPLC-2=>99%.

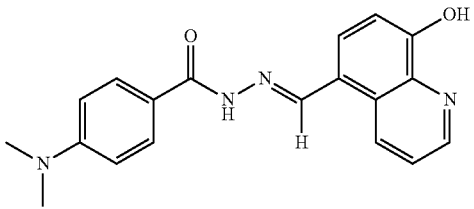 [SMILES: CN(C)c1ccc(C(=O)N/N=C/c2ccc(O)c3ncccc23)cc1]

Example 9

Analog 8: 4-(dimethylamino)-N'-((8-hydroxyquinolin-5-yl)methylene)benzohydrazide. ¹H-NMR (300 MHz, $d_6$-DMSO) δ 11.52 (s, 1H), 10.36 (br s, 1H), 9.60 (d, J=8.0 Hz, 1H), 8.93 (dd, J=4.1, 1.6 Hz, 1H), 8.80 (s, 1H), 7.81-7.91 (m, 2H), 7.67-7.78 (m, 2H), 7.16 (d, J=8.0 Hz, 1H), 6.72-6.82 (m, 2H), 3.00 (s, 6H); MS (ESI) $C_{19}H_{19}N_4O_2$ [MH]⁺ m/z expected=335.2, observed=335.1; HPLC-1=>99%; HPLC-2=98%.

Example 10

Analog 9: N'-((8-hydroxyquinolin-5-yl)methylene)-1-naphthohydrazide. ¹H-NMR (300 MHz, $d_6$-DMSO) δ 11.99 (s, 0.3H), 11.97 (s, 0.6H), 10.45 (br s, 0.9H), 9.66 (dd, J=8.7, 1.5 Hz, 0.7H), 8.96 (dd, J=4.1, 1.6 Hz, 0.7H), 8.72 (s, 0.7H), 8.64-8.69 (m, 0.3H), 8.23-8.35 (m, 1.0H), 7.99-8.16 (m, 2.3H), 7.87-7.93 (m, 0.3H), 7.73-7.83 (m, 2.1H), 7.49-7.68 (m, 3.4H), 7.42-7.49 (m, 0.3H), 7.18 (d, J=8.1 Hz, 0.7H), 6.96-7.03 (m, 0.3H), 6.75-6.84 (m, 0.3H) —Putatively mixture of ~7:3 rotamers; MS (ESI) $C_{21}H_{10}N_3O_2$ [MH]⁺ m/z expected=342.1, observed=342.1; HPLC-1=>99%; HPLC-2=99%.

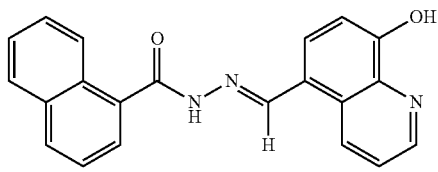 [SMILES: O=C(N/N=C/c1ccc(O)c2ncccc12)c1cccc2ccccc12]

Example 11

Analog 10: N'-((8-hydroxyquinolin-5-yl)methylene)-2-phenoxybenzohydrazide. ¹H-NMR (300 MHz, d₆-DMSO) δ 11.73 (s, 0.4H), 11.70 (s, 0.6H), 10.39 (br s, 0.8H), 9.57 (dd, J=8.7, 1.5 Hz, 0.6H), 8.92 (dd, J=4.1, 1.5 Hz, 0.6H), 8.78-8.89 (m, 0.8H), 8.65 (s, 0.6H), 8.31 (s, 0.4H), 7.66-7.78 (m, 1.8H), 7.47-7.58 (m, 1.7H), 7.35-7.45 (m, 1.3H), 7.20-7.34 (m, 1.4H), 7.10-7.19 (m, 2H), 7.03-7.10 (m, 1.6H), 6.93-7.03 (m, 1.4H), 6.82-6.89 (m, 0.8H) —Putatively mixture of ~3:2 rotamers; MS (ESI) C$_{23}$H$_{18}$N$_3$O$_3$ [MH]⁺ m/z expected=384.1, observed=384.2; HPLC-1=>99%; HPLC-2=99%.

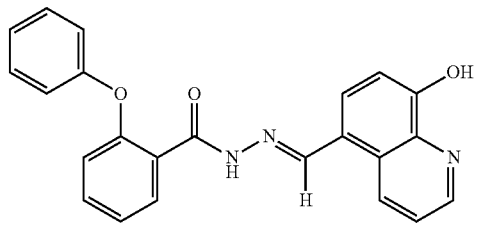 [SMILES: O=C(N/N=C/c1ccc(O)c2ncccc12)c1ccccc1Oc1ccccc1]

Example 12

Analog 11: N'-((8-hydroxyquinolin-5-yl)methylene)-3-phenoxybenzohydrazide. ¹H-NMR (300 MHz, d₆-DMSO) δ 11.83 (s, 1H), 10.46 (br s, 1H), 9.59 (dd, J=8.7, 1.4 Hz, 1H), 8.94 (dd, J=4.1, 1.5 Hz, 1H), 8.81 (s, 1H), 7.68-7.82 (m, 3H), 7.53-7.64 (m, 2H), 7.39-7.50 (m, 2H), 7.13-7.28 (m, 3H), 7.03-7.13 (m, 2H); MS (ESI) C$_{23}$H$_{18}$N$_3$O$_3$ [MH]⁺ m/z expected=384.1, observed=384.1; HPLC-1=>99%; HPLC-2=>99%.

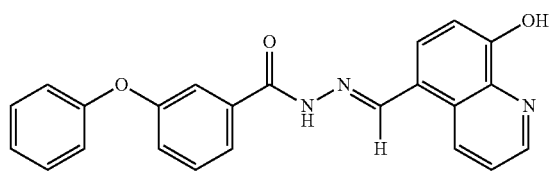 [SMILES: O=C(N/N=C/c1ccc(O)c2ncccc12)c1cccc(Oc2ccccc2)c1]

Example 13

Analog 12: N,N-diethyl-3-(2-((8-hydroxyquinolin-5-yl)methylene)hydrazine-1-carbonyl)benzenesulfonamide. ¹H-NMR (300 MHz, d₆-DMSO) § 12.06 (s, 1H), 10.50 (br s, 1H), 9.62 (dd, J=8.7, 1.5 Hz, 1H), 8.95 (dd, J=4.0, 1.5 Hz, 1H), 8.85 (s, 1H), 8.36 (s, 1H), 8.24 (d, J=7.8 Hz, 1H), 8.02 (d, J=8.0 Hz, 1H), 7.71-7.84 (m, 3H), 7.18 (d, J=8.0 Hz, 1H), 3.22 (q J=7.1 Hz, 4H), 1.06 (t, J=7.1 Hz, 6H); MS (ESI) C$_{21}$H$_{23}$N$_4$O$_4$S [MH]⁺ m/z expected=427.1, observed=427.2; HPLC-1=99%; HPLC-2=99%.

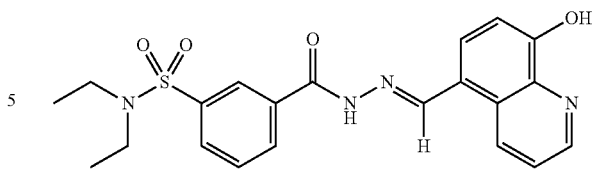

Example 14

Analog 13: N-(4-(2-((8-hydroxyquinolin-5-yl)methylene)hydrazine-1-carbonyl)phenyl)thiophene-2-sulfonamide. ¹H-NMR (300 MHz, d₆-DMSO) δ 11.71 (s, 1H), 10.90 (s, 1H), 10.44 (br s, 1H), 9.58 (d, J=8.7 Hz, 1H), 8.93 (d, J=2.7 Hz, 1H), 8.77 (s, 1H), 7.94 (dd, J=5.0, 1.3 Hz, 1H), 7.81-7.91 (m, 2H), 7.69-7.81 (m, 2H), 7.67 (dd, J=3.7, 1.3 Hz, 1H), 7.23-7.35 (m, 2H), 7.08-7.20 (m, 2H); MS (ESI) C$_{21}$H$_{15}$N$_4$O$_4$S$_2$ [M-H]⁻ m/z expected=451.1, observed=451.0; HPLC-1=99%; HPLC-2=99%.

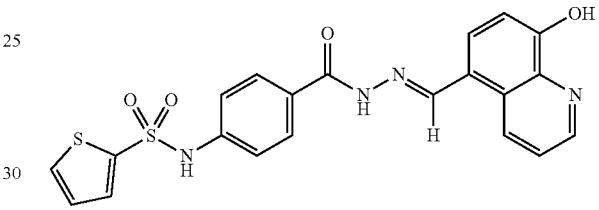

Example 15

Analog 14: 4-bromo-N-(4-(2-((8-hydroxyquinolin-5-yl)methylene)hydrazine-1-carbonyl)phenyl)benzenesulfonamide. ¹H-NMR (300 MHz, d₆-DMSO) δ 11.71 (s, 1H), 10.86 (s, 1H), 10.44 (br s, 1H), 9.57 (d, J=8.6 Hz, 1H), 8.93 (d, J=2.7 Hz, 1H), 8.78 (s, 1H), 7.66-7.91 (m, 8H), 7.23 (d, J=8.6 Hz, 2H), 7.09-7.18 (m, 1H), 8.96 (s, 1H); MS (ESI) C$_{23}$H$_{16}$BrN$_4$O$_4$S [M-H]⁻ m/z expected=523.0, observed=522.9; HPLC-1=99%; HPLC-2=99%.

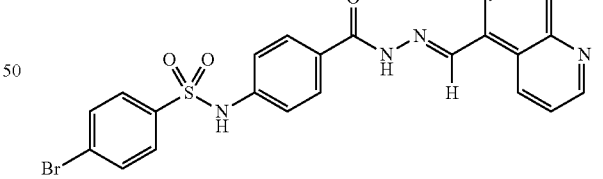

Example 16

Analog 15: 4-ethoxy-N-(4-(2-((8-hydroxyquinolin-5-yl)methylene)hydrazine-1-carbonyl)phenyl)benzenesulfonamide. ¹H-NMR (300 MHz, d₆-DMSO) δ 11.67 (s, 1H), 10.63 (s, 1H), 10.43 (br s, 1H), 9.57 (d, J=7.8 Hz, 1H), 8.93 (d, J=2.8 Hz, 1H), 8.76 (s, 1H), 7.67-7.86 (m, 6H), 7.22 (d, J=8.8 Hz, 2H), 7.15 (d, J=8.0 Hz, 1H), 7.06 (d, J=8.9 Hz, 2H), 4.06 (q, J=6.9 Hz, 2H), 1.30 (t, J=6.9 Hz, 3H); MS (ESI) C$_{25}$H$_{21}$N$_4$O$_5$S [M-H]⁻ m/z expected=489.1, observed=489.0; HPLC-1=98%; HPLC-2=98%.

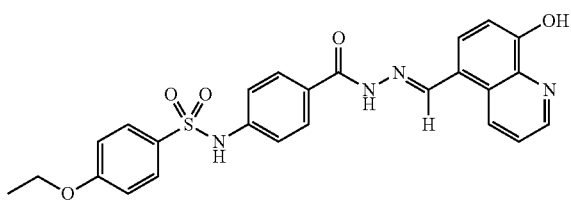 [SMILES: CCOc1ccc(S(=O)(=O)Nc2ccc(C(=O)N/N=C/c3ccc(O)c4ncccc34)cc2)cc1]

Example 17

Analog 16: N'-((5-nitrofuran-2-yl)methylene)thiophene-2-carbohydrazide. $^1$H-NMR (300 MHz, $d_6$-DMSO) δ 12.26 (s, 1H), 8.35 (br s, 1H), 7.96 (br s, 2H), 7.81 (d, J=4.0 Hz, 1H), 7.28 (d, J=4.0 Hz, 1H), 7.24 (dd, J=4.9, 3.9 Hz, 1H); MS (ESI) $C_{10}H_8N_3O_3S$ [MH]$^+$ m/z expected=266.0, observed=266.1; HPLC-1=98%; HPLC-2=98%.

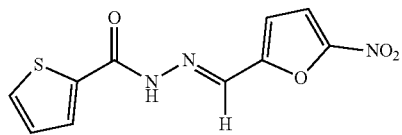 [SMILES: O=C(N/N=C/c1ccc([N+](=O)[O-])o1)c1cccs1]

Example 18

Analog 17: 5-chloro-N'-((5-nitrofuran-2-yl)methylene)thiophene-2-carbohydrazide. $^1$H-NMR (300 MHz, $d_6$-DMSO) δ 12.38 (s, 1H), 8.34 (br s, 0.3H), 8.03 (br s, 0.7H), 7.89 (br s, 0.7H), 7.80 (d, J=3.9 Hz, 1.3H), 7.24-7.33 (m, 2.2H) —Putatively mixture of ~2:1 rotamers; MS (ESI) $C_{10}H_7N_3O_4S$ [MH]$^+$ m/z expected=300.0, observed=300.0; HPLC-1=98%; HPLC-2=98%.

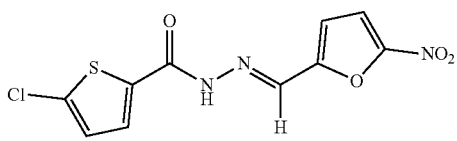 [SMILES: O=C(N/N=C/c1ccc([N+](=O)[O-])o1)c1ccc(Cl)s1]

Example 19

Analog 18: N'-((5-nitrofuran-2-yl)methylene)benzohydrazide. $^1$H-NMR (300 MHz, $d_6$-DMSO) δ 12.25 (s, 1H), 8.40 (br s, 1H), 7.91 (d, J=7.2 Hz, 2H), 7.80 (d, J=3.9 Hz, 1H), 7.59-7.67 (m, 1H), 7.50-7.59 (m, 2H), 7.28 (d, J=3.6 Hz, 1H); MS (ESI) $C_{12}H_{10}N_3O_4$ [MH]$^+$ m/z expected=260.0, observed=260.1; HPLC-1=>99%; HPLC-2=98%.

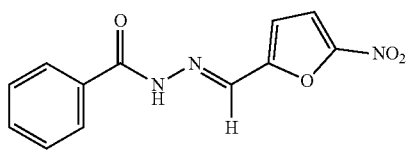 [SMILES: O=C(N/N=C/c1ccc([N+](=O)[O-])o1)c1ccccc1]

Example 20

Analog 19: N'-((5-nitrofuran-2-yl)methylene)isonicotinohydrazide. $^1$H-NMR (300 MHz, $d_6$-DMSO) δ 12.44 (s, 1H), 8.81 (d, J=5.6 Hz, 2H), 8.41 (s, 1H), 7.75-7.89 (m, 3H), 7.33 (d, J=3.8 Hz, 1H); MS (ESI) $C_{11}H_9N_4O_4$ [MH]$^+$ m/z expected=261.1, observed=261.1; HPLC-1=99%; HPLC-2=99%.

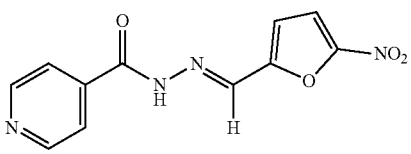 [SMILES: O=C(N/N=C/c1ccc([N+](=O)[O-])o1)c1ccncc1]

Example 21

Analog 20: 4-methoxy-N'-((5-nitrofuran-2-yl)methylene)benzohydrazide. $^1$H-NMR (300 MHz, $d_6$-DMSO) δ 12.12 (s, 1H), 8.39 (br s, 1H), 7.88-7.96 (m, 2H), 7.80 (d, J=4.0 Hz, 1H), 7.26 (d, J=3.9 Hz, 1H), 7.05-7.12 (m, 2H), 3.84 (s, 3H); MS (ESI) $C_{13}H_{10}N_3O_5$ [M-H]$^-$ m/z expected=288.1, observed=288.0; HPLC-1=>99%; HPLC-2=>99%.

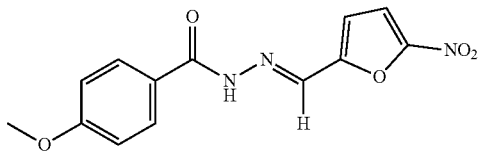 [SMILES: COc1ccc(C(=O)N/N=C/c2ccc([N+](=O)[O-])o2)cc1]

Example 22

Analog 21: 4-(dimethylamino)-N'-((5-nitrofuran-2-yl)methylene)benzohydrazide. $^1$H-NMR (300 MHz, $d_6$-DMSO) δ 11.95 (s, 1H), 8.38 (s, 1H), 7.77-7.85 (m, 3H), 7.22 (d, J=3.9 Hz, 1H), 6.73-6.81 (m, 2H), 3.01 (s, 6H); MS (ESI) $C_{14}H_{15}N_4O_4$ [MH]$^+$ m/z expected=303.1, observed=303.1; HPLC-1=>99%; HPLC-2=99%.

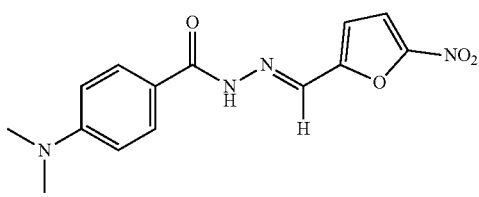 [SMILES: CN(C)c1ccc(C(=O)N/N=C/c2ccc([N+](=O)[O-])o2)cc1]

Example 23

Analog 22: N'-((5-nitrofuran-2-yl)methylene)-1-naphthohydrazide. $^1$H-NMR (300 MHz, $d_6$-DMSO) δ 12.26 (s, 1H), 8.30 (s, 1H), 8.18-8.25 (m, 1H), 8.13 (d, J=8.2 Hz, 1H), 7.99-8.08 (m, 1H), 7.76-7.86 (m, 2H), 7.57-7.67 (m, 3H), 7.30 (d, J=3.9 Hz, 1H); MS (ESI) $C_{16}H_{12}N_3O_4$ [M-H]$^-$ m/z expected=310.1, observed=310.0; HPLC-1=>99%; HPLC-2=98%.

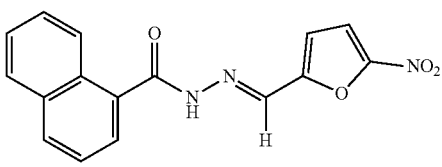 [SMILES: O=C(N/N=C/c1ccc([N+](=O)[O-])o1)c1cccc2ccccc12]

Example 24

Analog 23: N'-((5-nitrofuran-2-yl)methylene)-2-phenoxybenzohydrazide. ¹H-NMR (300 MHz, d₆-DMSO) δ 12.17 (s, 1H), 8.26 (s, 0.7H), 7.92 (s, 0.3H), 7.78 (d, J=3.8 Hz, 0.7H), 7.70-7.75 (m, 0.4H), 7.67 (d, J=7.3 Hz, 0.7H), 7.34-7.58 (m, 2.9H), 6.94-7.33 (m, 7.0H), 6.893-6.91 (m, 0.4H) —Putatively mixture of ~2:1 rotamers; MS (ESI) C₁₈H₁₄N₃O₅ [MH]⁺ m/z expected=352.1, observed=352.1; HPLC-1=>99%; HPLC-2=98%.

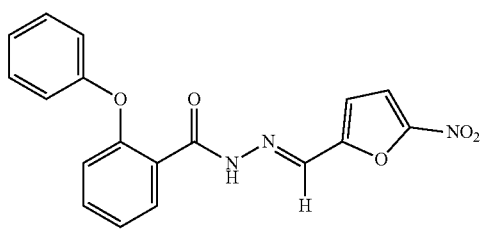 [SMILES: O=C(N/N=C/c1ccc([N+](=O)[O-])o1)c1ccccc1Oc1ccccc1]

Example 25

Analog 24: N'-((5-nitrofuran-2-yl)methylene)-3-phenoxybenzohydrazide. ¹H-NMR (300 MHz, d₆-DMSO) δ 12.25 (s, 1H), 8.39 (s, 1H), 7.80 (d, J=3.9 Hz, 1H), 7.70 (d, J=7.6 Hz, 1H), 7.51-7.61 (m, 2H), 7.38-7.48 (m, 2H), 7.23-7.32 (m, 2H), 7.15-7.23 (m, 1H), 7.04-7.12 (m, 2H); MS (ESI) C₁₈H₁₄N₃O₅ [MH]⁺ m/z expected=352.1, observed=352.1; HPLC-1=>99%; HPLC-2=98%.

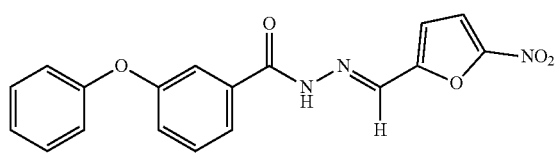 [SMILES: O=C(N/N=C/c1ccc([N+](=O)[O-])o1)c1cccc(Oc2ccccc2)c1]

Example 26

Analog 25: N,N-diethyl-3-(2-((5-nitrofuran-2-yl)methylene)hydrazine-1-carbonyl)benzenesulfonamide. ¹H-NMR (300 MHz, d₆-DMSO) δ 12.45 (s, 1H), 8.43 (s, 1H), 8.31 (s, 1H), 8.20 (d, J=7.2 Hz, 1H), 8.03 (d, J=7.7 Hz, 1H), 7.74-7.85 (m, 2H), 7.31 (d, J=3.4 Hz, 1H), 3.20 (q, J=7.1 Hz, 4H), 1.05 (t, J=7.1 Hz, 6H); MS (ESI) C₁₆H₁₉N₄O₆S [MH]⁺ m/z expected=395.1, observed=395.1; HPLC-1=>99%; HPLC-2=>99%.

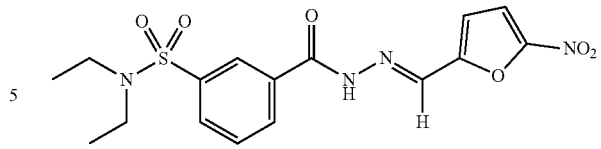

Example 27

Analog 26: N-(4-(2-((5-nitrofuran-2-yl)methylene)hydrazine-1-carbonyl)phenyl)thiophene-2-sulfonamide. ¹H-NMR (300 MHz, d₆-DMSO) δ 12.06 (s, 1H), 10.87 (s, 1H), 8.27 (s, 1H), 7.85 (dd, J=5.0, 1.4 Hz, 1H), 7.69-7.79 (m, 3H), 7.58 (dd, J=3.8, 1.4 Hz, 1H), 7.15-7.25 (m, 3H), 7.06 (dd, J=4.9, 3.8 Hz, 1H); MS (ESI) C₁₆H₁₃N₄O₆S₂ [MH]⁺ m/z expected=421.0, observed=421.1; HPLC-1=98%; HPLC-2=99%.

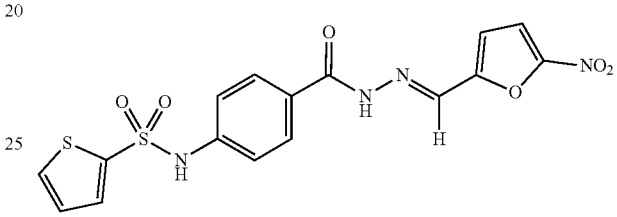

Example 28

Analog 27: 4-bromo-N-(4-(2-((5-nitrofuran-2-yl)methylene)hydrazine-1-carbonyl)phenyl)benzenesulfonamide. ¹H-NMR (300 MHz, d₆-DMSO) δ 12.11 (s, 1H), 10.89 (s, 1H), 8.34 (s, 1H), 7.70-7.87 (m, 7H), 7.18-7.31 (m, 3H); MS (ESI) C₁₈H₁₄BrN₄O₆S [MH]⁺ m/z expected=495.0, observed=494.9; HPLC-1=98%; HPLC-2=97%.

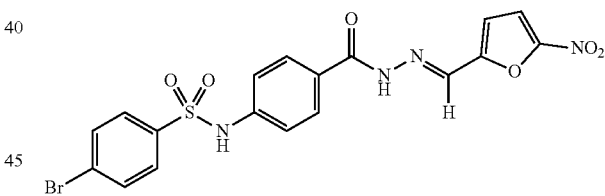

Example 29

Analog 28: 4-ethoxy-N-(4-(2-((5-nitrofuran-2-yl)methylene)hydrazine-1-carbonyl)phenyl)benzenesulfonamide. ¹H-NMR (300 MHz, d₆-DMSO) δ 12.09 (s, 1H), 10.68 (s, 1H), 8.34 (s, 1H), 7.68-7.86 (m, 5H), 7.17-7.29 (m, 3H), 7.01-7.10 (m, 2H), 4.06 (q, J=7.0 Hz, 2H), 1.30 (t, J=1.3 Hz, 3H); MS (ESI) C₂₀H₁₉N₄O₇S [MH]⁺ m/z expected=459.1, observed=459.0; HPLC-1=97%; HPLC-2=97%.

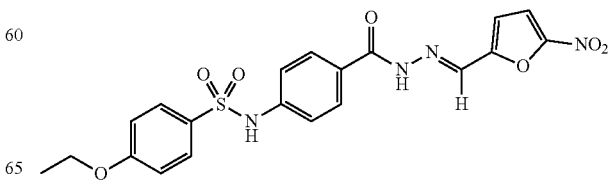

Example 30

Analog 29: N'-((4-hydroxynaphthalen-1-yl)methylene)-4-methoxybenzohydrazide. $^1$H-NMR (300 MHz, d$_6$-DMSO) δ 11.57 (s, 1H), 10.75 (s, 1H), 8.82-8.99 (m, 2H), 8.20 (d, J=8.1 Hz, 1H), 7.84-7.99 (m, 2H), 7.69 (d, J=7.8 Hz, 1H), 7.61 (t, J=7.5 Hz, 1H), 7.50 (t, J=7.5 Hz, 1H), 6.99-7.11 (m, 2H), 6.93 (d, J=7.9 Hz, 1H), 3.81 (s, 3H); MS (ESI) C$_{19}$H$_{17}$N$_2$O$_3$ [M-H]$^-$ m/z expected=321.1, observed=321.1; HPLC-1=99%; HPLC-2=99%.

Example 31

Analog 30: N'-((4-hydroxynaphthalen-1-yl)methylene)benzohydrazide. $^1$H-NMR (300 MHz, d$_6$-DMSO) δ 11.72 (s, 1H), 10.81 (s, 1H), 8.89-9.02 (m, 2H), 8.24 (d, J=8.1 Hz, 1H), 7.95 (d, J=7.2 Hz, 2H), 7.74 (d, J=8.1 Hz, 1H), 7.48-7.70 (m, 5H), 6.97 (d, J=7.9 Hz, 1H); MS (ESI) C$_{18}$H$_{15}$N$_2$O$_2$ [MH]$^+$ m/z expected=291.1, observed=291.1; HPLC-1=99%; HPLC-2=98%.

Example 32

Analog 31: 4-methoxy-N'-(quinolin-5-ylmethylene)benzohydrazide. $^1$H-NMR (300 MHz, d$_6$-DMSO) δ 11.91 (s, 1H), 9.45 (d, J=8.3 Hz, 1H), 8.98 (d, J=3.9 Hz, 2H), 8.10 (d, J=8.1 Hz, 1H), 7.91-8.02 (m, 3H), 7.80-7.89 (m, 1H), 7.68 (dd, J=8.1, 3.7 Hz, 1H), 7.10 (d, J=8.8 Hz, 2H), 3.85 (s, 3H); MS (ESI) C$_{18}$H$_{16}$N$_3$O$_2$ [MH]$^+$ m/z expected=306.1, observed=306.1; HPLC-1=99%; HPLC-2=99%.

Example 33

Analog 32: N'-(quinolin-5-ylmethylene)benzohydrazide. $^1$H-NMR (300 MHz, d$_6$-DMSO) δ 12.05 (s, 1H), 9.45 (d, J=8.5 Hz, 1H), 8.93-9.06 (m, 2H), 8.10 (d, J=8.2 Hz, 1H), 7.97 (t, J=7.5 Hz, 3H), 7.80-7.89 (m, 1H), 7.69 (dd, J=8.7, 4.0 Hz, 1H), 7.50-7.64 (m, 3H); MS (ESI) C$_{17}$H$_{14}$N$_3$O [MH]$^+$ m/z expected=276.1, observed=276.1; HPLC-1=>99%; HPLC-2=>99%.

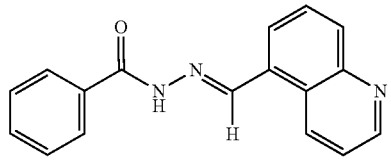 [SMILES: O=C(N/N=C/c1cccc2ncccc12)c1ccccc1]

Example 34

Analog 33: 4-methoxy-N'-(naphthalen-1-ylmethylene)benzohydrazide. $^1$H-NMR (300 MHz, d$_6$-DMSO) δ 11.83 (s, 1H), 9.10 (s, 1H), 8.87 (d, J=8.2 Hz, 1H), 8.02 (d, J=7.9 Hz, 2H), 7.89-7.99 (m, 3H), 7.57-7.72 (m, 3H), 7.06-7.13 (m, 2H), 3.85 (s, 3H); MS (ESI) C$_{19}$H$_{17}$N$_2$O$_2$ [MH]$^+$ m/z expected=305.1, observed=305.1; HPLC-1=f>99%; HPLC-2=>99%.

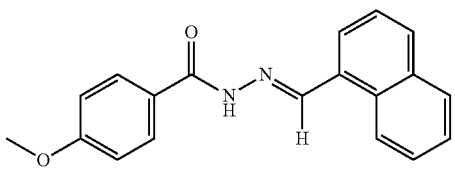 [SMILES: COc1ccc(C(=O)N/N=C/c2cccc3ccccc23)cc1]

Example 35

Analog 34: N'-(naphthalen-1-ylmethylene)benzohydrazide. $^1$H-NMR (300 MHz, d$_6$-DMSO) δ 11.96 (s, 1H), 9.12 (s, 1H), 8.88 (d, J=8.3 Hz, 1H), 8.03 (dd, J=7.7, 3.2 Hz, 2H), 7.91-8.00 (m, 3H), 7.52-7.73 (m, 6H); MS (ESI) C$_{18}$H$_{15}$N$_2$O [MH]$^+$ m/z expected=275.1, observed=275.0; HPLC-1=>99%; HPLC-2=>99%.

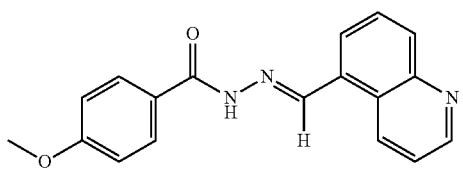

Example 36

Analog 35: N'-(4-hydroxybenzylidene)-4-methoxybenzohydrazide. $^1$H-NMR (300 MHz, d$_6$-DMSO) δ 11.53 (s, 1H), 9.93 (s, 1H), 8.33 (s, 1H), 7.89 (d, J=8.8 Hz, 2H), 7.50-7.59 (m, 2H), 7.00-7.09 (m, 2H), 6.83 (d, J=8.5 Hz, 2H), 3.83 (s, 3H); MS (ESI) C$_{15}$H$_{15}$N$_2$O$_3$ [MH]$^+$ m/z expected=271.1, observed=271.1; HPLC-1=95%; HPLC-2=99%.

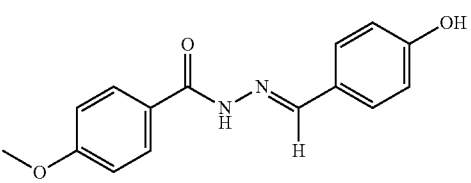 [SMILES: COc1ccc(C(=O)N/N=C/c2ccc(O)cc2)cc1]

Example 37

Analog 36: N'-(4-hydroxybenzylidene)benzohydrazide. $^1$H-NMR (300 MHz, $d_6$-DMSO) δ 11.65 (s, 1H), 9.95 (s, 1H), 8.34 (s, 1H), 7.89 (d, J=6.8 Hz, 2H), 7.44-7.64 (m, 5H), 6.84 (d, J=8.6 Hz, 2H); MS (ESI) $C_{14}H_{13}N_2O_2$ [MH]$^+$ m/z expected=241.1, observed=241.1; HPLC-1=95%; HPLC-2=98%.

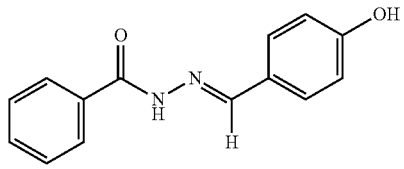 [SMILES: O=C(N/N=C/c1ccc(O)cc1)c1ccccc1]

Example 38

Analog 37: N'-benzylidene-4-methoxybenzohydrazide. $^1$H-NMR (300 MHz, $d_6$-DMSO) δ 11.74 (s, 1H), 8.45 (s, 1H), 7.87-7.96 (m, 2H), 7.67-7.77 (m, 2H), 7.39-7.51 (m, 3H), 7.02-7.11 (m, 2H), 3.83 (s, 3H); MS (ESI) $C_{15}H_{15}N_2O_2$ [MH]$^+$ m/z expected=255.1, observed=255.1; HPLC-1=99%; HPLC-2=99%.

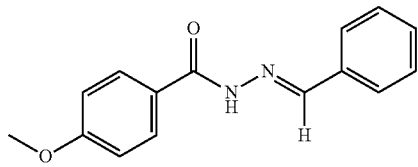 [SMILES: COc1ccc(C(=O)N/N=C/c2ccccc2)cc1]

Example 39

Analog 38: N'-benzylidenebenzohydrazide. $^1$H-NMR (300 MHz, $d_6$-DMSO) δ 11.87 (s, 1H), 8.47 (s, 1H), 7.92 (d, J=7.0 Hz, 2H), 7.69-7.78 (m, 2H), 7.41-7.64 (m, 6H); MS (ESI) $C_{14}H_{13}N_2O$ [MH]$^+$ m/z expected=225.1, observed=225.1; HPLC-1=>99%; HPLC-2=>99%.

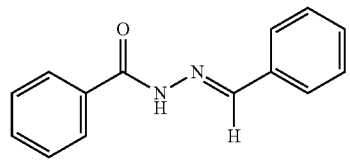 [SMILES: O=C(N/N=C/c1ccccc1)c1ccccc1]

Example 40

Analog 39: N'-(furan-2-ylmethylene)-4-methoxybenzohydrazide. $^1$H-NMR (300 MHz, $d_6$-DMSO) δ 11.68 (s, 1H), 8.33 (s, 1H), 7.86-7.92 (m, 2H), 7.84 (s, 1H), 7.02-7.10 (m, 2H), 6.91 (d, J=3.1 Hz, 1H), 6.63 (dd, J=3.3, 1.7 Hz, 1H), 3.83 (s, 3H); MS (ESI) $C_{13}H_{13}N_2O_3$ [MH]$^+$ m/z expected=245.1, observed=245.1; HPLC-1=98%; HPLC-2=98%.

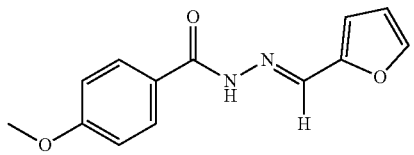 [SMILES: COc1ccc(C(=O)N/N=C/c2ccco2)cc1]

Example 41

General materials and methods for biochemical & cell-based experiments.

The bacterial proliferation assays employed the following bacterial strains: NEB 5-alpha *Escherichia coli* (a derivative of DH5α *E. coli*, New England Biolabs #C2987H); *Enterococcus faecium*—(Orla-Jensen) Schleifer and Kilpper-Balz strain NCTC 7171 (ATCC #19434); *Staphylococcus aureus*—Rosenbranch strain Seattle 1945 (ATCC #25923); *Klebsiella pneumoniae*—(Schroeter) Trevisan strain NCTC 9633 (ATCC #13883); *Acinetobacter baumannii*—Bouvet and Grimont strain 2208 (ATCC 19606); *Pseudomonas aeruginosa*—(Schroeter) Migula strain NCTC 10332 (ATCC #10145); *Enterobacter cloacae*—*E. cloacae*, subsp. *cloacae* (Jordan) Hormaeche and Edwards strain CDC 442-68 (ATCC #13047). For protein expression and purification, NEB 5-alpha and BL21 (DE3) *E. coli* cells were purchased from New England Biolabs, and Rosetta™ 2 (DE3) *E. coli* cells were purchased from EMD Millipore. The human cell viability assays used FHC colon cells (CRL-1831) and FHs 74 Int small intestine cells (CCL-241) obtained from the ATCC. Ampicillin was used at a concentration of 50 μg/mL, when appropriate.

Example 42

Figure 10:
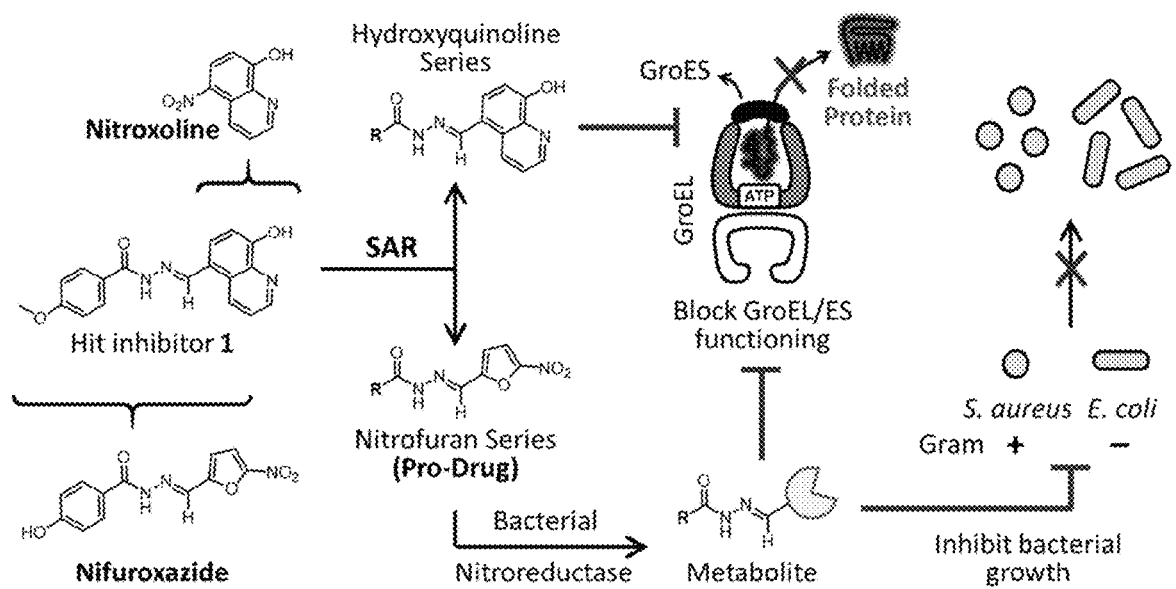
FIG. 10 shows an illustration of a molecular pathway.

Expression and purification of *E. coli* GroEL and GroES proteins. Referring to FIG. 10, an illustration of the function of the GroEL/ES complex is provided. *E. coli* GroEL and GroES were expressed and purified. *E. coli* GroEL was expressed from a trc-promoted and Amp(+) resistance marker plasmid in NEB 5-alpha *E. coli* cells. GroES was expressed from a T7-promoted and Amp(+) resistance plasmid in *E. coli* BL21 (DE3) cells. Transformed colonies were plated onto Ampicillin-treated LB agar and incubated overnight at 37° C. A single colony was selected and grown in LB media treated with Ampicillin for 16 hours at 37° C. at 200 rpm. Cells were then sub-cultured in scaled-up Ampicillin-treated LB medium and grown at 37° C. at 230 rpm until an $OD_{600}$ of 0.5 was reached, then were induced with 0.8 mM IPTG and continued to grow for ~2.5 h at 37° C. The cultures were centrifuged at 8,000 rpm at 4° C. and the cell pellets were collected and re-suspended in Buffer A (50 mM Tris-HCl, pH 7.4, and 20 mM NaCl) supplemented with EDTA-free complete protease inhibitor cocktail (Roche). The combined suspension was lysed by sonication, the lysate was centrifuged at 14,000 rpm at 4° C., and the clarified lysate was passed through a 0.45 μm filter (Millipore).

Example 43

Anion exchange purification of GroEL: The filtered lysate was loaded onto a GE HiScale Anion exchange column (Q Sepharose fast flow anion exchange resin) that was equilibrated with 2 column volumes of Buffer A. The loaded column was washed with 3 column volumes of Buffer A containing 28% of Buffer B (50 mM Tris-HCl, pH 7.4, and 1 M NaCl), then bound protein was eluted with a 28-60% gradient elution of Buffer B over 3 column volumes. Protein-containing fractions, as identified by SDS-PAGE, were collected, spin concentrated using a 10 kDa Amicon Ultra-15 centrifugal filter (EMD Millipore), and dialyzed overnight with 10 kDa SnakeSkin™ dialysis tubing (Thermo Scientific) at 4° C. in 50 mM Tris-HCl, pH 7.4, and 150 mM NaCl solution.

Example 44

Size exclusion chromatography of GroEL: The dialyzed protein was loaded onto a Superdex 200 size exclusion column (HiLoad 26/600, GE) that was equilibrated with 2 column volumes of 50 mM Tris-HCl, pH 7.4, and 150 mM NaCl solution. The loaded column was eluted with 1 column volume of 50 mM Tris-HCl, pH 7.4, and 150 mM NaCl solution. Protein-containing fractions, as identified by SDS-PAGE, were collected, spin concentrated using a 10 kDa Amicon Ultra-15 centrifugal filter (EMD Millipore), and dialyzed overnight with 10 kDa SnakeSkin™ dialysis tubing (Thermo Scientific) at 4° C. in 50 mM Tris-HCl, pH 7.4, and 150 mM NaCl solution. The final protein concentration was determined by Coomassie Protein Assay Kit (Thermo Scientific). Batches of GroEL protein for testing were stored at 4° C. for up to one month, then discarded.

Example 45

Anion exchange purification of GroES: The filtered lysate was loaded onto a GE HiScale anion exchange column (Q Sepharose fast flow anion exchange resin) that was equilibrated with 2 column volumes of Buffer A. The loaded column was washed with 3 column volumes of Buffer A containing 10% of Buffer B (50 mM Tris-HCl, pH 7.4, and 1 M NaCl), then bound protein was eluted with a 10-50% gradient elution of Buffer B over 3 column volumes. Protein-containing fractions, as identified by SDS-PAGE, were collected, spin concentrated using a 10 kDa Amicon Ultra-15 centrifugal filter (EMD Millipore), and dialyzed overnight with 10 kDa SnakeSkin™ dialysis tubing (Thermo Scientific) at 4° C. in 50 mM Tris-HCl, pH 7.4, and 150 mM NaCl solution.

Example 46

Size exclusion chromatography of GroES: The dialyzed protein was loaded onto a Superdex 200 size exclusion column (HiLoad 26/600, GE) that was equilibrated with 2 column volumes of 50 mM Tris-HCl, pH 7.4, and 150 mM NaCl solution. The loaded column was eluted with 1 column volume of 50 mM Tris-HCl, pH 7.4, and 150 mM NaCl solution. Protein-containing fractions, as identified by SDS-PAGE, were collected, spin concentrated using a 10 kDa Amicon Ultra-15 centrifugal filter (EMD Millipore), and dialyzed overnight with 10 kDa SnakeSkin™ dialysis tubing (Thermo Scientific) at 4° C. in 50 mM Tris-HCl, pH 7.4, and 150 mM NaCl solution. The final protein concentration was determined by Coomassie Protein Assay Kit (Thermo Scientific). Batches of GroES protein for testing were stored at 4° C. for up to one month, then discarded.

Example 47

Evaluating compounds for inhibition in the GroEL/ES-mediated dMDH refolding assay. All compounds were evaluated for inhibiting *E. coli* GroEL/ES-mediated refolding of the denatured MDH reporter enzyme. Reagent preparation: For these assays, four primary reagent stocks were prepared: 1) GroEL/ES-dMDH binary complex stock; 2) ATP initiation stock; 3) EDTA quench stock; 4) MDH enzymatic assay stock. Denatured MDH (dMDH) was prepared by 2-fold dilution of MDH (5 mg/ml, soluble pig heart MDH from Roche, product #10127248001) with denaturant buffer (7 M guanidine-HCl, 200 mM Tris, pH 7.4, and 50 mM DTT). MDH was completely denatured by incubating at room temperature for >45 min. The binary complex solutions were prepared by slowly adding the dMDH stock to a stirring stock with GroEL and GroES in folding buffer (50 mM Tris-HCl, pH 7.4, 50 mM KCl, 10 mM $MgCl_2$, and 1 mM DTT). The binary complex stocks were prepared immediately prior to dispensing into the assay plates and had final protein concentrations of 83.3 nM GroEL, 100 nM GroES, and 20 nM dMDH in folding buffer. For the ATP initiation stock, ATP solid was diluted into folding buffer to a final concentration of 2.5 mM. Quench solution contained 600 mM EDTA (pH 8.0). The MDH enzymatic assay stock consisted of 20 mM sodium mesoxalate and 1.6 mM NADH in reaction buffer (50 mM Tris-HCl, pH 7.4, 50 mM KCl, and 1 mM DTT).

Example 48

Assay Protocol: First, 30 µL aliquots of the GroEL/ES-dMDH binary complex stocks were dispensed into clear, 384-well polystyrene plates. Next, 0.5 µL of the compound stocks (10 mM to 4.6 µM, 3-fold dilutions series in DMSO) were added by pin-transfer (V&P Scientific). The chaperonin-mediated refolding cycles were initiated by addition of 20 µL of ATP stock (reagent concentrations during refolding cycle: 50 nM GroEL, 60 nM GroES, 12 nM dMDH, 1 mM ATP, and compounds of 100 µM to 46 nM, 3-fold dilution series) and the refolding reactions were incubated at 37° C. The incubation time was determined from refolding time-course control experiments until they reached ~90% completion of the refolding of dMDH—generally ~20-40 min. Next, the assay was quenched by addition of 10 µL of the EDTA stock to give a final concentration of 100 mM in the wells. Enzymatic activity of the refolded MDH was initiated by addition of 20 µL MDH enzymatic assay stock, and followed by measuring the NADH absorbance in each well at 340 nm using a Molecular Devices SpectraMax Plus384 microplate reader (NADH absorbs at 340 nm, while NAD+ does not). $A_{340\ nm}$ measurements were recorded at 0.5 minutes (start point) and at successive time points until the amount of NADH consumed reached ~90% (end point, generally between 20-35 minutes). The ratio between start and end point $A_{340}$ values were used to calculate the % inhibition of the GroEL/ES machinery by the compounds $IC_{50}$ values for the test compounds were obtained by plotting the % inhibition results in GraphPad Prism and analyzing by non-linear regression using the log (inhibitor) vs. response (variable slope) equation. Results presented represent the averages of $IC_{50}$ values obtained from at least four replicates in the GroEL/ES-dMDH refolding assay.

Example 49

Counter-screening compounds for inhibition of native MDH enzymatic activity.

Reagent Preparations & Assay Protocol: This assay was performed as described above for the GroEL/ES-dMDH refolding assay; however, the assay protocol differed in the sequence of compound addition to the assay plates. The refolding reactions were allowed to proceed for 45 min at 37° C. in the absence of test compounds (complete refolding of MDH occurs), then quenched with the EDTA stock. Compounds were then pin-transferred into the plates after the EDTA quenching step; thus, compound effects are only possible by inhibiting the fully-refolded MDH reporter substrate. Next, enzymatic activity of the refolded MDH was initiated by addition of 20 μL MDH enzymatic assay stock and followed by measuring the NADH absorbance in each well at 340 nm using a Molecular Devices SpectraMax Plus384 microplate reader (NADH absorbs at 340 nm, while NAD+ does not). $A_{340\ nm}$ measurements were recorded at 0.5 minutes (start point) and at successive time points until the amount of NADH consumed reached ~90% (end point, generally between 20-35 minutes). Compounds were tested in 8-point, 3-fold dilution series (62.5 μM to 29 nM during the reporter reaction) in clear, flat-bottom 384-well microtiter plates. $IC_{50}$ values for the MDH reporter enzyme were determined as described above. Results presented represent the averages of $IC_{50}$ values obtained from at least five replicates.

Example 50

Evaluating compounds for inhibition in the GroEL/ES-mediated dRho refolding assay. Reagent preparation: For this assay, five primary reagent stocks were prepared: 1) GroEL/ES-dRho binary complex stock; 2) ATP initiation stock; 3) thiocyanate enzymatic assay stock; 4) formaldehyde quench stock; 5) ferric nitrate reporter stock. Denatured rhodanese (dRho) was prepared by 3-fold dilution of rhodanese (Roche product #R1756, diluted to 10 mg/mL with $H_2O$) with denaturant buffer (12 M Urea, 50 mM Tris-HCl, pH 7.4, and 10 mM DTT). Rhodanese was completely denatured by incubating at room temperature for >45 min. The binary complex solution was prepared by slowly adding the dRho stock to a stirring stock of concentrated GroEL in modified folding buffer (50 mM Tris-HCl, pH 7.4, 50 mM KCl, 10 mM $MgCl_2$, 5 mM $Na_2S_2O_3$, and 1 mM DTT). The solution was centrifuged at 16,000×g for 5 minutes, and the supernatant was collected and added to a solution of GroES in modified folding buffer to give final protein concentrations of 100 nM GroEL, 120 nM GroES, and 80 nM dRho. The binary complex stock was prepared immediately prior to use. For the ATP initiation stock, ATP solid was diluted into modified folding buffer to a final concentration of 2.0 mM. The thiocyanate enzymatic assay stock was prepared to contain 70 mM $KH_2PO_4$, 80 mM KCN, and 80 mM $Na_2S_2O_3$ in water. The formaldehyde quench solution contained 30% formaldehyde in water. The ferric nitrate reporter stock contained 8.5% w/v $Fe(NO_3)_3$ and 11.3% v/v $HNO_3$ in water.

Example 51

Assay Protocol: First, 10 μL aliquots of the GroEL/ES-dRho complex stock were dispensed into clear, flat-bottom 384-well polystyrene plates. Next, 0.5 μL of the compound stocks (10 mM to 4.6 μM, 3-fold dilutions in DMSO) were added by pin-transfer. The chaperonin-mediated refolding cycle was initiated by addition of 10 μL of ATP stock (reagent concentrations during refolding cycle: 50 nM GroEL, 60 nM GroES, 40 nM dRho, 1 mM ATP, and compounds of 250 μM to 114 nM, 3-fold dilution series). After incubating for 40 minutes at 37° C. for the refolding cycle, 30 μL of the thiocyanate enzymatic assay stock was added and incubated for 60 min at room temperature for the refolded rhodanese enzymatic reporter reaction. The reporter reaction was quenched by adding 10 μL of the formaldehyde quench stock, and then 40 μL of the ferric nitrate reporter stock was added to quantify the amount of thiocyanate produced during the enzymatic reporter reaction, which is proportional to the amount of dRho refolded by GroEL/ES. After incubating at room temperature for 15 min, the absorbance by $Fe(SCN)_3$ was measured at 460 nm using a Molecular Devices SpectraMax Plus384 microplate reader. A second set of baseline control plates were prepared analogously, but without GroEL/ES-dRho protein binary solution, to correct for possible interference from compound absorbance or turbidity. $IC_{50}$ values for the test compounds were obtained by plotting the $A_{460}$ results in GraphPad Prism and analyzing by non-linear regression using the log (inhibitor) vs. response (variable slope) equation. Results presented represent the averages of $IC_{50}$ values obtained from at least four replicates.

Example 52

Counter-screening compounds for inhibition of native rhodanese enzymatic activity. Reagent Preparations & Assay Protocol: Reagents were identical to those used in the GroEL/ES-dRho refolding assay described above; however, the assay protocol differed in the sequence of compound addition to the wells. Compounds were pin-transferred after 50 minute incubation for the refolding cycle, but prior to the addition of the thiocyanate enzymatic assay stock. Thus, the refolding reactions were allowed to proceed for 50 min at 37° C. in the absence of test compounds, but the enzymatic activity of the refolded rhodanese reporter enzyme was monitored in the presence of test compounds (inhibitor concentration range during the enzymatic reporter reaction is 100 μM to 46 nM—3-fold dilutions). $IC_{50}$ values for the rhodanese reporter enzyme were determined as described above. Results presented represent the averages of $IC_{50}$ values obtained from at least four replicates.

Example 53

Evaluating compounds for inhibition in the GroEL/ES-mediated dMDH refolding assay and native MDH activity counter-screen in the presence of *E. coli* NfsB nitroreductase. These assays were performed nearly identically to those mentioned above, but with a couple distinct modifications. For both assays, 10 μg/mL of the *E. coli* NfsB nitroreductase enzyme (Sigma product #N9284) was added to the initial GroEL/ES-dMDH solution. For the GroEL/ES-dMDH refolding assay, after stamping with compounds, 10 μL of a 2.4 mM NADH solution was added, followed by a 10 minute incubation period at 37° C. to bioactivate the nitrofuran analogs. The remainder of the assay was conducted as in our standard protocol where no NfsB nitroreductase was present. With the extra 10 μL volume from the NADH addition, this made the compound concentrations during the refolding cycle part of the assay range from 83 μM to 38 nM (3-fold dilution series). For the native MDH activity counter-screen in the presence of *E. coli* NfsB nitroreductase, the assay was performed as described above for the GroEL/ES-dMDH refolding assay with NfsB; however, compound addition to the assay plates was conducted after the EDTA quench step, followed by a 10 minute incubation period at 37° C. to bioactivate the nitrofuran analogs. With the extra 10 μL volume from the NADH addition, this made the compound concentrations during the enzymatic reporter part of the assay range from 56 μM to 25 nM (3-fold dilution series). $IC_{50}$ values for the test compounds were obtained by plotting the % inhibition results in GraphPad Prism and analyzing by non-linear regression using the log (inhibitor) vs. response (variable slope) equation. Results presented represent the averages of $IC_{50}$ values obtained from at least four replicates in each assay.

Example 54

Evaluating compounds for inhibition in the GroEL/ES-mediated dRho refolding assay. All compounds were evaluated for inhibiting *E. coli* GroEL/ES-mediated refolding of the denatured Rho reporter enzyme as per our previously reported procedure. Results presented represent the averages of $IC_{50}$ values obtained from at least four replicates.

Example 55

Counter-screening compounds for inhibition of native rhodanese enzymatic activity. All compounds were counter-screened for inhibiting the enzymatic activity of the native Rho reporter enzyme as per our previously reported procedure. Results presented represent the averages of $IC_{50}$ values obtained from at least four replicates.

Example 56

Evaluating compounds for inhibition in the GroEL-mediated ATPase assay. All compounds were evaluated for inhibiting *E. coli* GroEL-mediated ATPase activity as per our previously reported procedure although employing only GroEL in solution and not containing GroES or denatured MDH. Evaluating compounds for inhibition in the GroEL-mediated ATPase assay.

Example 57

Reagent preparation: For this assay, four primary reagent solutions were prepared: 1) GroEL protein solution; 2) ATP initiation solution; 3) EDTA quench solution; 4) malachite green reporter solution. The GroEL protein solution consisted of 100 nM of GroEL in folding buffer (50 mM Tris-HCl, pH 7.4, 50 mM KCl, 10 mM $MgCl_2$, and 1 mM DTT), which was prepared immediately prior to dispensing into the assay plates. For the ATP initiation solution, ATP solid was diluted into folding buffer to a final concentration of 2 mM. Quench solution contained 300 mM EDTA (pH 8.0). The malachite green reporter solution contained 0.034% w/v malachite green, 1.04% w/v ammonium molybdate, 1% Tween-20, and 1 M HCl dissolved in $H_2O$.

Example 58

Assay Protocol: First, 10 μL aliquots of the GroEL protein solution were dispensed into clear, flat-bottom 384-well polystyrene plates. Next, 0.5 μL of the compound stocks (10 mM to 4.6 μM, 3-fold dilutions in DMSO) were added by pin-transfer. GroEL-mediated ATPase activity was initiated by addition of 10 μL of ATP solution (compound concentrations during the assay ranged from 250 μM to 114 nM). After incubating for 45 minutes at 37° C., 10 μL of the EDTA quench solution was added to quench the reaction cycle. Then, 60 μL of the malachite green reporter solution was added and the plates were incubated at room temperature for 10 min. The absorbance of the malachite green-phosphate complex was measured at 600 nm using a Molecular Devices SpectraMax Plus384 microplate reader. A second set of baseline control plates were prepared analogously, but without GroEL protein solution, to correct for possible interference from compound absorbance or turbidity. $IC_{50}$ values for the test compounds were obtained by plotting the $A_{600}$ results in GraphPad Prism and analyzing by non-linear regression using the log (inhibitor) vs. response (variable slope) equation. Results presented represent the averages of $IC_{50}$ values obtained from at least four replicates.

Example 59

Evaluating compounds for inhibition of bacterial cell proliferation.

All compounds were evaluated for inhibiting the proliferation of *E. coli* and each of the ESKAPE bacteria. Results presented represent the averages of $EC_{50}$ values obtained from at least four replicates. Evaluating compounds for inhibition of bacterial cell proliferation. Bacterial Strains: NEB 5-alpha *Escherichia coli* (a derivative of DH5α *E. coli*, New England Biolabs #C2987H); *Enterococcus faecium*—(Orla-Jensen) Schleifer and Kilpper-Balz strain NCTC 7171 (ATCC #19434); *Staphylococcus aureus*-Rosenbranch strain Seattle 1945 (ATCC #25923); *Klebsiella pneumoniae*—(Schroeter) Trevisan strain NCTC 9633 (ATCC #13883); *Acinetobacter baumannii*-Bouvet and Grimont strain 2208 (ATCC 19606); *Pseudomonas aeruginosa*—(Schroeter) Migula strain NCTC 10332 (ATCC #10145); *Enterobacter cloacae*—*E. cloacae*, subsp. *cloacae* (Jordan) Hormaeche and Edwards strain CDC 442-68 (ATCC #13047).

Growth Media: *E. coli* were grown with LB medium and all ESKAPE bacteria were grown in Brain Heart Infusion (BHI) medium (Becton, Dickinson and Company), with all liquid cultures supplemented with 25 mg/L $Ca^{2+}$ and 12.5 mg/L $Mg^{2+}$ to mimic physiological free concentrations of these cations. A 10 mg/mL $Ca^{2+}$ stock solution was prepared by dissolving 1.84 g of $CaCl_2 \cdot 2H_2O$ in 50 mL of deionized water, and a 10 mg/mL $Mg^{2+}$ stock solution was prepared by dissolving 4.18 g of $MgCl_2 \cdot 6H_2O$ in 50 mL deionized water-filter sterilized using 0.2 μm cellulose-acetate filters. 2.5 mL of the sterile 10 mg/mL $Ca^{2+}$ stock and 1.25 mL of the sterile 10 mg/mL $Mg^{2+}$ stock solutions were added per 1 L of autoclaved LB or BHI media to obtain 25 mg/L $Ca^{2+}$ and 12.5 mg/L $Mg^{2+}$ ions, respectively.

Example 60

General Assay Protocol: Stock bacterial cultures were streaked onto LB or BHI agar plates and grown overnight at 37° C. Fresh aliquots of cation supplemented media were inoculated with single bacterial colonies and the cultures were grown overnight at 37° C. with shaking (240 rpm). The following morning, cultures were diluted 10-fold into fresh media and grown at 37° C. until bacteria had reached mid-log phase growth ($OD_{600}$~0.4-0.6). The cultures were then diluted into fresh media to achieve final $OD_{600}$ readings of 0.017. Aliquots of these diluted cultures (30 μL) were added to clear, flat-bottom 384-well polystyrene plates that were previously stamped with 0.5 μL of test compounds in 20 μL of media (yielding initial $OD_{600}$=0.01 bacterial cultures). All compounds were tested in dose-response with concentration ranges during the proliferation assays from 100 μM to 46 nM (3-fold dilution series). A second set of baseline control plates were prepared analogously, but without any bacteria added, to correct for possible compound absorbance and/or precipitation. Plates were sealed with "Breathe Easy" oxygen permeable membranes (Diversified Biotech) and left to incubate at 37° C. without shaking (stagnant assay) until the bacteria had reached mid-log phase growth. Plates were then read at 600 nm using a Molecular Devices SpectraMax Plus384 microplate reader. $EC_{50}$ values for the test compounds were obtained by plotting the $OD_{600}$ results in GraphPad Prism and analyzing by non-linear regression using the log (inhibitor) vs. response (variable slope) equation. Results presented represent the averages of $EC_{50}$ values obtained from at least four replicates.

Examples 61

Evaluating compound effects on the viability of human colon and small intestine cells. All compounds were evaluated for cytotoxicity to human colon (FHC) and small intestine (FHs 74 Int) cells using an Alamar Blue-based viability assay. Results presented represent the averages of $CC_{50}$ values obtained from at least four replicates for the FHC and three replicates for the FHs 74 Int cell lines. Evaluating compound effects on the viability of human colon and small intestine cells. Evaluation of compound cytotoxicities to FHC colon and FHs 74 Int small intestine cells were performed using Alamar Blue-based viability assays. FHC cells were maintained in Hyclone DMEM:F12 1:1 medium containing L-glutamine and supplemented with 10 mM HEPES, 10 ng/ml cholera toxin, 0.005 mg/mL insulin, 0.005 mg/mL transferrin, 100 ng/ml hydrocortisone, and 10% FBS (Midwest Scientific, USDAFBS). FHs 74 Int cells were maintained in Hybri-care medium (ATCC 46-X) supplemented with 30 ng/mL recombinant epidermal growth factor (EGF) and 10% FBS (Midwest Scientific, USDAFBS). All assays were carried out in 384-well plates (BRAND cell culture grade plates, 781980). Cells at 90% confluence were harvested and diluted in growth medium, then 45 µL of the FHC cells (1,500 cells/well) or FHs 74 Int cells (1,500 cells/well) were dispensed per well. Plates were sealed with "Breathe Easy" oxygen permeable membranes (Diversified Biotech) and incubated at 37° C., 5% $CO_2$, for 24 h. The following day, 1 µL of the compound stocks (10 mM to 4.6 µM, 3-fold dilutions in DMSO) were pre-diluted by pin-transfer into 25 µL of the respective growth media, then 15 µL aliquots of these solutions were added to the cell assay plates to give inhibitor concentration ranges of 100 µM to 46 nM during the assay (final DMSO concentration of 1% was maintained during the assay). Plates were sealed with "Breathe Easy" oxygen permeable membranes and incubated for an additional 48 h at 37° C. and 5% $CO_2$. The Alamar Blue reporter reagents were then added to a final concentration of 10%, and the plates incubated at 37° C. and 5% $CO_2$ while the reporter reagents developed. Sample fluorescence (535 nm excitation, 590 nm emission) was read over time using a Molecular Devices FlexStation II 384-well plate reader (readings taken between 4-24 h of incubation so as to achieve signals in the 30-60% range for conversion of resazurin to resorufin). Cell viability was calculated as per vendor instructions (Thermo Fisher-Alamar Blue cell viability assay manual). Cytotoxicity $CC_{50}$ values for the test compounds were obtained by plotting the % resazurin reduction results in GraphPad Prism and analyzing by non-linear regression using the log (inhibitor) vs. response (variable slope) equation. Results presented represent the averages of $CC_{50}$ values obtained from at least four replicates for the FHC and three replicates for the FHs 74 Int cell lines.

Example 62

Evaluating the ability of E. coli to generate resistance to lead inhibitors.

To identify potential resistance toward nifuroxazide, nitrofurantoin, and lead inhibitor 17, a liquid culture, 12-day serial passage assay. Evaluating the ability of E. coli to generate resistance to lead inhibitors. To identify potential resistance toward 17, nifuroxazide, and nitrofurantoin, a liquid culture, 12-day serial passage assay was employed (each compound was tested in duplicate). NEB 5-alpha E. coli bacteria were streaked onto an LB agar plate and grown overnight at 37° C. Two fresh aliquots of LB media (supplemented with 25 mg/L $Ca^{2+}$ and 12.5 mg/L $Mg^{2+}$) were inoculated with separate bacterial colonies and the cultures were grown overnight at 37° C., with shaking (240 rpm). The overnight cultures were then sub-cultured (10× dilution) into fresh media solutions and grown at 37° C. to mid-log phase, then diluted into fresh media to achieve two separate cultures with final $OD_{600}$ readings of 0.01. Aliquots of the diluted cultures (200 µL) were dispensed into a clear, 96-well polystyrene plate (one culture was used for replicate 1 for each compound, and the other culture was used for replicate 2 for each compound), followed by the addition of 2 µL of nifuroxazide, nitrofurantoin, and compound 17 in DMSO. Test compounds were evaluated in duplicate with concentration ranges during the resistance assay from 100 µM to 48.8 nM, 2-fold dilution series. Plates were sealed with "Breathe Easy" oxygen permeable membranes (Diversified Biotech) and left to incubate at 37° C. without shaking (stagnant assay). $OD_{600}$ readings were taken at the 24 h time point to monitor for bacterial growth. A second baseline control plate was prepared analogously, without any bacteria added, to correct for possible compound absorbance and/or precipitation. For inoculations on subsequent days, bacteria from the wells with the highest test compound concentration where the $OD_{600}$ was >0.2, were sub-cultured in 5 mL of fresh media at 37° C. until mid-log phase growth was reached. Separate cultures were maintained from this point forward for each of the compound replicates—i.e. 6 cultures continually propagated. The bacteria were then diluted into fresh media to $OD_{600}$ of 0.01 and the bacteria were propagated again as described above. This procedure was repeated each day, for a total of 12 days, to observe changes in inhibitor $EC_{50}$ values over each passage (aliquots of each of these daily cultures were flash frozen in liquid nitrogen and stored at −80° C. for future use). Inhibitor $EC_{50}$ values were obtained by plotting the $OD_{600}$ results from each passage in GraphPad Prism and analyzing by non-linear regression using the log (inhibitor) vs. response (variable slope) equation.

Example 63

Control compounds, calculation of $IC_{50}/EC_{50}/CC_{50}$ values, and statistical considerations. For all assays, DMSO was used as negative control and a panel of our previously discovered and reported chaperonin inhibitors were used as positive controls: e.g. compounds 8, 9, and 18 from Johnson et. al 2014 and Abdeen et. al 2016; suramin and compound 2h-p from Abdeen et. al 2016; compounds 20R, 20L, and 28R from Abdeen et. al 2018; and closantel and rafoxanide from Kunkle et. al 2018. Bacterial proliferation assays also included antibiotic controls such as vancomycin, daptomycin, and rifampicin. All $IC_{50}/EC_{50}/CC_{50}$ results reported are averages of values determined from individual dose-response curves in assay replicates as follows: 1) individual I/E/CC$_{50}$ values from assay replicates were first log-transformed and the average log (I/E/CC$_{50}$) values and standard deviations (SD) calculated; 2) replicate log(I/E/CC$_{50}$) values were evaluated for outliers using the ROUT method in GraphPad Prism (Q of 10%); and 3) average I/E/CC$_{50}$ values were then back-calculated from the average log(I/E/CC$_{50}$) values. To compare log(IC$_{50}$) values between different assays, two-tailed Spearman correlation analyses were performed using GraphPad Prism (95% confidence level). For compounds where log(I/E/CC$_{50}$) values were greater than the maximum compound concentrations tested (i.e. >1.75, >1.80, >1.92, >2.00, and >2.40—or >56, >63, >83, >100, and >250 μM, respectively), results were represented as 0.1 log units higher than the maximum concentrations tested (i.e. 1.85, 1.90, 2.02, 2.10, and 2.50—or 71, 79, 105, 126, and 316 μM, respectively) so as not to overly bias results because of the unavailability of definitive values for inactive compounds.

Example 64

Previous studies identified bis-sulfonamido-2-phenylbenzoxazole (BSP) and salicylanilides (SCA) analogs that were potent GroEL/ES inhibitors with antibacterial activity against Gram-positive bacteria. Compound 1 was previously found to be a moderate inhibitor of GroEL/ES-mediated refolding of denatured rhodanese and malate dehydrogenase substrates (IC$_{50}$=18 & 31 μM, respectively) and a weak to moderate inhibitor of the proliferation of *B. subtilis* (EC$_{50}$=83 μM), methicillin-resistant *S. aureus* (EC$_{50}$=56 μM), *K. pneumoniae* (EC$_{50}$=95 μM), *A. baumannii* (EC$_{50}$=32 μM), and SM101 *E. coli* (EC$_{50}$=19 μM). Owing to its ability to inhibit both Gram-positive and Gram-negative bacteria, and its structural similarity to known antibacterials nitroxoline, nifuroxazide, and nitrofurantoin, in this study, we sought to develop new compound 1 analogs (Scheme 1) that were more potent and selective inhibitors of GroEL/ES and bacterial proliferation.

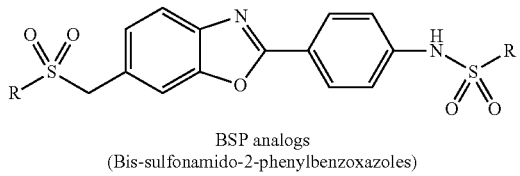

BSP analogs
(Bis-sulfonamido-2-phenylbenzoxazoles)

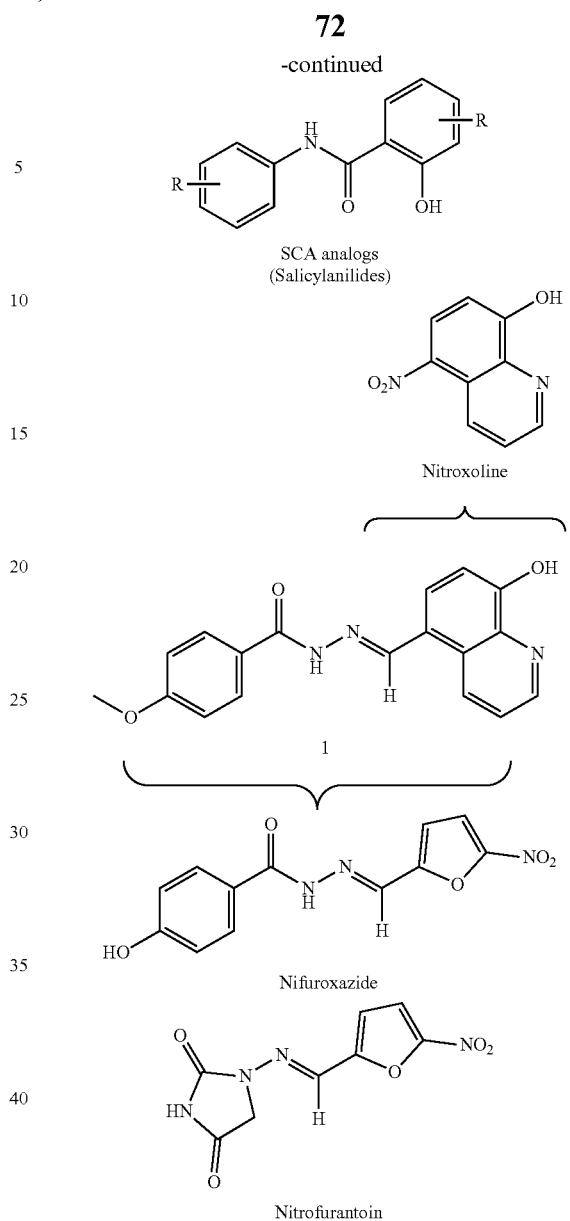

SCA analogs
(Salicylanilides)

Nitroxoline

1

Nifuroxazide

Nitrofurantoin

Scheme 1[a] Structures of the hydroxyquinoline (HQ—1-15) and nitrofuran (NF—16-28, including nitrofurantoin and nifuroxazide) series of analogs with the synthesis of compound 1 shown as a representative example.

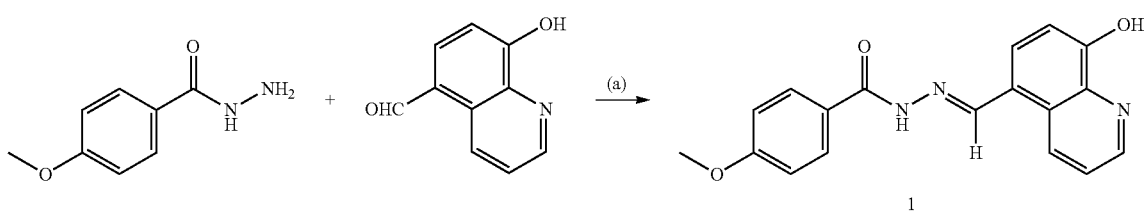

1

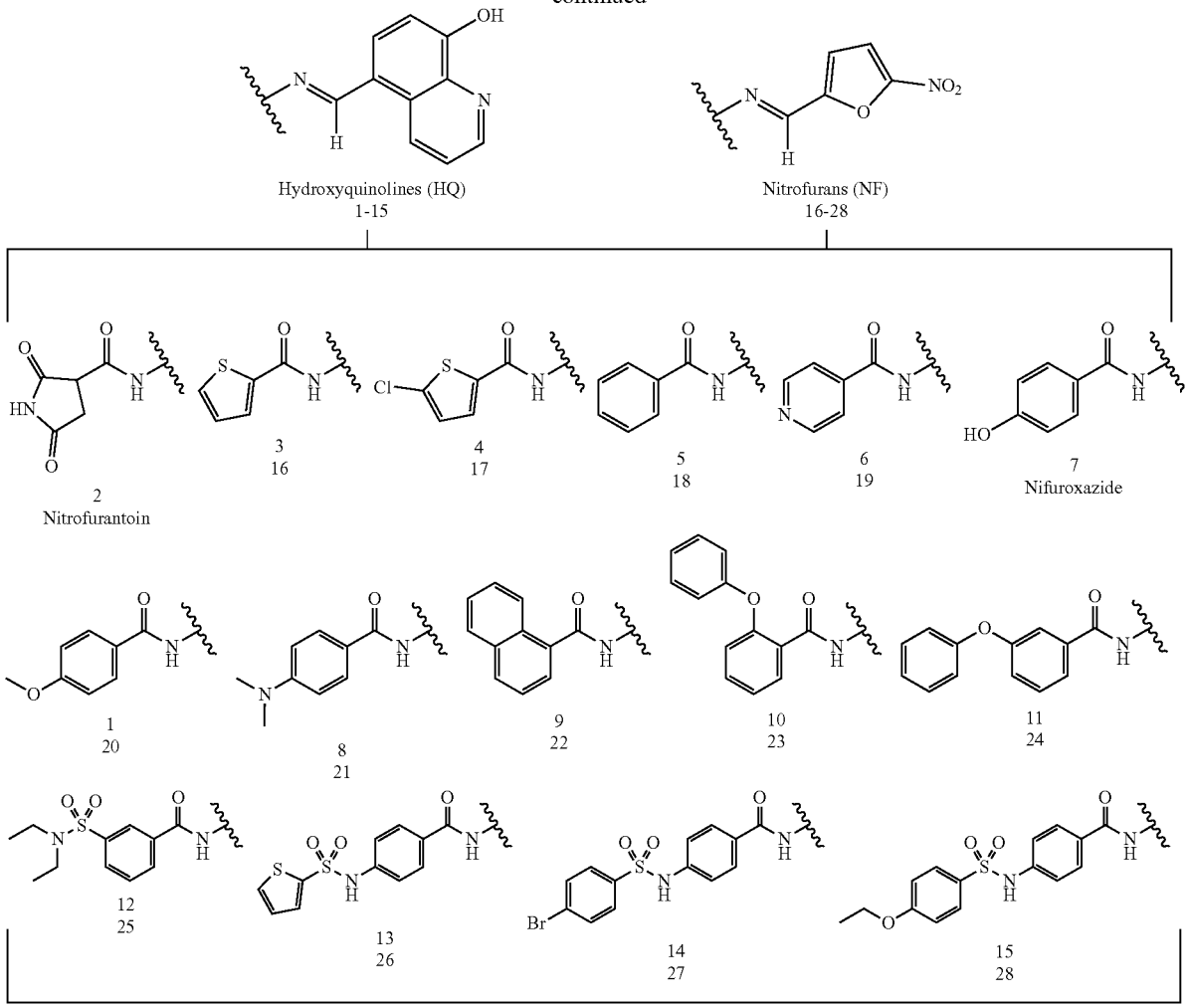

-continued

Hydroxyquinolines (HQ)
1-15

Nitrofurans (NF)
16-28

2
Nitrofurantoin 3
16

4
17

5
18

6
19

7
Nifuroxazide 1
20

8
21

9
22

10
23

11
24

12
25

13
26

14
27

15
28

$^a$ Reagents and conditions: (a) The hydrazide and aldehyde were stirred with cat. HCl in DMSO for 18 h, then precipitated in water, filtered, and dried in vacuo.

Based on the similarities of compound 1 with nitroxoline, nifuroxazide, and nitrofurantoin, we developed a library of analogs that probed the structure-activity relationships (SAR) of the cyclic/aryl substructures on both the right and left-hand sides of the N-acylhydrazone linker (Scheme 1). The right-hand substructure of these analogs contained either a hydroxyquinoline group (mimicking 1 and nitroxoline) or a nitrofuran group (mimicking nifuroxazide and nitrofurantoin), generating two distinct series of compounds. For each series, 15 left-side groups were assessed that contained a diverse range of substructures, including some that we have found effective with other GroEL/ES inhibitor scaffolds that have shown antibacterial properties (e.g. thiophenes, 2-chlorothiophenes, and aryl-sulfonamides). These analogs were tested in a panel of in vitro assays for bacterial proliferation inhibition, GroEL/ES inhibition (both substrate folding and ATPase functions), human cell cytotoxicity, and bacterial resistance towards lead analogs. The results from testing analogs in this panel of biochemical and cell-based experiments are presented herein, with a discussion on SAR and the potential of these series as GroEL/ES-targeting antibacterial candidates.

Example 65

Conceptualizing and developing the hydroxyquinoline and nitrofuran-containing series of compound 1 analogs. Owing to their similarity to the known antibacterials nitroxoline, nifuroxazide, and nitrofurantoin, we investigated two primary series of compound 1 analogs that also bore hydroxyquinoline and nitrofuran substructures (Scheme 1 as shown in Example 64). For each series, 15 left-side groups were assessed that contain a diverse range of substructures, including some that we have found effective with other GroEL/ES inhibitor scaffolds that have shown antibacterial properties (e.g. thiophenes, 2-chlorothiophenes, and aryl-sulfonamides). A third group of analogs (29-42) was also investigated to determine which parts of the hydroxyquinoline and nitrofuran aryls were required for inhibitor potency in the respective assays (refer to Tables 4 and 7 for the structures of compounds 29-42).

Example 66

Analogs were all synthesized through a one-step coupling reaction between the respective aryl-aldehydes and N-acyl-hydrazides in DMSO, with HCl as a catalyst. After stirring overnight at room temperature, the final N-acylhydrazone products were precipitated through the addition of water, and the solids were filtered, rinsed, and dried in vacuo. Where necessary, compounds were further purified via normal and/or reverse-phase chromatography. Synthesized analogs were analyzed by RP-HPLC for purity and LC-MS and $^1$H-NMR for structural. While all compounds were found to be >95% pure using two distinct sets of RP-HPLC conditions, for some analogs (3, 4, 6, 9, 10, 17, 23), we noticed a splitting of peaks in the $^1$H-NMR spectra. This phenomenon has previously been studied by others and reported as resulting from hindered rotation around the amide bond, providing rotational isomers (rotamers). Thus, we believe that the purity of these compounds is consistent with HPLC results showing >95% purity.

Example 67

Evaluating analogs for inhibiting the growth of *E. coli* and the ESKAPE bacteria. Analogs were initially tested for antibacterial efficacy against representative strains of antibiotic-sensitive *E. coli* and the ESKAPE bacteria. To determine compound efficacy, bacterial proliferation assays were carried out in liquid media culture supplemented with physiological concentrations of free calcium and magnesium cations. For these assays, bacterial cultures ($OD_{600}$=0.01) were exposed to test compounds in 8-point, 3-fold dilution series (100 μM to 46 nM concentration range), in 384-well plates. After addition of compounds to cultures, the plates were sealed with Breathe-Easy gas permeable membranes and allowed to grow to mid-log phase ($OD_{600}$~0.4-0.6), whereupon final $OD_{600}$ readings were taken to assess for bacterial growth and inhibition. Calculated $EC_{50}$ values are reported in Tables 1, 5, 6, and 7. For easier visualization of results, tables are heat-mapped according to inhibitor potencies, with darker cells representing the most potent analogs, and lighter cells the least potent inhibitors.

Table 1. Compilation of $EC_{50}$ values for the hydroxyquinoline and nitrofuran analogs tested in the ESKAPE and *E. coli* bacterial proliferation assays. Cells that are shaded darker grey are most potent, while those that are shaded lighter grey to white are less potent to inactive (>100 μM).

|  | # | E. faecium | S. aureus | K. pneumoniae | A. baumannii | P. aeruginosa | E. cloacae | E. coli |
|---|---|---|---|---|---|---|---|---|
| Hydroxyquinolines | 2 | >100 | 37 | >100 | >100 | >100 | >100 | 80 |
|  | 3 | >100 | 63 | 99 | 74 | >100 | 92 | 77 |
|  | 4 | 70 | 84 | >100 | >100 | >100 | >100 | >100 |
|  | 5 | >100 | 69 | 82 | 56 | >100 | 80 | 63 |
|  | 6 | >100 | >100 | >100 | >100 | >100 | >100 | 79 |
|  | 7 | >100 | 48 | 87 | 71 | >100 | 97 | 46 |
|  | 1 | >100 | 87 | 85 | >100 | 95 | 100 | >100 |
|  | 8 | >100 | 99 | >100 | >100 | >100 | >100 | 93 |
|  | 9 | >100 | 56 | >100 | >100 | >100 | >100 | >100 |
|  | 10 | >100 | >100 | >100 | >100 | 81 | >100 | >100 |
|  | 11 | >100 | >100 | >100 | >100 | >100 | >100 | >100 |
|  | 12 | >100 | >100 | >100 | >100 | 85 | >100 | 99 |
|  | 13 | >100 | >100 | >100 | >100 | >100 | >100 | >100 |
|  | 14 | >100 | >100 | >100 | 84 | >100 | >100 | 100 |
|  | 15 | >100 | >100 | >100 | >100 | >100 | >100 | >100 |
|  | Nitroxoline | 18 | 9.5 | 2.8 | 2.5 | 99 | 6.6 | 4.0 |
| Nitrofurans | Nitrofurantoin | 38 | 27 | 40 | >100 | >100 | 36 | 0.69 |
|  | 16 | 24 | 7.1 | 16 | 82 | >100 | 40 | 0.42 |
|  | 17 | 12 | 3.0 | 19 | 72 | >100 | 49 | 0.45 |
|  | 18 | 31 | 10 | 36 | >100 | >100 | >100 | 2.1 |
|  | 19 | 13 | 9.5 | 42 | 54 | >100 | 73 | 2.4 |
|  | Nifuroxazide | 8.1 | 16 | 37 | >100 | >100 | 54 | 0.87 |
|  | 20 | 22 | 8.1 | >100 | >100 | >100 | >100 | 1.9 |
|  | 21 | >100 | 34 | >100 | >100 | >100 | >100 | 10.0 |
|  | 22 | 16 | 6.0 | >100 | >100 | >100 | >100 | 41 |
|  | 23 | 11 | 5.2 | >100 | >100 | >100 | >100 | >100 |
|  | 24 | 11 | 3.5 | >100 | >100 | >100 | >100 | >100 |
|  | 25 | >100 | 9.6 | >100 | >100 | >100 | >100 | >100 |
|  | 26 | 11 | 11 | >100 | >100 | >100 | >100 | 17 |
|  | 27 | >100 | >100 | >100 | >100 | >100 | >100 | >100 |
|  | 28 | >100 | >100 | >100 | >100 | >100 | >100 | >100 |

Example 68

Results from the bacterial proliferation assays indicated that the hydroxyquinoline analogs were largely ineffective against *E. coli* and the ESKAPE pathogens, although several weak inhibitors were identified. Prior to initiating this study, we had held out hope that the metal-chelating properties of the hydroxyquinoline substructure might allow these inhibitors to act as siderophores that could be actively taken up into bacteria; however, the lack of efficacy in this series was perhaps not surprising as a previous study by Pelletier et al. had indicated that the antibacterial activity of nitroxoline was reduced upon cation supplementation. Despite this setback, we were excited to see that many of the nitrofuran-based analogs were much more effective at inhibiting bacterial growth. In particular, analogs 16-20, 22-24, and 26 were moderate to strong inhibitors of the Gram-positive *E. faecium* and *S. aureus* bacteria. For reasons that are not clear, and contrary to the GroEL/ES inhibition results (discussed below), the dimethylaniline (21) and bulkier sulfonamide-containing analogs (25-28) were less effective (or inactive) compared to the analogs with the smaller N-acylhydrazide substructures. Presumably these compounds suffered from efflux and/or poor permeability through the bacterial cell walls, since they were the most potent at inhibiting GroEL/ES and would thus be expected to be the most potent at killing bacteria if they achieved appreciably high intracellular concentrations, and presuming they were exhibiting on-target effects against GroEL/ES.

Example 69

While antibacterial effects were limited against the Gram-negative KAPE bacteria, a few analogs (16-21) were potent against *E. coli*, with $EC_{50}$ values≤11 µM. Compounds 16 and 17 were more potent than nitroxoline, nifuroxazide, and nitrofurantoin against *E. coli* ($EC_{50}$ values<1 µM), and were even moderate inhibitors of *K. pneumoniae*. These were significant findings as our previous studies failed to identify lead analogs with such high efficacies against *E. coli* or any of the Gram-negative KAPE bacteria. As evidenced by the results of compound 39 (Table 7), which has an unsubstituted furan ring, the nitro group was essential for antibacterial effects. This is putatively because nitrofuran antibiotics are activated to reactive metabolites by nitroreductases in bacteria, which we discuss further below. Additionally, the hydroxyquinoline and nitrofuran aldehyde starting materials (40 and 41, respectively) were potent inhibitors of nearly all the bacteria (excluding *P. aeruginosa*), yet the N-acylhydrazone analogs were largely ineffective against the KAPE bacteria, supporting our belief that the linkers were not hydrolyzing to their starting materials. Therefore, inhibitor potencies likely owed to the final products themselves, or their metabolites in the case of the nitrofuran series.

Example 70

Evaluating analogs for inhibiting GroEL/ES-mediated substrate refolding functions. Since we identified several analogs that potently inhibited the growth of both Gram-positive and Gram-negative bacteria, we next evaluated their abilities to inhibit *E. coli* GroEL/ES-mediated substrate folding functions in vitro. We first evaluated all test compounds in our standard GroEL/ES-mediated refolding assays that employ either malate dehydrogenase (MDH) or rhodanese (Rho) as the denatured substrate reporter enzymes. When denatured, these enzymes are efficiently folded by GroEL/ES in the absence of inhibitors, and thus act as reporters to determine the degree of inhibition against the bacterial chaperonin system. Inhibition was examined in the presence of these two orthogonal substrates in order to support that GroEL/ES inhibitors were on-target. To further support on-target effects against GroEL/ES, we counter-screened for inhibition of the native MDH and Rho enzymatic reporter reactions, where test compounds were added after the denatured MDH and Rho substrate enzymes were completely refolded by GroEL/ES. We have found that these series of four biochemical assays are highly effective at eliminating false-positives as compounds rarely inhibit both reporter enzymes since their enzymatic read-outs are so different from one another. $IC_{50}$ results for all compounds tested in these four assays are presented in Tables 2, 3, and 4 (shown below in Example 77).

Example 71

Unfortunately, we found that the nitrofuran analogs were only weak to moderate GroEL/ES inhibitors despite being the most potent at inhibiting bacterial growth (see the white diamond symbols in the correlation plots of FIG. 1A. Conversely, the hydroxyquinoline analogs (black circles in FIG. 1A) were much stronger GroEL/ES inhibitors, although they were largely inactive against bacteria. While the hydroxyquinolines were slightly more potent in the GroEL/ES-mediated dRho compared to dMDH refolding assays (See FIG. 1A), this was likely because several of them had the coupled effects of also being weak inhibitors of the native Rho reporter reaction (See FIG. 1B); however, no compounds inhibited native MDH, supporting on-target effects against GroEL/ES. Analogs 29-38, where the various parts of the hydroxyquinoline substructure were pared away, were largely inactive in all biochemical assays, indicating the necessity for the complete hydroxyquinoline moiety for inhibition. As mentioned in the previous section, the dimethylaniline-nitrofuran (21) and bulkier sulfonamide-containing analogs (12-15 and 25-28) were generally the most potent GroEL/ES inhibitors, yet the least effective or inactive against bacteria, suggesting they were unable to penetrate bacteria or were quickly effluxed out—otherwise they would have been expected to exhibit stronger antibacterial effects. Although, this is presuming that the antibacterial effects of these analogs was from on-target inhibition of GroEL/ES, which remains to be proven.

Example 72

Figure 1B:
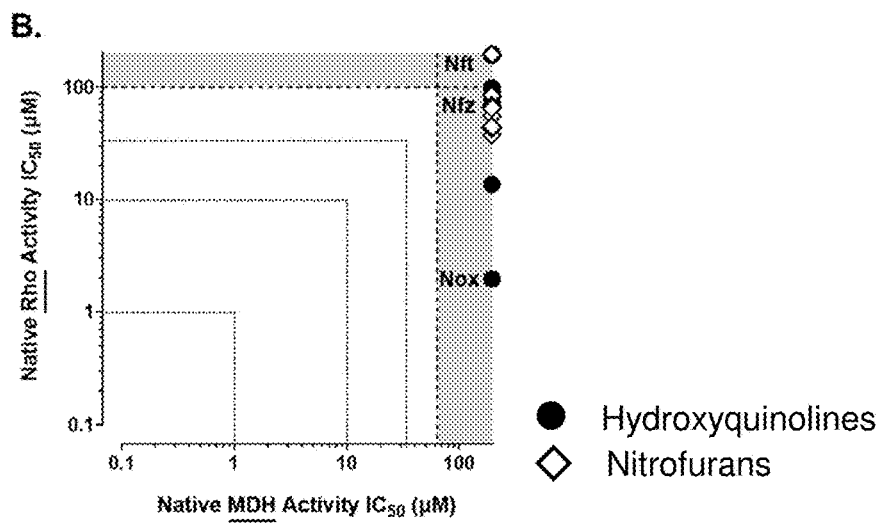
Figure 1C:
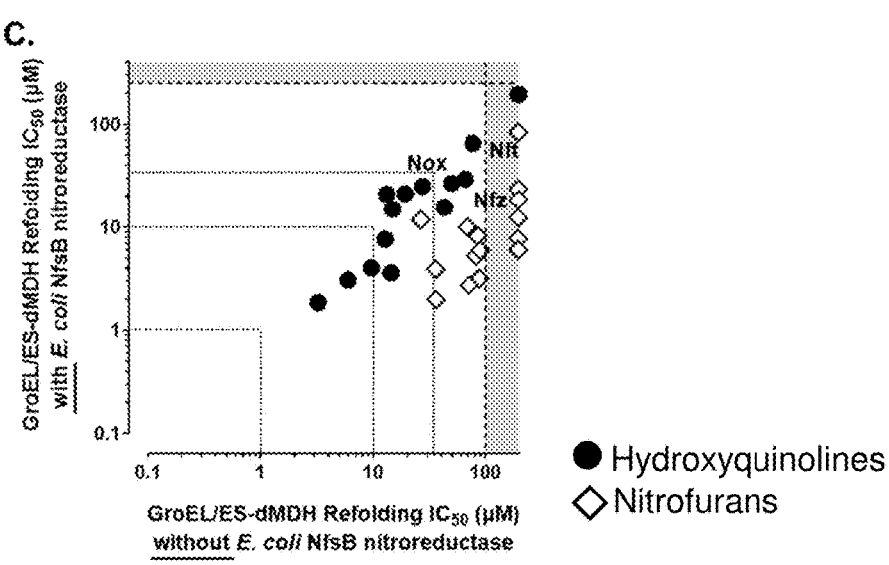

Referring to FIGS. 1A, 1B, and 1C, correlation plots of $IC_{50}$ values for compounds evaluated in the respective biochemical assays. FIG. 1A shows compounds inhibited nearly equipotently in the GroEL/ES-dMDH and the GroEL/ES-dRho refolding assays, supporting on-target effects (Spearman correlation coefficient comparing log ($IC_{50}$) values in each assay is 0.8877 (p<0.0001)). For the purposes of categorizing inhibitor potencies, we consider compounds with $IC_{50}$ values plotted in the grey zones to be inactive (i.e. greater than the maximum concentrations tested), >33 µM to be weak inhibitors, 11-33 µM moderate inhibitors, 1-11 µM potent inhibitors, and <1 µM very potent and acting near stoichiometrically since the concentration of GroEL tetradecamer is 50 nM during the refolding cycle (i.e. 700 nM GroEL monomeric subunits). FIG. 1B shows that while some compounds inhibited in the native Rho enzymatic reporter counter-screen, none inhibited native MDH enzymatic activity, further supporting on-target effects for inhibiting the chaperonin-mediated refolding cycle. FIG. 1C shows nitrofuran analogs exhibited increased inhibition in the GroEL/ES-dMDH refolding assay in the presence of *E. coli* NfsB, while hydroxyquinoline analogs did not (Spearman correlation coefficient comparing hydroxyquinoline log ($IC_{50}$) values in each assay is 0.9527 ($p<0.0001$)), supporting a pro-drug mechanism of action through metabolism of the nitro group. No compounds inhibited native MDH enzymatic activity in either the absence or presence of *E. coli* NfsB (See to Tables 2, 3, and 4). Results plotted in the grey zones represent $IC_{50}$ values higher than the maximum concentrations tested. Data points for nifuroxazide (Nfz), nitrofurantoin (Nft), and nitroxoline (Nox) are labelled for comparison.

Example 73

Evaluating analogs for inhibiting GroEL/ES-mediated substrate refolding functions in the presence of the *E. coli* NfsB type-1 nitroreductase. That none of the nitrofuran analogs were found to be potent GroEL/ES inhibitors is complicated by the fact that nitrofuran-based antibiotics are known to act as prodrugs in vivo—they require metabolism by bacterial nitroreductases to generate reactive metabolites that are associated with their antibacterial effects. However, our standard GroEL/ES-mediated refolding assays and native substrate reporter counter-screens were conducted without nitroreductases present. This emphasized the need to re-examine analogs in modified refolding and native reporter activity assays that included a nitroreductase enzyme to activate the nitrofuran analogs in situ, which would be more representative of the bacterial intracellular environment. As an initial test to see whether or not the activated nitrofuran metabolites would be more potent GroEL/ES inhibitors, we purchased the *E. coli* NfsB type 1 nitroreductase and modified our standard GroEL/ES-dMDH refolding and native MDH counter-screens to generate the reactive metabolites in situ (detailed protocols for these assays are presented in the Experimental section). We have reported $IC_{50}$ results from these assays in Tables 2, 3, and 4, and graphically in the correlation plot of FIG. 1C, where $IC_{50}$ values are compared between compounds tested in the GroEL/ES-dMDH refolding assay with and without the *E. coli* NfsB nitroreductase.

Example 74

In the presence of *E. coli* NfsB, the nitrofuran analogs exhibited dramatically increased inhibition of GroEL/ES refolding functions. The $IC_{50}$ values for the hydroxyquinoline (1-15) and other analogs without nitro groups (e.g. 29-42) were nearly identical in the presence and absence of NfsB, supporting that increased inhibition was dependent on modification of the nitrofuran moiety and not other effects on the overall compound scaffold or from NfsB itself. Furthermore, the nitrofuran metabolites were inactive in the native MDH reporter counter-screen, indicating that increased inhibition was obtained through selectively targeting the GroEL/ES-mediated refolding cycle. While the degree of potency shift varied between analogs, ten shifted to $IC_{50}$ values≤11 µM. As points of comparison, the most potent nitrofuran analog in the absence of NfsB had an $IC_{50}$=26 µM (analog 21), with six being completely inactive ($IC_{50}>100$ µM). Significant potency shifts were observed for the most effective antibacterials (16-20), showing that some of the strongest antibacterial compounds were also strong GroEL/ES inhibitors when activated by a nitroreductase enzyme. While activated nifuroxazide and nitrofurantoin were only weak to moderate GroEL/ES inhibitors in this new assay, this may not be surprising as they are reported in the literature to be preferentially activated by the other *E. coli* type 1 nitroreductase, NfsA.

Example 75

Figure 2A:
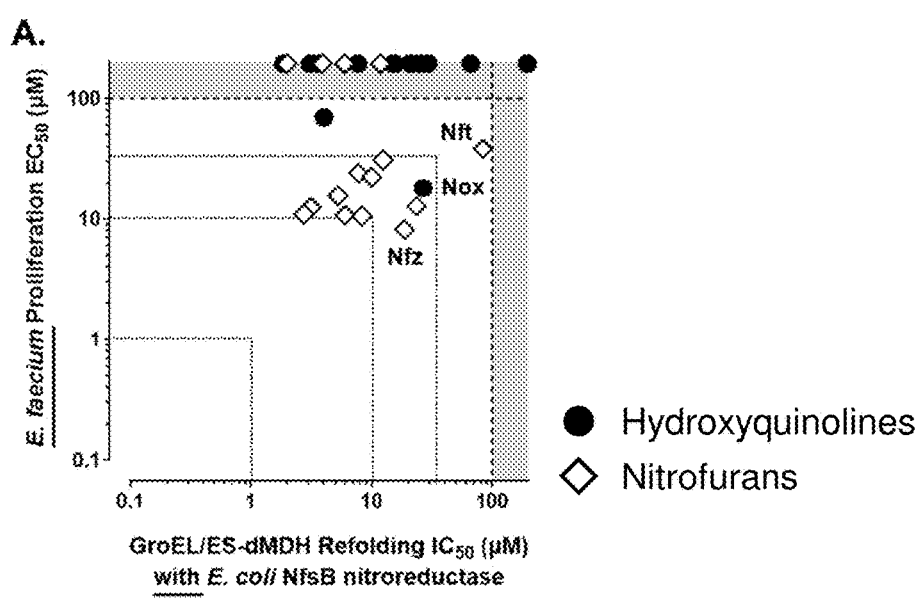
Figure 2B:
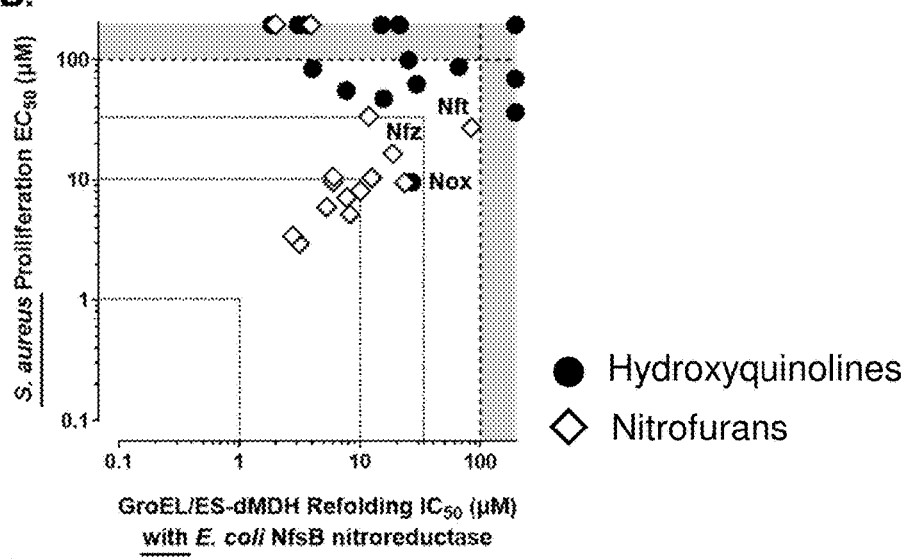

While we observed a general trend whereby the more potent that nitrofuran inhibitors were in the in situ NfsB-GroEL/ES-dMDH refolding assay, the more potent they were at inhibiting *S. aureus* proliferation (as shown in FIG. 2B), we are guarded as to whether or not inhibitors were potentially functioning on-target in bacteria. We note the limitations in the comparison since we had tested such a small set of analogs, and only tested them in the presence of *E. coli* NfsB. As the different nitrofuran analogs would be expected to exhibit varying SAR for activation by NfsA and NfsB, it will be important to test inhibitors in the presence of both nitroreductases to gain a more complete picture of how they could be functioning in bacteria. We are in the process of cloning and expressing *E. coli* nfsA and nfsB and developing an expanded panel of nitrofuran-based analogs to study inhibitor mechanisms in greater detail. Furthermore, investigating the nitroreductases of the various ESKAPE bacteria could provide a stronger rationale for why these compounds were largely inactive against the KAPE Gram-negative strains. Another limitation was that we were using the *E. coli* GroEL/ES chaperonin system as a surrogate in our assays. While we anticipate inhibition results will translate to the chaperonin systems of the other ESKAPE bacteria owing to their high sequence similarities (>56% amino acid identity between the chaperonins from *E. coli* and the ESKAPE bacteria), this still remains to be demonstrated.

Example 76

Figure 2C:
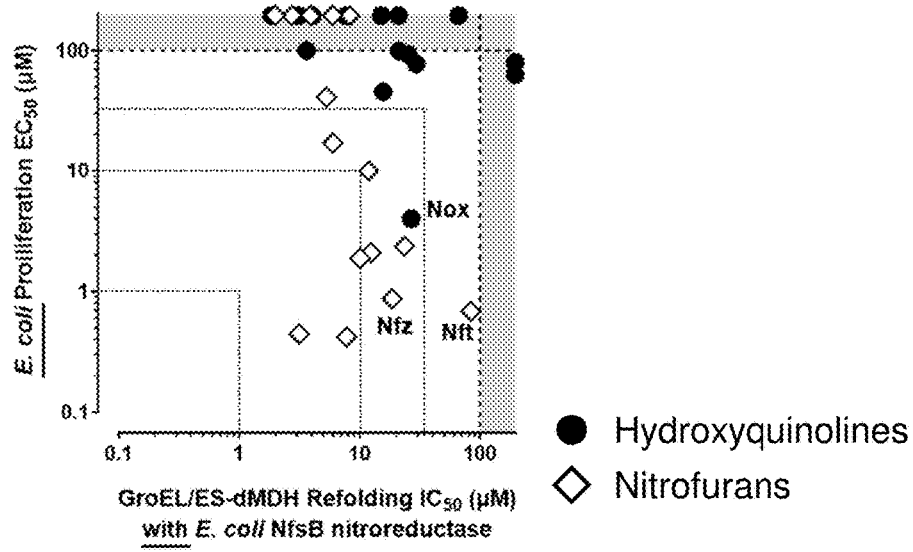

Referring to FIGS. 2A, 2B, and 2C, correlation plots comparing $IC_{50}$ values for compounds tested in the in situ NfsB-GroEL/ES-dMDH refolding assay with $EC_{50}$ values for inhibiting *E. faecium* (FIG. 2A), *S. aureus* (FIG. 2B), and *E. coli* (FIG. 2C) proliferation. While increasing inhibition by the nitrofurans in the in situ NfsB-GroEL/ES-dMDH refolding assay in general provided more effective inhibition of *S. aureus* growth (see FIG. 2B), more thorough studies will need to be conducted—e.g. testing a larger number of analogs in the presence of *S. aureus* nitroreductases and GroEL/ES chaperonin system—to gain a clearer picture of whether or not compounds may be functioning on-target against GroEL/ES in bacteria. Results plotted in the grey zones represent $IC_{50}$ and $EC_{50}$ values higher than the maximum concentrations tested. Data points for nifuroxazide (Nfz), nitrofurantoin (Nft), and nitroxoline (Nox) are labelled for comparison.

Example 77

Evaluating analogs for inhibiting GroEL-mediated ATPase activity. Since many proteins use ATP for their biological functions, inhibiting GroEL/ES by competitively binding to the ATP sites could prove problematic for being able to selectively target the chaperonin system. Thus, we further tested analogs in a well-established GroEL ATPase assay that employed malachite green to monitor inorganic phosphate liberated as GroEL hydrolyzed ATP. Briefly, a solution of GroEL was incubated with test compounds (8-point, 3-fold dilution series) and the assay was initiated by addition of ATP. After incubating for 45 minutes, the ATPase reaction was quenched by the addition of EDTA. Malachite green was then added to the assay to bind and detect free phosphates in solution (absorbance detection at λ=600 nm). If analogs inhibited ATPase activity, then there would be no free phosphates for malachite green to bind, leading to minimal absorbance at 600 nm. As indicated in Tables 2, 3, and 4, none of the analogs from either series inhibited GroEL by blocking ATP hydrolysis. Thus, we believe that these inhibitors bind to sites outside of the ATP pockets. While these results alleviate concerns about non-selectively targeting other ATP-dependent proteins, we further assessed off-target effects through a more definitive approach by evaluating analog cytotoxicity in two human cell lines, discussed below.

TABLE 2

$IC_{50}$. Biochemical assay $IC_{50}$ results for hydroxyquinoline analogs 1-15. Darker grey cell shading indicates compounds with more desirable bioactivity results (i.e. more potent GroEL/ES inhibitors with low inhibition of the native MDH and Rho reporter enzymes).

| Structure | # | Biochemical Assay $IC_{50}$ (μM) | | | | | | |
|---|---|---|---|---|---|---|---|---|
| | | Native Rho Activity | Native MDH Activity | Native MDH Activity w/NfsB | GroEL/ES-dRho Refolding | GroEL/ES-dMDH Refolding | NfsB-GroEL/ES-dMDH Refolding | GroEL ATPase |
| 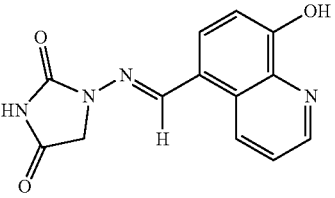 [SMILES: O=C1CN(/N=C/c2ccc(O)c3ncccc23)C(=O)N1] | 2 | >100 | >63 | >56 | 86.4 | >100 | >83 | >250 |
| 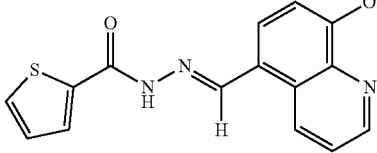 | 3 | 87 | >63 | >56 | 38 | 65 | 29 | >250 |
| 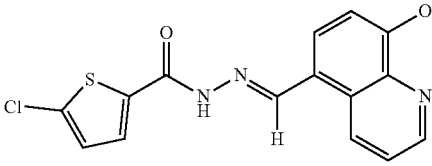 | 4 | 14 | >63 | >56 | 1.4 | 9.6 | 4.0 | >250 |
| 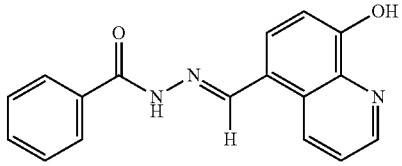 [SMILES: O=C(N/N=C/c1ccc(O)c2ncccc12)c1ccccc1] | 5 | 95 | >63 | >56 | 176 | >100 | >83 | >250 |
| 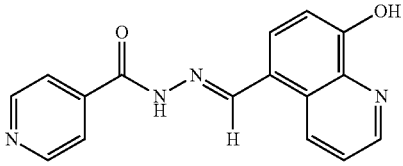 [SMILES: O=C(N/N=C/c1ccc(O)c2ncccc12)c1ccncc1] | 6 | >100 | >63 | >56 | >250 | >100 | >83 | >250 |
| 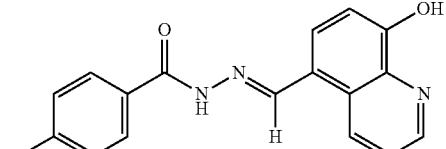 | 7 | 72 | >63 | >56 | 9.0 | 43 | 16 | >250 |

TABLE 2-continued

IC$_{50}$. Biochemical assay IC$_{50}$ results for hydroxyquinoline analogs 1-15. Darker grey cell shading indicates compounds with more desirable bioactivity results (i.e. more potent GroEL/ES inhibitors with low inhibition of the native MDH and Rho reporter enzymes).

| | | Biochemical Assay IC$_{50}$ (µM) | | | | | | |
|---|---|---|---|---|---|---|---|---|
| Structure | # | Native Rho Activity | Native MDH Activity | Native MDH Activity w/NfsB | GroEL/ES-dRho Refolding | GroEL/ES-dMDH Refolding | NfsB-GroEL/ES-dMDH Refolding | GroEL ATPase |
| | 1 | 98 | >63 | >56 | 31 | 77 | 66 | >250 |
| | 8 | 67 | >63 | >56 | 7.9 | 27 | 25 | >250 |
| | 9 | 97 | >63 | >56 | 2.1 | 13 | 7.7 | >250 |
| | 10 | 89 | >63 | >56 | 4.5 | 15 | 15 | >250 |
| | 11 | 85 | >63 | >56 | 7.8 | 13 | 21 | >250 |
| | 12 | 81 | >63 | >56 | 10 | 19 | 21 | >250 |
| | 13 | >100 | >63 | >56 | 0.81 | 3.2 | 1.9 | >250 |

TABLE 2-continued

IC$_{50}$. Biochemical assay IC$_{50}$ results for hydroxyquinoline analogs 1-15. Darker grey cell shading indicates compounds with more desirable bioactivity results (i.e. more potent GroEL/ES inhibitors with low inhibition of the native MDH and Rho reporter enzymes).

| Structure | # | Native Rho Activity | Native MDH Activity | Native MDH Activity w/NfsB | GroEL/ES-dRho Refolding | GroEL/ES-dMDH Refolding | NfsB-GroEL/ES-dMDH Refolding | GroEL ATPase |
|---|---|---|---|---|---|---|---|---|
| | | | | Biochemical Assay IC$_{50}$ (µM) | | | | |
| (structure) | 14 | >100 | >63 | >56 | 1.8 | 14 | 3.6 | >250 |
| (structure) | 15 | >100 | >63 | >56 | 1.4 | 6.0 | 3.1 | >250 |

TABLE 3

IC$_{50}$. Biochemical assay IC$_{50}$ results for nitrofuran analogs 16-28 plus nitrofurantoin and nifuroxazide. Darker grey cell shading indicates compounds with more desirable bioactivity results (i.e. more potent GroEL/ES inhibitors with low inhibition of the native MDH and Rho reporter enzymes).

| Structure | # | Native Rho Activity | Native MDH Activity | Native MDH Activity w/NfsB | GroEL/ES-dRho Refolding | GroEL/ES-dMDH Refolding | NfsB-GroEL/ES-dMDH Refolding | GroEL ATPase |
|---|---|---|---|---|---|---|---|---|
| | | | | Biochemical Assay IC$_{50}$ (µM) | | | | |
| (structure) | Nitrofurantoin | >100 | >63 | >56 | >250 | >100 | 84 | >250 |
| (structure) | 16 | >100 | >63 | >56 | 222 | >100 | 7.7 | >250 |
| (structure) | 17 | 56 | >63 | >56 | 60 | 88 | 3.2 | >250 |
| (structure) | 18 | 84 | >63 | >56 | 100 | >100 | 12 | >250 |

TABLE 3-continued

IC$_{50}$. Biochemical assay IC$_{50}$ results for nitrofuran analogs 16-28 plus nitrofurantoin and nifuroxazide. Darker grey cell shading indicates compounds with more desirable bioactivity results (i.e. more potent GroEL/ES inhibitors with low inhibition of the native MDH and Rho reporter enzymes).

| Structure | # | Native Rho Activity | Native MDH Activity | Native MDH Activity w/NfsB | GroEL/ ES-dRho Refolding | GroEL/ ES-dMDH Refolding | NfsB-GroEL/ ES-dMDH Refolding | GroEL ATPase |
|---|---|---|---|---|---|---|---|---|
| | 19 | 38 | >63 | >56 | 64 | >100 | 23 | >250 |
| | Nifur-oxa-zide | 69 | >63 | >56 | 133 | >100 | 19 | >250 |
| | 20 | >100 | >63 | >56 | 108 | 69 | 10 | >250 |
| | 21 | >100 | >63 | >56 | 26 | 26 | 12 | >250 |
| | 22 | 45 | >63 | >56 | 73 | 82 | 5.3 | >250 |
| | 23 | 43 | >63 | >56 | 83 | 85 | 8.3 | >250 |
| | 24 | 65 | >63 | >56 | 50 | 71 | 2.8 | >250 |
| | 25 | >100 | >63 | >56 | 100 | 90 | 6.0 | >250 |

TABLE 3-continued

IC$_{50}$. Biochemical assay IC$_{50}$ results for nitrofuran analogs 16-28 plus nitrofurantoin and nifuroxazide. Darker grey cell shading indicates compounds with more desirable bioactivity results (i.e. more potent GroEL/ES inhibitors with low inhibition of the native MDH and Rho reporter enzymes).

| Structure | # | Native Rho Activity | Native MDH Activity | Native MDH Activity w/NfsB | GroEL/ ES-dRho Refolding | GroEL/ ES-dMDH Refolding | NfsB-GroEL/ ES-dMDH Refolding | GroEL ATPase |
|---|---|---|---|---|---|---|---|---|
| 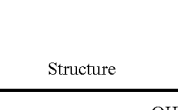 | 26 | 44 | >63 | >56 | 62 | >100 | 6.0 | >250 |
| 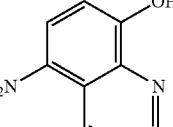 | 27 | 44 | >63 | >56 | 59 | 36 | 2.0 | >250 |
| 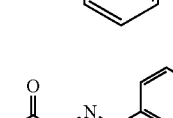 | 28 | 45 | >63 | >56 | 66 | 36 | 39 | >250 |

TABLE 4

IC$_{50}$. Biochemical assay IC$_{50}$ results for additional analogs examining the substructures of the hydroxyquinoline and nitrofuran aryls that are important for inhibition. Darker grey cell shading indicates compounds with more desirable bioactivity results (i.e. more potent GroEL/ES inhibitors with low inhibition of the native MDH and Rho reporter enzymes).

| Structure | R Group | # | Native Rho Activity | Native MDH Activity | Native MDH Activity w/NfsB | GroEL/ ES-dRho Refolding | GroEL/ ES-dMDH Refolding | NfsB-GroEL/ ES-dMDH Refolding | GroEL ATPase |
|---|---|---|---|---|---|---|---|---|---|
| 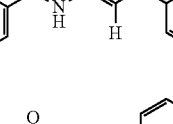 | Nitrox-oline | | 2.0 | >63 | >56 | 6.4 | 50 | 27 | >250 |
| | OCH$_3$ | 1 | 98 | >63 | >56 | 31 | 77 | 66 | >250 |
| | H | 5 | 95 | >63 | >56 | 176 | >100 | >83 | >250 |
| | OCH$_3$ | 29 | 66 | >63 | >56 | 117 | >100 | >83 | >250 |
| | H | 30 | 97 | >63 | >56 | 216 | >100 | >83 | >250 |
| | OCH$_3$ | 31 | >100 | >63 | >56 | >250 | >100 | >83 | >250 |
| | H | 32 | >100 | >63 | >56 | >250 | >100 | >83 | >250 |

TABLE 4-continued

IC$_{50}$. Biochemical assay IC$_{50}$ results for additional analogs examining the substructures of the hydroxyquinoline and nitrofuran aryls that are important for inhibition. Darker grey cell shading indicates compounds with more desirable bioactivity results (i.e. more potent GroEL/ES inhibitors with low inhibition of the native MDH and Rho reporter enzymes).

| Structure | R Group | # | Native Rho Activity | Native MDH Activity | Native MDH Activity w/NfsB | GroEL/ ES-dRho Refolding | GroEL/ ES-dMDH Refolding | NfsB-GroEL/ ES-dMDH Refolding | GroEL ATPase |
|---|---|---|---|---|---|---|---|---|---|
| 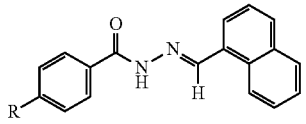 | OCH$_3$ | 33 | >100 | >63 | >56 | 129 | >100 | >83 | >250 |
| | H | 34 | >100 | >63 | >56 | 209 | >100 | >83 | >250 |
| 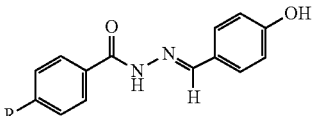 | OCH$_3$ | 35 | >100 | >63 | >56 | >250 | >100 | >83 | >250 |
| | H | 36 | >100 | >63 | >56 | >250 | >100 | >83 | >250 |
| 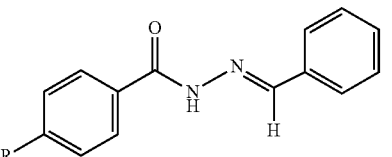 | OCH$_3$ | 37 | >100 | >63 | >56 | >250 | >100 | >83 | >250 |
| | H | 38 | >100 | >63 | >56 | >250 | >100 | >83 | >250 |
| 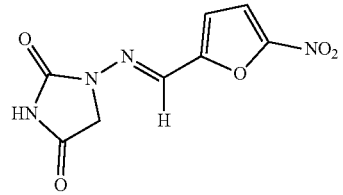 [SMILES: O=C1CN(/N=C/c2ccc([N+](=O)[O-])o2)C(=O)N1] | Nitro-furantoin | | >100 | >63 | >56 | >250 | >100 | 84 | >250 |
| 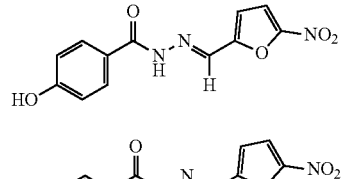 | Nifur-oxazide | | 69 | >63 | >56 | 133 | >100 | 19 | >250 |
| 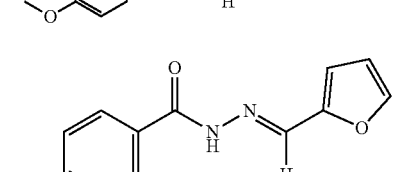 | | 20 | >100 | >63 | >56 | 108 | 69 | 10 | >250 |
| 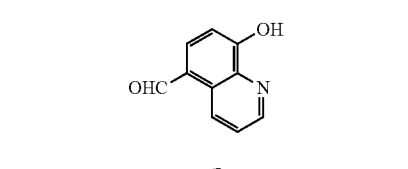 | | 39 | >100 | >63 | >56 | >250 | >100 | >83 | >250 |
| 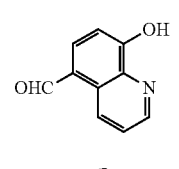 | | 40 | 18 | >63 | >56 | 30 | >100 | >83 | >250 |
| 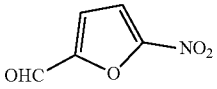 | | 41 | 32 | >63 | >56 | 31 | 78 | >83 | >250 |

TABLE 4-continued

IC$_{50}$. Biochemical assay IC$_{50}$ results for additional analogs examining the
substructures of the hydroxyquinoline and nitrofuran aryls that are important for inhibition.
Darker grey cell shading indicates compounds with more desirable bioactivity results (i.e. more
potent GroEL/ES inhibitors with low inhibition of the native MDH and Rho reporter enzymes).

| | | | Biochemical Assay IC$_{50}$ (µM) | | | | | | |
| --- | --- | --- | --- | --- | --- | --- | --- | --- | --- |
| Structure | R Group | # | Native Rho Activity | Native MDH Activity | Native MDH Activity w/NfsB | GroEL/ ES-dRho Refolding | GroEL/ ES-dMDH Refolding | NfsB-GroEL/ ES-dMDH Refolding | GroEL ATPase |
| 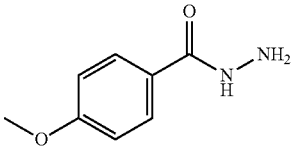 | | 42 | >100 | >63 | >56 | >250 | >100 | >83 | >250 |

Example 78

Evaluating the cytotoxicity of analogs to human colon and small intestinal cells. While in previous studies we have employed biochemical counter-screening with the human mitochondrial HSP60/10 chaperonin system, our accumulating results indicate that inhibiting HSP60/10 in vitro is a poor indicator of potential off-target toxicity to human cells. This is highlighted by the fact that we have identified many known drugs and natural products that are potent inhibitors of HSP60/10 biochemical function in vitro, yet exhibit little to no adverse effects in cells or animals. For instance, we found that suramin is a potent HSP60/10 inhibitor, yet it has been used safely for over 100 years as a first-line treatment for *Trypanosoma brucei* infections. In addition, as now identified in this study, bioactivation of nitrofuran antibiotics by nitroreductase enzymes greatly increases the extent of inhibition against GroEL/ES refolding activity, and potentially human HSP60/10; however, this further complicates testing against HSP60/10 since human cells do not contain nitroreductases. Therefore, we feel the most appropriate initial assessment of potential in vivo toxicity is to test compounds for cytotoxicity to human cells in culture.

Example 79

Figure 3A:
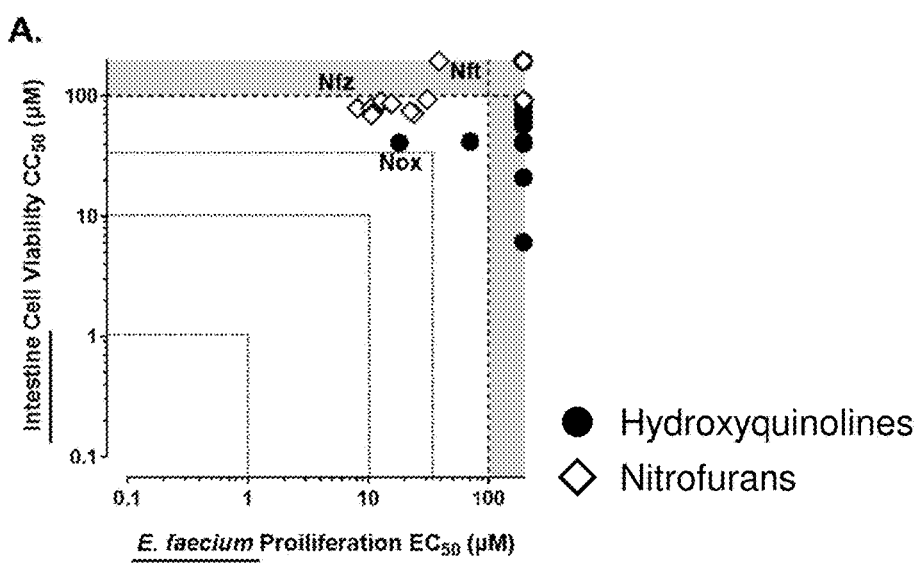
Figure 3B:
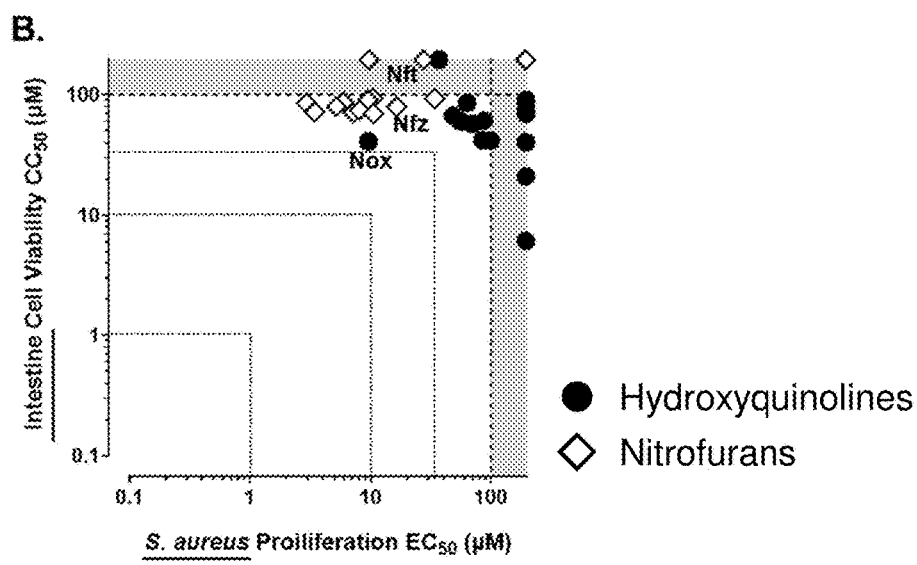
Figure 3C:
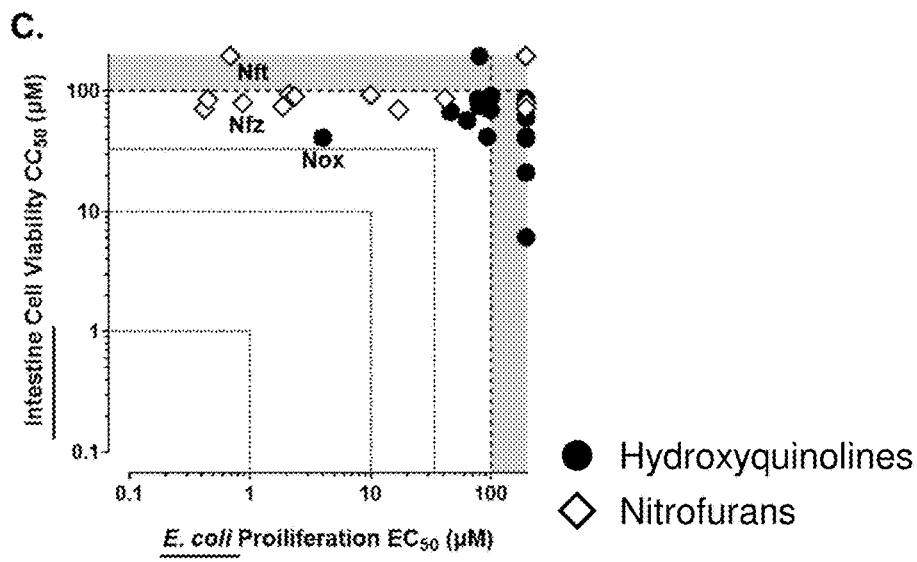
Figure 7A:
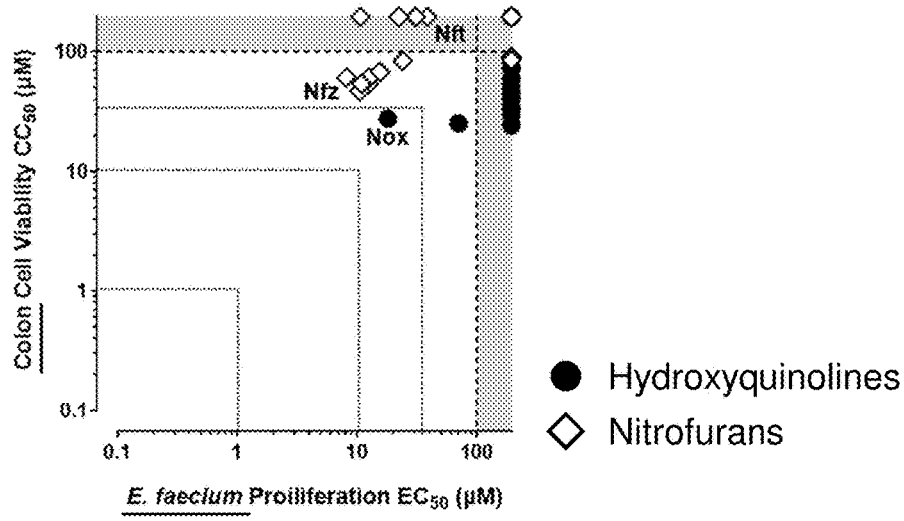
Figure 7B:
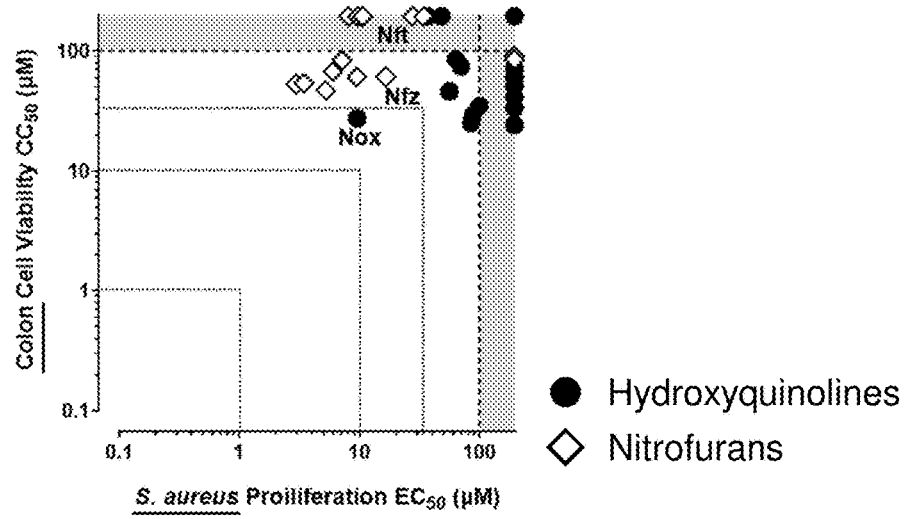
Figure 7C:
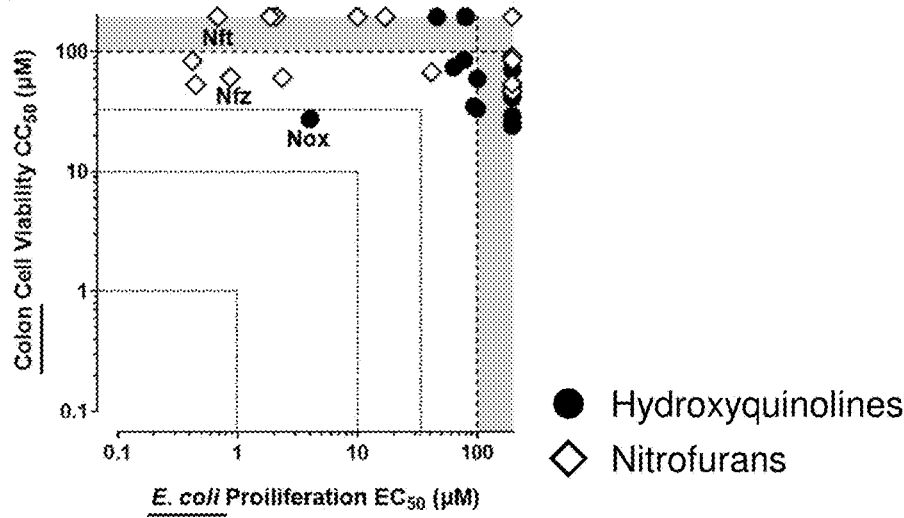

Referring to FIGS. 3A, 3B, and 3C, correlation plots examining the selectivity of compounds inhibiting the proliferation of *E. faecium* (FIG. 3A), *S. aureus* (FIG. 3B), and *E. coli* (FIG. 3C) over cytotoxicity to human FHs 74 Int small intestine cells (results for cytotoxicity to human FHC colon cells are similar, with CC$_{50}$ values reported in Tables 5, 6, and 7 and FIGS. 7A, 7B, and 7C. Results plotted in the grey zones represent EC$_{50}$, and CC$_{50}$ values higher than the maximum concentrations listed. Data points for nifuroxazide (Nfz), nitrofurantoin (Nft), and nitroxoline (Nox) are labelled for comparison.

TABLE 5

E/CC$_{50}$. Bacterial proliferation and human cell viability assay EC$_{50}$ & CC$_{50}$
results for hydroxyquinoline analogs 1-15. Darker grey cell shading indicates compounds with
more desirable bioactivity results (i.e. more potent inhibitors of bacterial proliferation with low
cytotoxicity to human cells).

| | | Bacterial Proliferation EC$_{50}$ or Human Cell Viability CC$_{50}$ (µM) | | | | | | | | |
| --- | --- | --- | --- | --- | --- | --- | --- | --- | --- | --- |
| Structure | # | E. fae- cium | S. aur- eus | K. pneu- moniae | A. baumannii | P. aeru- ginosa | E. cloacae | E. coli | Colon (FHC) | Intes- tine (FHS 74Int) |
| 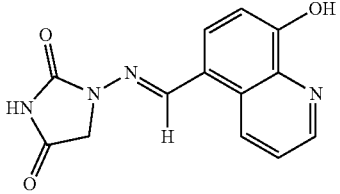 [SMILES: O=C1CN(/N=C/c2ccc(O)c3ncccc23)C(=O)N1] | 2 | >100 | 37 | >100 | >100 | >100 | >100 | 80 | >100 | >100 |
| 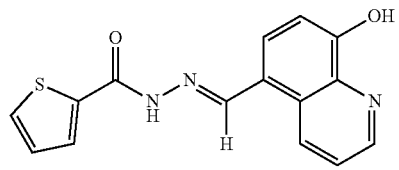 [SMILES: O=C(N/N=C/c1ccc(O)c2ncccc12)c1cccs1] | 3 | >100 | 63 | 99 | 74 | >100 | 92 | 77 | 85 | 86 |

TABLE 5-continued

E/CC$_{50}$. Bacterial proliferation and human cell viability assay EC$_{50}$ & CC$_{50}$ results for hydroxyquinoline analogs 1-15. Darker grey cell shading indicates compounds with more desirable bioactivity results (i.e. more potent inhibitors of bacterial proliferation with low cytotoxicity to human cells).

| Structure | # | Bacterial Proliferation EC$_{50}$ or Human Cell Viability CC$_{50}$ (μM) | | | | | | | | |
|---|---|---|---|---|---|---|---|---|---|---|
| | | E. fae-cium | S. aur-eus | K. pneu-moniae | A. baumannii | P. aeru-ginosa | E. cloacae | E. coli | Colon (FHC) | Intes-tine (FHS 74Int) |
| [5-chlorothiophene-2-carbohydrazide-8-hydroxyquinoline] | 4 | 70 | 84 | >100 | >100 | >100 | >100 | >100 | 25 | 42 |
| [benzohydrazide-8-hydroxyquinoline] | 5 | >100 | 69 | 82 | 56 | >100 | 80 | 63 | 74 | 57 |
| [isonicotinohydrazide-8-hydroxyquinoline] | 6 | >100 | >100 | >100 | >100 | >100 | >100 | 79 | >100 | 75 |
| [4-hydroxybenzohydrazide-8-hydroxyquinoline] | 7 | >100 | 48 | 87 | 71 | >100 | 97 | 46 | >100 | 67 |
| [4-methoxybenzohydrazide-8-hydroxyquinoline] | 1 | >100 | 87 | 85 | >100 | 95 | 100 | >100 | 29 | 61 |
| [4-dimethylaminobenzohydrazide-8-hydroxyquinoline] | 8 | >100 | 99 | >100 | >100 | >100 | >100 | 93 | 35 | 42 |
| [naphthalene-1-carbohydrazide-8-hydroxyquinoline] | 9 | >100 | 56 | >100 | >100 | >100 | >100 | >100 | 46 | 60 |
| [2-phenoxybenzohydrazide-8-hydroxyquinoline] | 10 | >100 | >100 | >100 | >100 | 81 | >100 | >100 | 71 | 87 |
| [3-phenoxybenzohydrazide-8-hydroxyquinoline] | 11 | >100 | >100 | >100 | >100 | >100 | >100 | >100 | 41 | 21 |

TABLE 5-continued

E/CC$_{50}$. Bacterial proliferation and human cell viability assay EC$_{50}$ & CC$_{50}$ results for hydroxyquinoline analogs 1-15. Darker grey cell shading indicates compounds with more desirable bioactivity results (i.e. more potent inhibitors of bacterial proliferation with low cytotoxicity to human cells).

| | | Bacterial Proliferation EC$_{50}$ or Human Cell Viability CC$_{50}$ (µM) | | | | | | | | |
|---|---|---|---|---|---|---|---|---|---|---|
| Structure | # | E. fae-cium | S. aur-eus | K. pneu-moniae | A. baumannii | P. aeru-ginosa | E. cloacae | E. coli | Colon (FHC) | Intestine (FHS 74Int) |
| [structure] | 12 | >100 | >100 | >100 | >100 | 85 | >100 | 99 | 34 | 69 |
| [structure] | 13 | >100 | >100 | >100 | >100 | >100 | >100 | >100 | 24 | 6.1 |
| [structure] | 14 | >100 | >100 | >100 | 84 | >100 | >100 | >100 | 59 | 91 |
| [structure] | 15 | >100 | >100 | >100 | >100 | >100 | >100 | >100 | 52 | 40 |

TABLE 6

E/CC$_{50}$. Bacterial proliferation and human cell viability assay EC$_{50}$ & CC$_{50}$ results for nitrofuran analogs 16-28 plus nitrofurantoin and nifuroxazide. Darker grey cell shading indicates compounds with more desirable bioactivity results (i.e. more potent inhibitors of bacterial proliferation with low cytotoxicity to human cells).

| | | Bacterial Proliferation EC$_{50}$ or Human Cell Viability CC$_{50}$ (µM) | | | | | | | | |
|---|---|---|---|---|---|---|---|---|---|---|
| Structure | # | E. fae-cium | S. au-reus | K. pneu-mo-niae | A. bau-man-nii | P. aeru-gin-osa | E. clo-acae | E. coli | Colon (FHC) | Intestine (FHS 74Int) |
| [structure] | Nitro-fur-an-toin | 38 | 27 | 40 | >100 | >100 | 36 | 0.69 | >100 | >100 |
| [structure] | 16 | 24 | 7.1 | 16 | 82 | >100 | 40 | 0.42 | 83 | 71 |

TABLE 6-continued

E/CC$_{50}$. Bacterial proliferation and human cell viability assay EC$_{50}$ & CC$_{50}$ results for nitrofuran analogs 16-28 plus nitrofurantoin and nifuroxazide. Darker grey cell shading indicates compounds with more desirable bioactivity results (i.e. more potent inhibitors of bacterial proliferation with low cytotoxicity to human cells).

| | | Bacterial Proliferation EC$_{50}$ or Human Cell Viability CC$_{50}$ (μM) | | | | | | | |
|---|---|---|---|---|---|---|---|---|---|
| Structure | # | E. fae-cium | S. au-reus | K. pneu-mo-niae | A. bau-man-nii | P. aeru-gin-osa | E. clo-acae | E. coli | Colon (FHC) | Intes-tine (FHS 74Int) |
| | 17 | 12 | 3.0 | 19 | 72 | >100 | 49 | 0.45 | 53 | 85 |
| | 18 | 31 | 10 | 36 | >100 | >100 | >100 | 2.1 | >100 | 94 |
| | 19 | 13 | 9.5 | 42 | 54 | >100 | 73 | 2.4 | 61 | 90 |
| | Ni-fur-oxa-zide | 8.1 | 16 | 37 | >100 | >100 | 54 | 0.87 | 61 | 79 |
| | 20 | 22 | 8.1 | >100 | >100 | >100 | >100 | 1.9 | >100 | 75 |
| | 21 | >100 | 34 | >100 | >100 | >100 | >100 | 10.0 | >100 | 93 |
| | 22 | 16 | 6.0 | >100 | >100 | >100 | >100 | 41 | 67 | 87 |
| | 23 | 11 | 5.2 | >100 | >100 | >100 | >100 | >100 | 47 | 80 |
| | 24 | 11 | 3.5 | >100 | >100 | >100 | >100 | >100 | 54 | 72 |
| | 25 | >100 | 9.6 | >100 | >100 | >100 | >100 | >100 | >100 | >100 |

TABLE 6-continued

E/CC$_{50}$. Bacterial proliferation and human cell viability assay EC$_{50}$ & CC$_{50}$ results for nitrofuran analogs 16-28 plus nitrofurantoin and nifuroxazide. Darker grey cell shading indicates compounds with more desirable bioactivity results (i.e. more potent inhibitors of bacterial proliferation with low cytotoxicity to human cells).

| Structure | # | E. faecium | S. aureus | K. pneumoniae | A. baumannii | P. aeruginosa | E. cloacae | E. coli | Colon (FHC) | Intestine (FHS 74Int) |
|---|---|---|---|---|---|---|---|---|---|---|
| 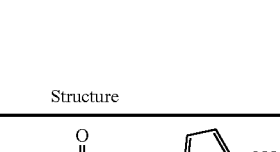 | 26 | 11 | 11 | >100 | >100 | >100 | >100 | 17 | >100 | 70 |
| 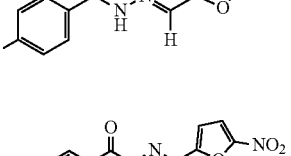 | 27 | >100 | >100 | >100 | >100 | >100 | >100 | >100 | 90 | >100 |
| 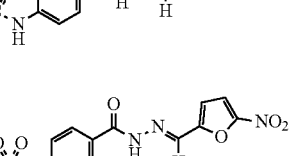 | 28 | >100 | >100 | >100 | >100 | >100 | >100 | >100 | 85 | >100 |

TABLE 7

E/CC$_{50}$. Bacterial proliferation and human cell viability assay EC$_{50}$ & CC$_{50}$ results for additional analogs examining the substructures of the hydroxyquinoline and nitrofuran aryls that are important for inhibition. Darker grey cell shading indicates compounds with more desirable bioactivity results (i.e. more potent inhibitors of bacterial proliferation with low cytotoxicity to human cells).

| Structure | R Group | # | E. faecium | S. aureus | K. pneumoniae | A. baumannii | P. aeruginosa | E. cloacae | E. coli | Colon (FHC) | Intestine (FHS 74Int) |
|---|---|---|---|---|---|---|---|---|---|---|---|
| Nitroxoline | | | 18 | 9.5 | 2.8 | 2.5 | 99 | 6.6 | 4.0 | 28 | 41 |
| | OCH$_3$ | 1 | >100 | 87 | 85 | >100 | 95 | 100 | >100 | 29 | 61 |
| | H | 5 | >100 | 69 | 82 | 56 | >100 | 80 | 63 | 74 | 57 |
| | OCH$_3$ | 29 | >100 | >100 | >100 | >100 | >100 | >100 | >100 | >100 | >100 |
| | H | 30 | >100 | 88 | >100 | >100 | >100 | >100 | >100 | >100 | >100 |

TABLE 7-continued

E/CC₅₀. Bacterial proliferation and human cell viability assay EC₅₀ & CC₅₀ results for additional analogs examining the substructures of the hydroxyquinoline and nitrofuran aryls that are important for inhibition. Darker grey cell shading indicates compounds with more desirable bioactivity results (i.e. more potent inhibitors of bacterial proliferation with low cytotoxicity to human cells).

| Structure | R Group | # | E. faecium | S. aureus | K. pneumoniae | A. baumannii | P. aeruginosa | E. cloacae | E. coli | Colon (FHC) | Intestine (FHS 74Int) |
|---|---|---|---|---|---|---|---|---|---|---|---|
| 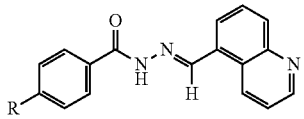 | OCH₃<br>H | 31<br>32 | >100<br>>100 | >100<br>>100 | >100<br>>100 | >100<br>>100 | >100<br>>100 | >100<br>>100 | >100<br>>100 | >100<br>>100 | >100<br>>100 |
| 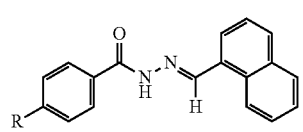 | OCH₃<br>H | 33<br>34 | >100<br>>100 | >100<br>>100 | >100<br>>100 | >100<br>>100 | >100<br>>100 | >100<br>>100 | >100<br>>100 | >100<br>100 | >100<br>>100 |
| 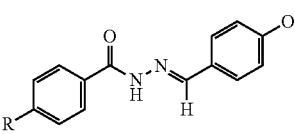 | OCH₃<br>H | 35<br>36 | >100<br>>100 | >100<br>>100 | >100<br>>100 | >100<br>>100 | >100<br>>100 | >100<br>>100 | >100<br>>100 | >100<br>>100 | >100<br>>100 |
| 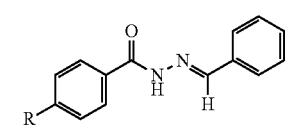 | OCH₃<br>H | 37<br>38 | >100<br>>100 | >100<br>>100 | >100<br>>100 | >100<br>>100 | >100<br>>100 | >100<br>>100 | >100<br>>100 | >100<br>>100 | >100<br>>100 |
| 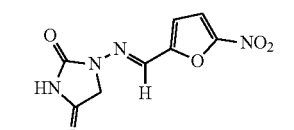 | Nitrofurantoin | | 38 | 27 | 40 | >100 | >100 | 36 | 0.69 | >100 | >100 |
| 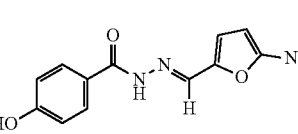 | Nifuroxazide | | 8.1 | 16 | 37 | >100 | >100 | 54 | 0.87 | 61 | 79 |
| 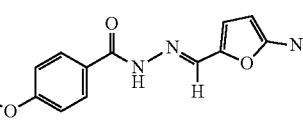 | | 20 | 22 | 8.1 | >100 | >100 | >100 | >100 | 1.9 | >100 | 75 |
| 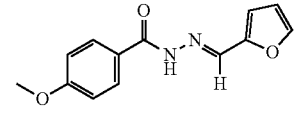 [SMILES: COc1ccc(C(=O)N/N=C/c2ccco2)cc1] | | 39 | >100 | >100 | >100 | >100 | >100 | >100 | >100 | >100 | >100 |
| 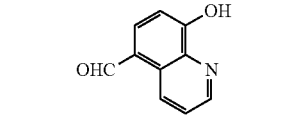 [SMILES: O=Cc1ccc(O)c2ncccc12] | | 40 | 7.3 | 19 | 15 | 11 | >100 | 24 | 14 | 4.4 | 15 |
| 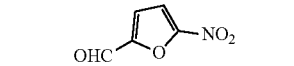 | | 41 | 20 | 5.8 | 10 | 12 | >100 | 13 | 9.5 | 53 | 63 |

TABLE 7-continued

E/CC$_{50}$. Bacterial proliferation and human cell viability assay EC$_{50}$ & CC$_{50}$ results for additional analogs examining the substructures of the hydroxyquinoline and nitrofuran aryls that are important for inhibition. Darker grey cell shading indicates compounds with more desirable bioactivity results (i.e. more potent inhibitors of bacterial proliferation with low cytotoxicity to human cells).

| | | | Bacterial Proliferation EC$_{50}$ or Human Cell Viability CC$_{50}$ (µM) | | | | | | | |
|---|---|---|---|---|---|---|---|---|---|---|
| Structure | R Group | # | E. faecium | S. aureus | K. pneumoniae | A. baumannii | P. aeruginosa | E. cloacae | E. coli | Colon (FHC) | Intestine (FHS 74Int) |
| (4-methoxybenzohydrazide structure) | | 42 | >100 | >100 | >100 | >100 | >100 | >100 | >100 | >100 | >100 |

Example 80

To assess for potential cytotoxic effects, compounds were tested in two Alamar Blue-based cell viability assays using human FHC colon and FHs 74 Int small intestinal cells. Briefly, we grew cells to ~80-90% confluency, then sub-cultured 1,500 cells per well (in 384-well plates) for 24 h in the absence of test compounds. Compounds were then added and the cultures were incubated for an additional 48 h, whereupon the Alamar Blue reporter reagents were added and well fluorescence was monitored over time. Alamar Blue contains resazurin (non-fluorescent), which is reduced to resorufin (highly fluorescent) in the presence of viable cells. Cell cytotoxicity CC$_{50}$ values in are shown Tables 5, 6, and 7. As graphically presented in FIGS. 3A, 3B, and 3C correlation plots comparing bacterial proliferation EC$_{50}$ to human cell cytotoxicity CC$_{50}$ results, lead nitrofuran inhibitors (16, 17, 20, nitrofurantoin, and nifuroxazide) selectively inhibited E. faecium, S. aureus, and E. coli proliferation with low to no cytotoxicity to human cells (representative results are shown for human FHs 74 Int small intestine cells, but results are similar for FHC colon cells and are presented in FIGS. 7A, 7B, and 7C). Intriguingly, the nitrofuran analogs were typically less toxic than their hydroxyquinoline counterparts, putatively because they would need to be metabolized to their active intermediates, yet human cells do not harbor nitroreductases.

Example 81

Investigating the ability of E. coli to gain resistance to 17, nifuroxazide, and nitrofurantoin. As we discovered several nitrofuran-based analogs that selectively inhibited the growth of E. faecium, S. aureus, and E. coli with minimal toxicity to human cells, we next investigated how easy it would be for bacteria to generate resistance to a lead candidate. We examined the ability of E. coli to generate resistance to 17 (with nifuroxazide and nitrofurantoin as controls), since resistance to nitrofuran-based antibiotics has been well-characterized in this bacterium. While 17, nifuroxazide, and nitrofurantoin were all potent inhibitors of E. coli proliferation, 17 was the most potent at inhibiting GroEL/ES in the presence of NfsB, and thus may exhibit greater on-target effects in bacteria. However, as discussed above, we do appreciate the limitations of not employing NfsA. To identify differences in the ability of E. coli to generate resistance to these three compounds with distinct bioactivity profiles, we employed a 12 day resistance assay as we previously reported for our hydroxybiphenylamide lead candidate S. aureus inhibitors. A dilute culture of E. coli (OD$_{600}$=0.01) was grown in the presence of inhibitors for 24 h (tested in dose-response in duplicates), then EC$_{50}$ results were determined from the OD$_{600}$ readings of the wells. Over the course of 12 days, we sequentially sub-cultured bacteria from the respective wells with the highest concentration of inhibitors where bacteria grew to an OD$_{600}$>0.2, monitoring for increases in EC$_{50}$ values over time.

Example 82

Figure 4A:
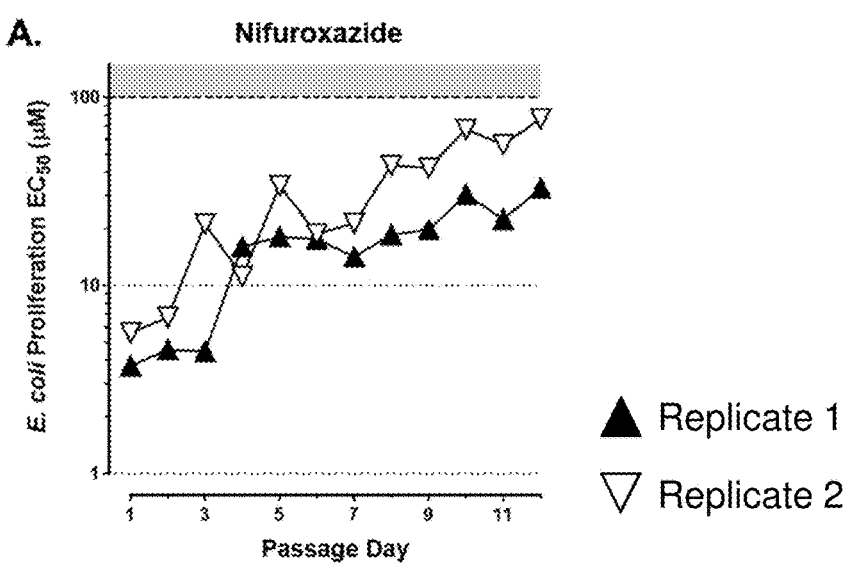
Figure 4B:
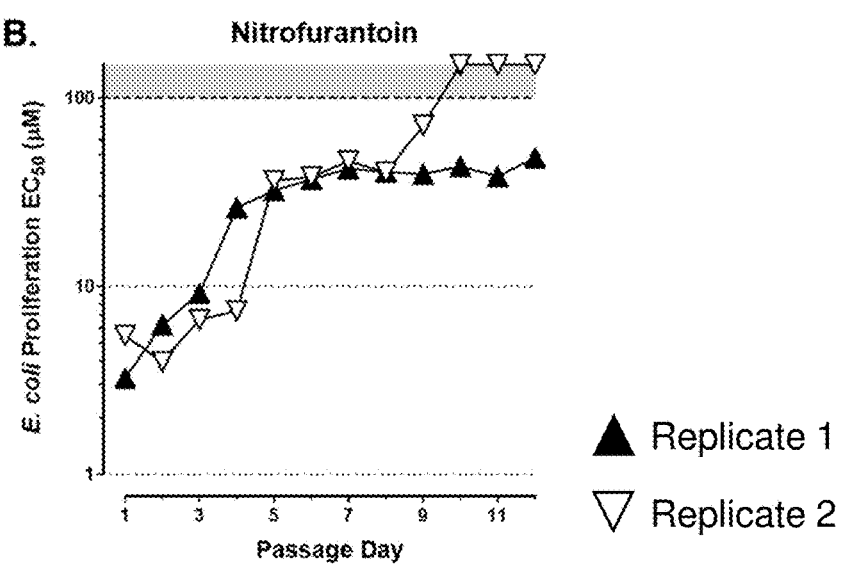
Figure 4C:
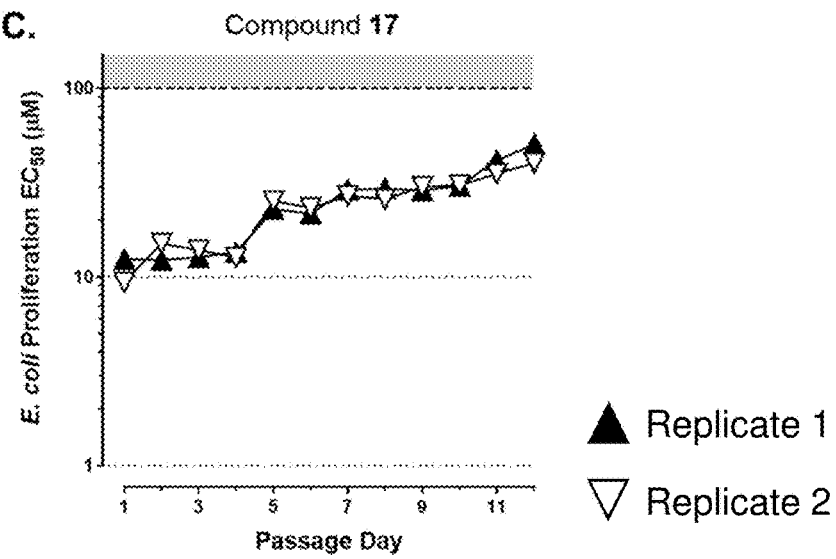

While we found that nifuroxazide and nitrofurantoin were initially more potent than 17 as shown in FIGS. 4A, 4B, and 4C, E. coli quickly developed intermediate resistance (within 3-5 days) such that all three inhibitors were nearly equipotent. This initial resistance was putatively through mutations affecting NfsA function, as previously reported. That EC$_{50}$ values then somewhat plateaued in the 20-40 µM range is consistent with NfsB still being able to metabolize the nitrofuran moieties and maintain efficacy, albeit at a reduced capacity. EC$_{50}$ values continued to slowly increase over time for all three compounds, with a particular jump in resistance seen for the second set of replicates for nitrofurantoin and nifuroxazide to a lesser extent, but not for 17. Thus, inhibitors that are preferentially activated by NfsB, as may be the case for 17, might be more effective drug candidates with respect to combatting the emergence of drug resistant strains.

Example 83

Referring to FIGS. 4A, 4B, and 4C, evaluating the ability of E. coli to generate resistance to nifuroxazide (FIG. 4A), nitrofurantoin (FIG. 4B), and compound 17 (FIG. 4C) over time. Time-course plots show the change in EC$_{50}$ values for each compound over the 12-day serial passage resistance assay (compounds tested in duplicates, as indicated by the black and white triangles).

Figure 5A:
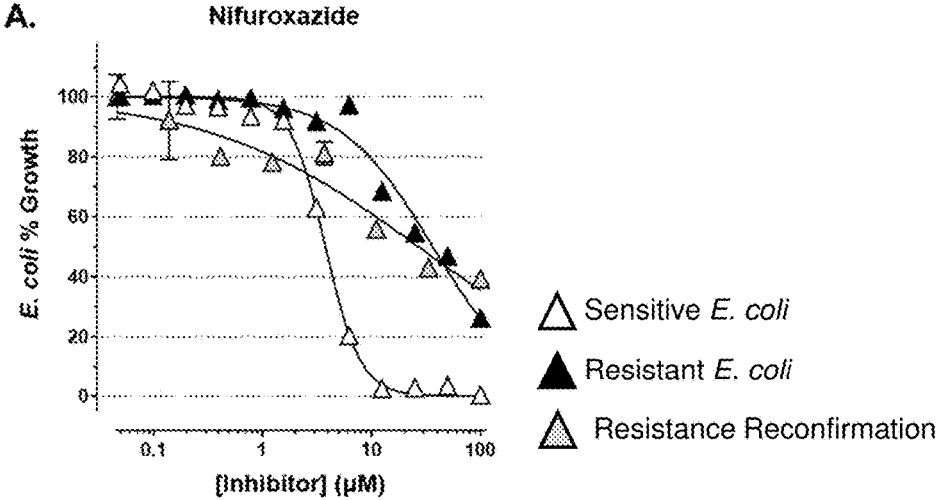
Figure 5B:
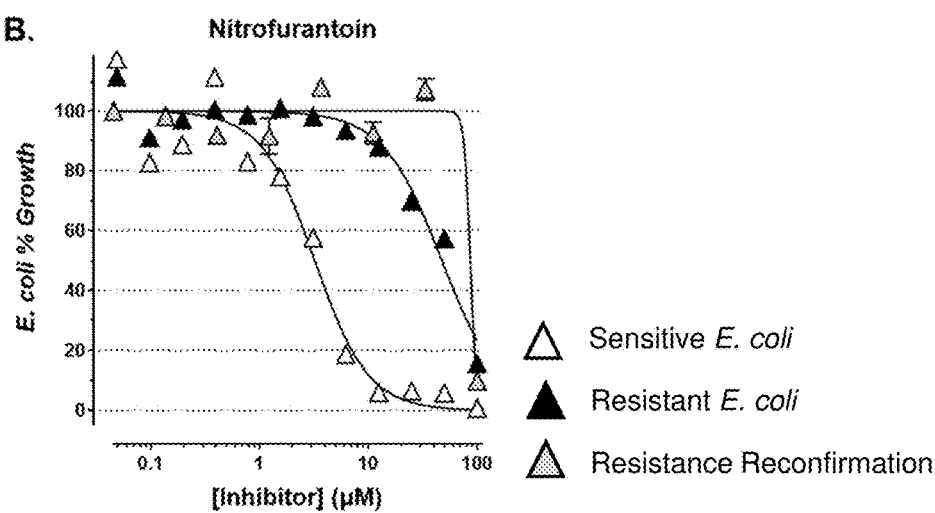
Figure 5C:
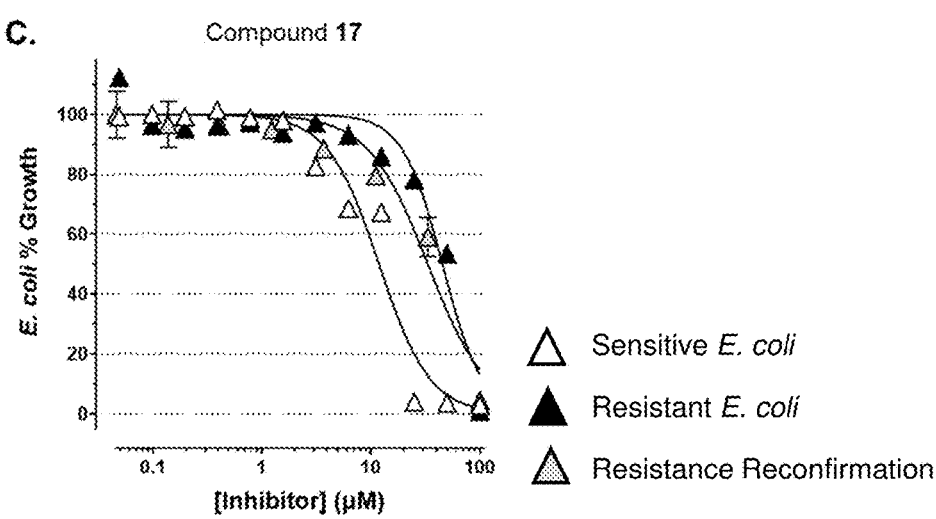
Figure 8A:
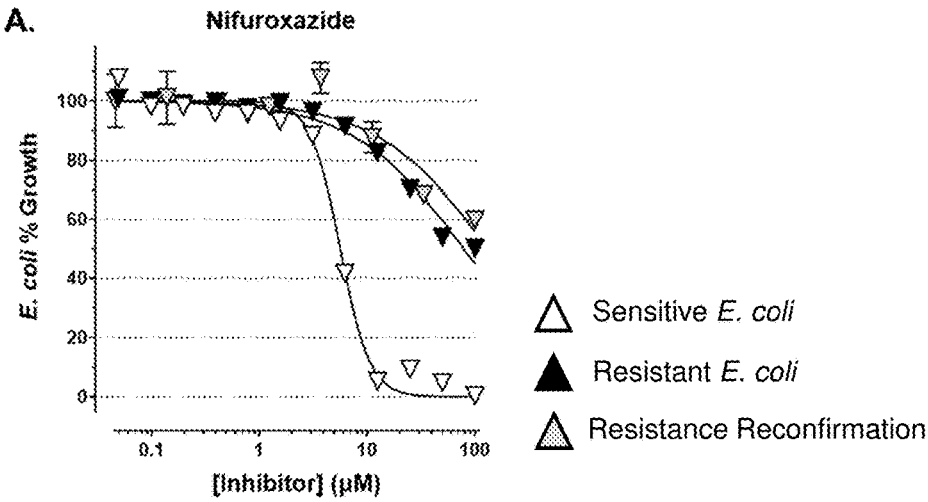
Figure 8B:
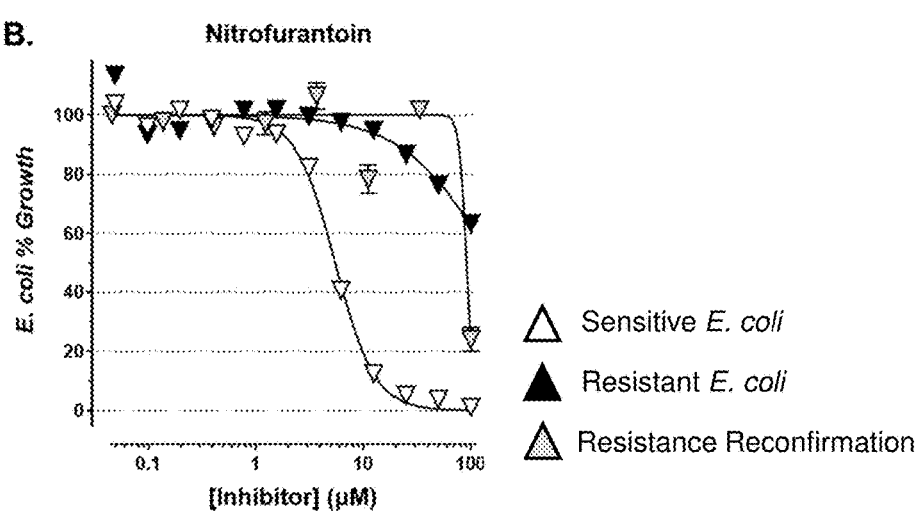
Figure 8C:
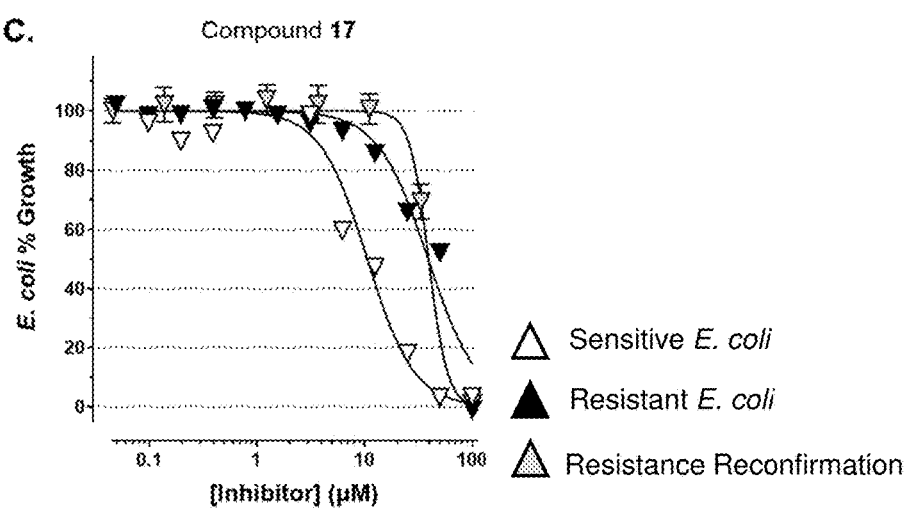

Referring to FIGS. 5A, 5B, and 5C, dose-response curves for nifuroxazide (FIG. 5A), nitrofurantoin (FIG. 5B), and compound 17 (FIG. 5C) tested against the susceptible parent E. coli (white triangle), the maximally-resistant strains developed to the respective test compounds (black triangle), and follow-up proliferation assays for resistant strains tested after serial passaging in the absence of test compounds to account for possible reversible inhibition mechanisms (grey triangles). Results are presented for the replicate 1 samples from the resistance assay, with results for replicate 2 samples similar and presented in FIGS. 8A, 8B, and 8C. In all instances, the resistant strains were nearly equally resistant even after culturing in the absence of inhibitors for the 4×12 h passages.

Example 84

We next confirmed that the resistance generated by the replicate *E. coli* strains was irreversible (i.e. putatively through permanent mutations of NfsA and NfsB as previously reported) as opposed to transient means (i.e. by up-regulating efflux pumps). To accomplish this, we sub-cultured single colonies obtained from the replicate samples where the bacteria exhibited the greatest degree of resistance to test compounds (day 12 samples for all compound replicates, except replicate 2 for nitrofurantoin, which was taken at day 10), for 4×12 h serial passages in fresh media without any test compounds present. We then performed another 24 h follow-up proliferation assay to determine $EC_{50}$ values (dose-response curves are presented for nifuroxazide, nitrofurantoin, and 17 in FIGS. 5A, 5B, and 5C and FIGS. 8A, 8B, and 8C. Results indicated that these subsequently-cultured bacterial strains were still resistant to each of the respective inhibitors they were generated from, supporting that resistance mechanisms were permanent. As previous studies by others have extensively characterized mutations affecting NfsA and NfsB that *E. coli* acquire to generate resistance against nitrofuran antibiotics, we did not perform genotyping to further characterize the specific resistance mechanisms for these strains, as they were likely the same.

Example 85

Figure 9A:
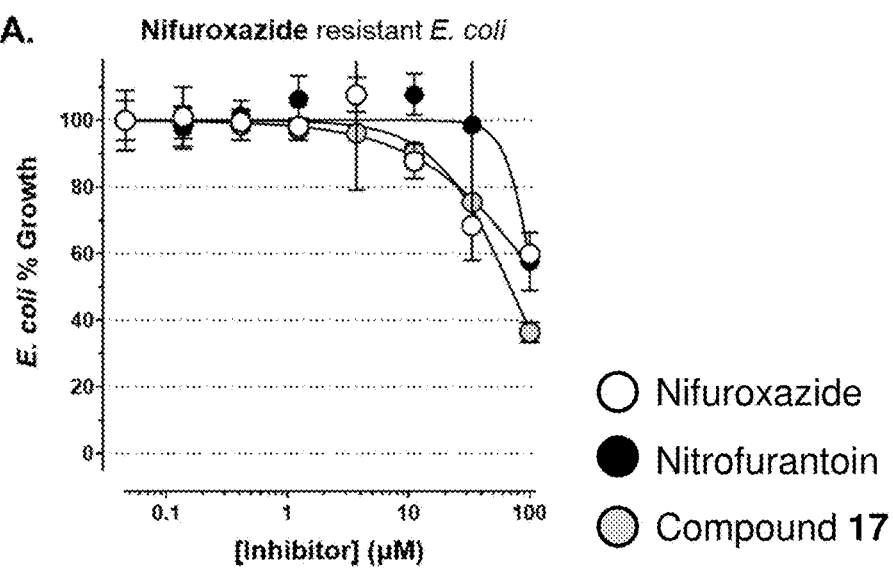
Figure 9B:
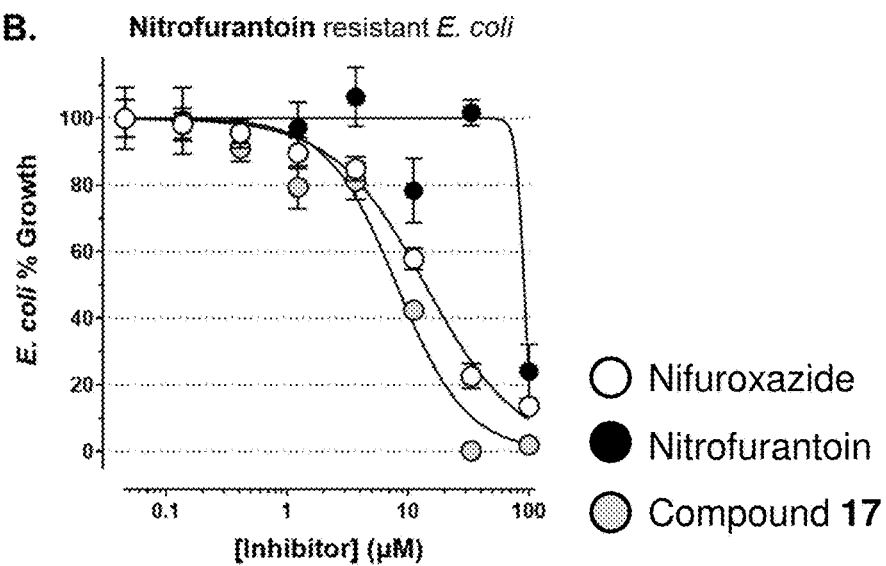
Figure 9C:
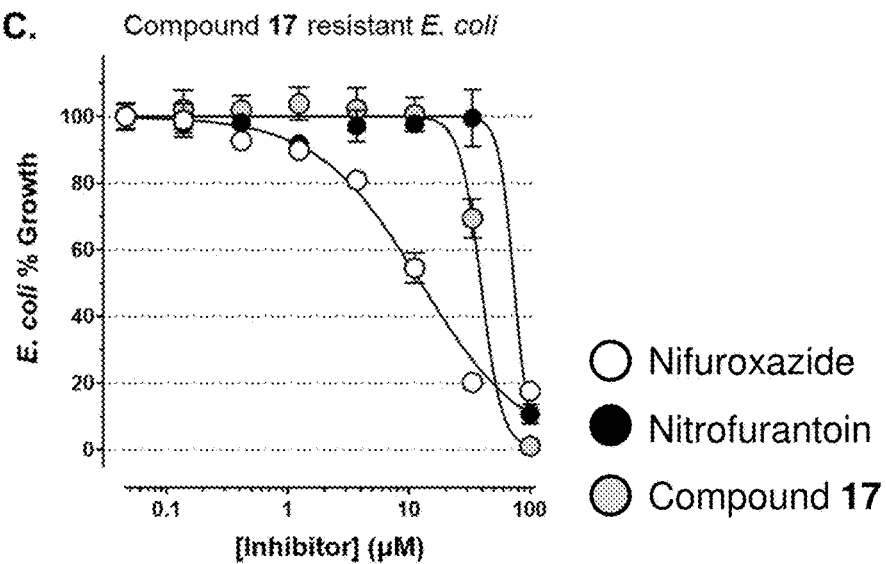

Since nifuroxazide, nitrofurantoin, and 17 displayed different inhibition and resistance profiles, we next examined if the respective resistant strains were cross-resistant with each of the other inhibitors. While the replicate strains that were initially resistant to nifuroxazide were cross-resistant to both nitrofurantoin and 17 (See FIGS. 6A and 9A), the nitrofurantoin-resistant strains were still sensitive to nifuroxazide and 17 (FIGS. 6B and 9B), and the 17-resistant strains were susceptible to nifuroxazide, but not nitrofurantoin (FIGS. 6C and 9C). Thus, it is evident that strains that have generated resistance to one analog are not necessarily cross-resistant to other analogs.

Example 86

Figure 6A:
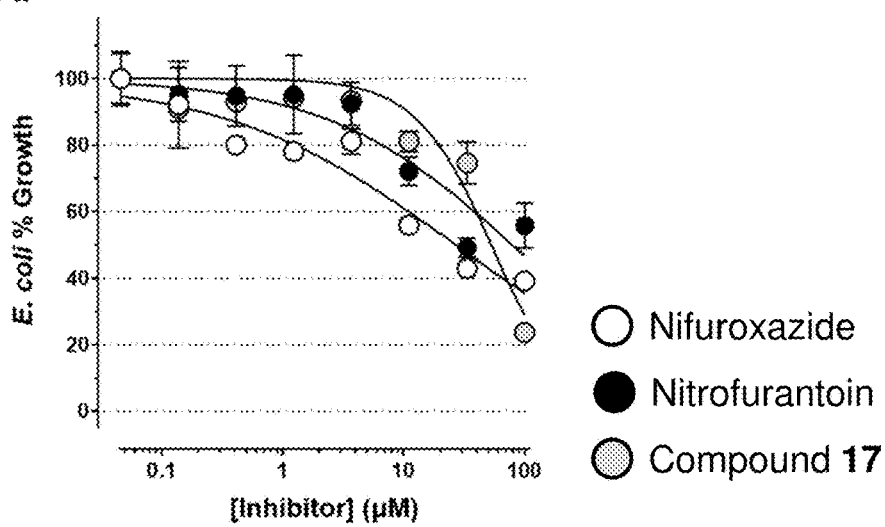
Figure 6B:
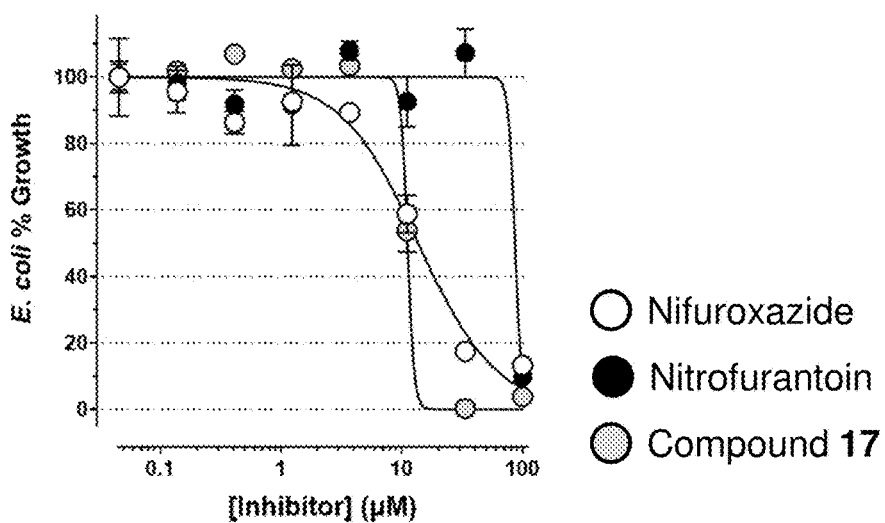
Figure 6C:
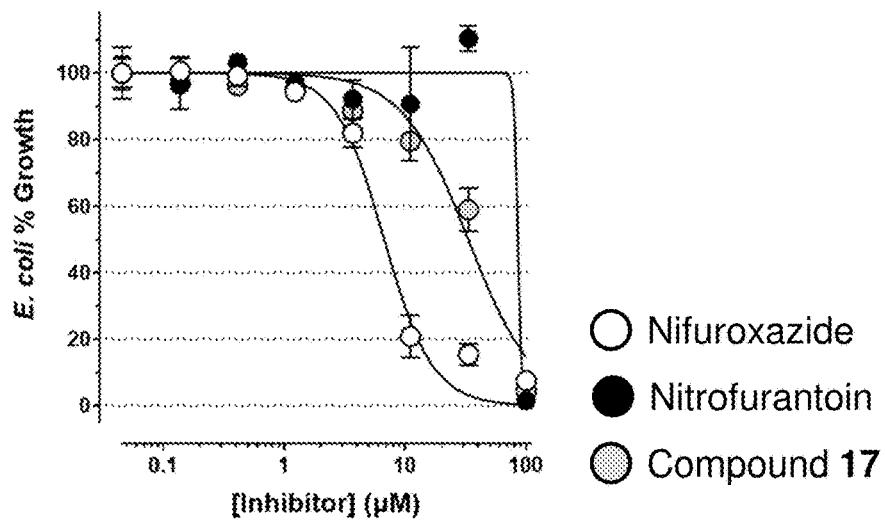

Referring to FIGS. 6A, 6B, and 6C, evaluation of cross-resistance between the respective resistant *E. coli* strains with nifuroxazide, nitrofurantoin, and compound 17. The three panels show dose-response curves for the three inhibitors tested against strains where resistance was initially generated to nifuroxazide (FIG. 6A), nitrofurantoin (FIG. 6B), and compound 17 (FIG. 6C). Results are presented for the replicate 1 samples from the resistance assay, with results for replicate 2 samples similar and presented in FIGS. 9A, 9B, and 9C. Results indicate that resistance generated to one inhibitor is not necessarily cross-resistant to the other inhibitors, potentially indicating different mechanisms of activation and/or targets.

Example 87

In a previous high-throughput screen, compound 1 was identified as a moderate GroEL/ES inhibitor with weak to moderate antibacterial efficacy against *B. subtilis*, MRSA, *K. pneumonia*, *A. baumannii*, and SM101 *E. coli* (which has a temperature sensitive LPS biosynthetic pathway). Key substructures of compound 1 resembled those of nitroxoline (i.e. shared hydroxyquinoline moiety) and nitrofuran-based antibacterials such as nifuroxazide and nitrofurantoin (i.e. shared bis-cyclic-N-acylhydrazone cores). Thus, we developed two parallel series of hydroxyquinoline and nitrofuran-bearing compound 1 analogs in an effort to increase inhibitor potency against GroEL/ES and *E. coli* and the ESKAPE bacteria, while reducing cytotoxicity to human cells (a compilation of assay results for nitrofurantoin, nifuroxazide, and lead analogs 16-21 is presented in Table 8). Initially, only the hydroxyquinoline series was found to contain potent GroEL/ES inhibitors in our traditional GroEL/ES-mediated substrate refolding assays; however, subsequent testing in the presence of *E. coli* NfsB indicated that the nitrofurans act as pro-drugs and their reactive metabolites can be potent GroEL/ES inhibitors. Lead nitrofuran analogs were potent inhibitors of *E. faecium*, *S. aureus*, and *E. coli* proliferation and exhibited minimal cytotoxicity to human FHC colon and FHs 74 Int small intestinal cells. While *E. coli* were able to generate varying degrees of irreversible resistance to nifuroxazide, nitrofurantoin, and lead analog 17 (putatively through mutations in NfsA and NfsB), clones were not necessarily cross-resistant to the other inhibitors. This finding may indicate diverging mechanisms of activation and/or targets for structurally distinct inhibitors, suggesting that combination therapy could prove synergistic and delay the onset of bacterial resistance.

TABLE 8

Cell-based and biochemical EC$_{50}$, CC$_{50}$, and IC$_{50}$ results for the top eight lead inhibitors based on average Selectivity Indices (SI) for inhibiting *E. coli* proliferation over cytotoxicity to human colon and intestine cells. For the GroEL/ES-dMDH refolding assay and native MDH counter-screens, IC$_{50}$ results are shown for compounds tested in the absence and presence of NfsB nitroreductase (w/ and w/o NR, respectively).

| Compound Structure & Name/Number | Cell-Based Assay EC$_{50}$ & CC$_{50}$ (μM) | | | | | | | | | | SI (CC$_{50}$/EC$_{50}$) | | Biochemical Assay EC$_{50}$ (μM) | | | |
|---|---|---|---|---|---|---|---|---|---|---|---|---|---|---|---|---|
| | Bacterial Proliferation | | | | | | | Human Cell Viability | | | | | Native MDH | | GroEL/ES-dMDH refolding: | |
| | E | S | K | A | P | E | E. coli | Colon | Intestine | Colon | Intestine | w/o NR | w/ NR | w/o NR | w/ NR |
| 16 (structure) | 24 | 7.1 | 16 | 82 | >100 | 40 | 0.42 | 83 | 71 | 198 | 168 | >63 | >56 | >100 | 7.7 |
| 17 (structure) | 12 | 3.0 | 19 | 72 | >100 | 49 | 0.45 | 53 | 85 | 119 | 190 | >63 | >56 | 88 | 3.2 |
| Nitrofurantoin (structure) | 38 | 27 | 40 | >100 | >100 | 36 | 0.69 | >100 | >100 | >146 | >146 | >63 | >56 | >100 | 84 |
| Nifuroxazide (structure) | 8.1 | 16 | 37 | >100 | >100 | 54 | 0.87 | 61 | 79 | 70 | 91 | >63 | >56 | >100 | 19 |

TABLE 8-continued

Cell-based and biochemical EC$_{50}$, CC$_{50}$, and IC$_{50}$ results for the top eight lead inhibitors based on average Selectivity Indices (SI) for inhibiting *E. coli* proliferation over cytotoxicity to human colon and intestine cells. For the GroEL/ES-dMDH refolding assay and native MDH counter-screens, IC$_{50}$ results are shown for compounds tested in the absence and presence of NfsB nitroreductase (w/ and w/o NR, respectively).

| Compound Structure & Name/Number | | Cell-Based Assay EC$_{50}$ & CC$_{50}$ (μM) | | | | | | | | | | Biochemical Assay EC$_{50}$ (μM) | | | |
|---|---|---|---|---|---|---|---|---|---|---|---|---|---|---|---|
| | | Bacterial Proliferation | | | | | | Human Cell Viability | | | SI (CC$_{50}$/EC$_{50}$) | | Native MDH | | GroEL/ES-dMDH refolding: | |
| | | E | S | K | A | P | E | *E. coli* | Colon | Intestine | Colon | Intestine | w/o NR | w/ NR | w/o NR | w/ NR |
| 20 [structure: 5-nitrofuran hydrazide with 4-methoxybenzoyl] | | 22 | 8.1 | >100 | >100 | >100 | >100 | 1.9 | >100 | 75 | >53 | 40 | >63 | >56 | 69 | 10 |
| 18 [structure: 5-nitrofuran hydrazide with benzoyl] | | 31 | 10 | 36 | >100 | >100 | >100 | 2.1 | >100 | 94 | >48 | 45 | >63 | >56 | >100 | 12 |
| 19 [structure: 5-nitrofuran hydrazide with isonicotinoyl] | | 13 | 9.5 | 42 | 54 | >100 | 73 | 2.4 | 61 | 90 | 26 | 38 | >63 | >56 | >100 | 23 |
| 21 [structure: 5-nitrofuran hydrazide with 4-dimethylaminobenzoyl] | | >100 | 34 | >100 | >100 | >100 | >100 | 10.0 | >100 | 93 | >10 | 9.3 | >63 | >56 | 26 | 12 |

What is claimed is:
1. A method of treating a bacterial infection comprising administering to a subject in need of such treatment an effective amount of at least one compound selected from the group consisting of
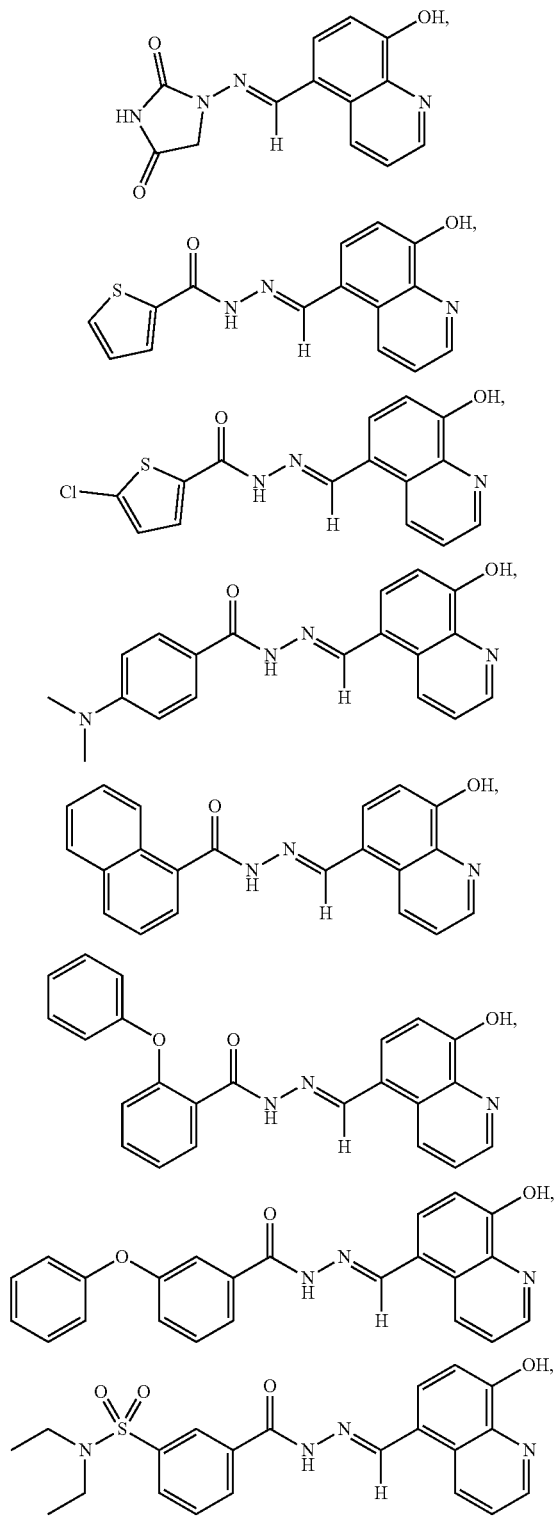
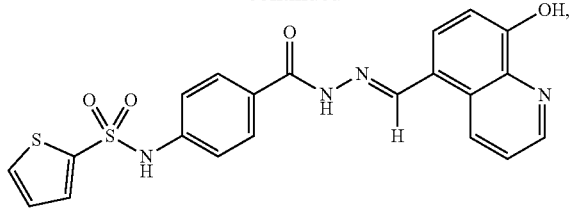
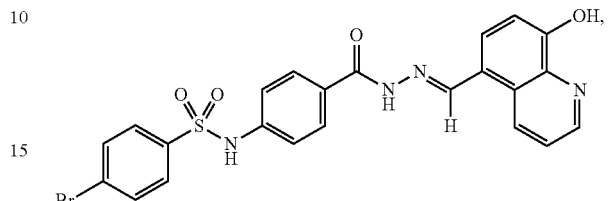
and
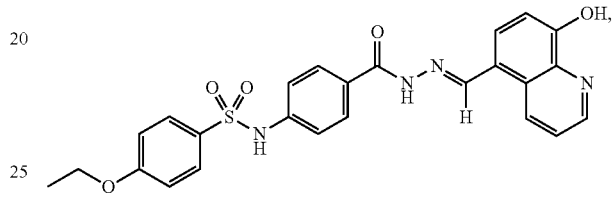
or a pharmaceutically acceptable salt thereof.
2. The method of claim 1, wherein the compound is selected from the group consisting of
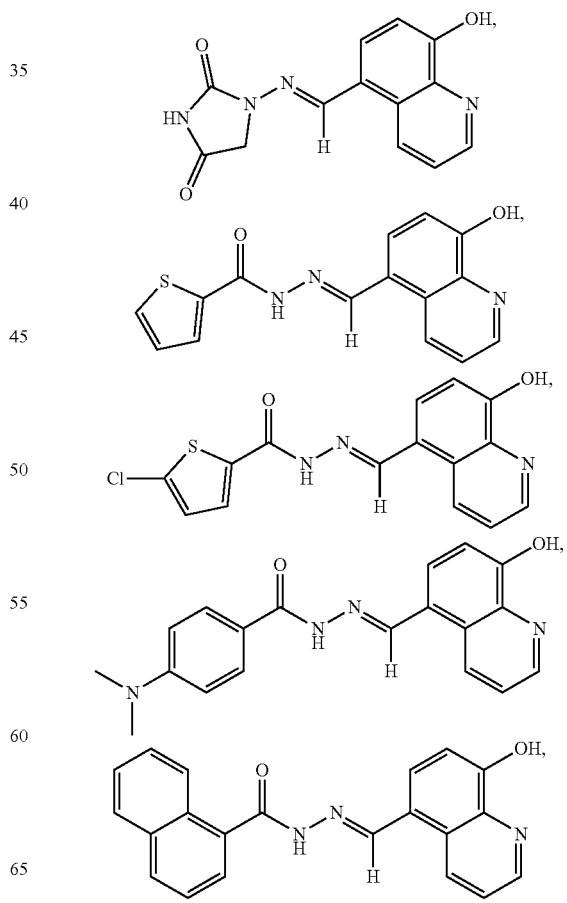

-continued

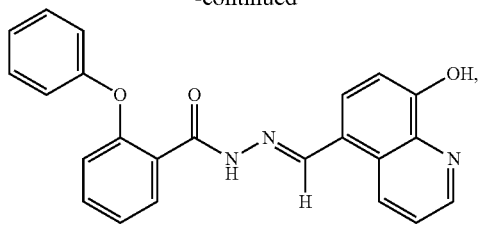

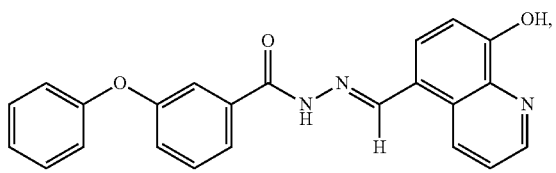

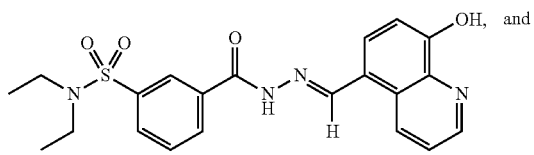

-continued

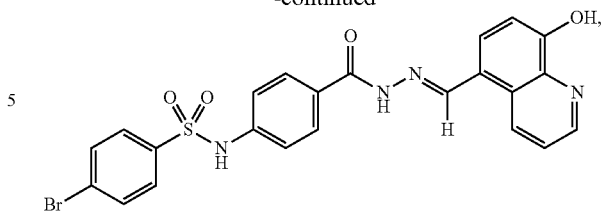

or a pharmaceutically acceptable salt thereof.

3. The method of claim 1, wherein the bacterial infection is caused by a gram negative bacteria.

4. The method of claim 1, wherein the bacterial infection is caused by a gram positive bacteria.

5. The method of claim 1, wherein the bacterial infection is caused by *E. coli, Enterococcus faecium, Staphylococcus aureus, Klebsiella pneumonia, Acinetobacter baumannii, Pseudomonas aeruginosa*, or *Enterobacter*.

6. The method of claim 2, wherein the bacterial infection is caused by a gram negative bacteria.

7. The method of claim 2, wherein the bacterial infection is caused by a gram positive bacteria.

8. The method of claim 2, wherein the bacterial infection is caused by *E. coli, Enterococcus faecium, Staphylococcus aureus, Klebsiella pneumonia, Acinetobacter baumannii, Pseudomonas aeruginosa*, or *Enterobacter*.

* * * * *